United States Patent
Creed et al.

(10) Patent No.: US 12,321,863 B2
(45) Date of Patent: Jun. 3, 2025

(54) ATTENTION FILTERING FOR MULTIPLE INSTANCE LEARNING

(71) Applicant: BENEVOLENTAI TECHNOLOGY LIMITED, London (GB)

(72) Inventors: Paidi Creed, London (GB); Aaron Jefferson Khey Jin Sim, London (GB); Stephen Thomas Spencer, London (GB); Mikko Juhani Vilenius, London (GB)

(73) Assignee: BenevolentAI Technology Limited, London (GB)

( * ) Notice: Subject to any disclaimer, the term of this patent is extended or adjusted under 35 U.S.C. 154(b) by 1283 days.

(21) Appl. No.: 17/041,533

(22) PCT Filed: Mar. 29, 2019

(86) PCT No.: PCT/GB2019/050927
§ 371 (c)(1),
(2) Date: Sep. 25, 2020

(87) PCT Pub. No.: WO2019/186198
PCT Pub. Date: Oct. 3, 2019

(65) Prior Publication Data
US 2021/0117815 A1    Apr. 22, 2021

(30) Foreign Application Priority Data
Mar. 29, 2018  (GB) ..................... 1805293

(51) Int. Cl.
*G06N 5/022* (2023.01)
*G06F 16/901* (2019.01)
*G06F 17/16* (2006.01)
*G06N 3/04* (2023.01)
*G06N 20/00* (2019.01)

(52) U.S. Cl.
CPC ......... *G06N 5/022* (2013.01); *G06F 16/9024* (2019.01); *G06F 17/16* (2013.01); *G06N 3/04* (2013.01); *G06N 20/00* (2019.01)

(58) Field of Classification Search
None
See application file for complete search history.

(56) References Cited

U.S. PATENT DOCUMENTS

2017/0286866 A1* 10/2017 Bhowan .............. G06F 16/9024
2018/0053097 A1   2/2018 Soni et al.

OTHER PUBLICATIONS

Lesot, Marie-Jeanne, et al. "Two methods for internet buzz detection exploiting the citation graph." 2012 IEEE International Conference on Fuzzy Systems. IEEE, 2012. (Year: 2012).*

(Continued)

*Primary Examiner* — Daniel T Pellett
(74) *Attorney, Agent, or Firm* — Smith Baluch LLP

(57) ABSTRACT

Method(s), apparatus, and system(s) are provided for filtering a set of data, the set of data comprising multiple data instances by: receiving a set of scores for the set of data; determining attention filtering information based on prior knowledge of one or more relationships between the data instances in said set of data and calculating attention relevancy weights corresponding to the data instances and the set of scores; and providing the attention filtering information to a machine learning, ML, technique or ML model.

40 Claims, 17 Drawing Sheets

(56) References Cited

OTHER PUBLICATIONS

Veličković, Petar, et al. "Graph attention networks." arXiv preprint arXiv:1710.10903 (2017). (Year: 2017).*
PCT Written Opinion and Search Report issued in related PCT Application No. PCT/GB2019/050927 mailed Jul. 3, 2019.
European Office Action issued in related European Patent Application 19716528.5 dated Aug. 12, 2021.

* cited by examiner

ATTENTION FILTERING FOR MULTIPLE INSTANCE LEARNING

CROSS-REFERENCE TO RELATED PATENT APPLICATIONS

This patent application 35 U.S.C. 371 national stage of International Patent Application PCT/GB2019/050927 filed 29 Mar. 2019; which claims the benefit of priority to GB Application 1805293.6 filed 29 Mar. 2018, which is incorporated by reference herein for all purposes.

The present application relates to a system and method for attention filtering input datasets for multiple-instance learning.

BACKGROUND

Multiple-instance learning (MIL) is a variation on conventional supervised machine learning (ML) techniques. Typically, ML techniques receive a labelled training dataset in which each training data instance is a labelled feature vector. A ML technique can be trained to generate a ML model based on the labelled training dataset. In MIL, the labelled training dataset X comprises a plurality of labelled sets of training data $\{X_1, \ldots, X_n, \ldots, X_T\}$ for $1 \leq n \leq T$, where T is the number of labelled sets of training data. Each labelled set of training data (a.k.a. a set of labelled bags) comprises a plurality of training data instances $\{x_{1,n}, \ldots, x_{i,n}, x_{N_n,n}\}$ for $1 \leq i \leq N_n$, where $N_n$ is the number of training data instances in the n-th labelled set of training data $X_n$. Each labelled set of training data $X_n$ may be associated with or mapped to one or more label variables $\ell_l$ for $1 \leq l \leq L$ from a set of binary or non-binary labels $\mathcal{L} = \{\ell_1, \ldots, \ell_l, \ldots, \ell_L\}$, each representing a relationship/fact, where $L \geq 1$ is the number of relationships/facts that are to be modelled.

Although the n-th set of training data $X_n$ is described as, by way of example only but is not limited to, being mapped or associated with label $\ell_l$ for $1 \leq l \leq L$, this is by way of example only, it is to be appreciated by the skilled person that the remaining plurality of sets of data instances $X_j$ for $1 \leq j \neq n \leq T$ may be associated or mapped to a relationship based on any one of the labels $\ell_k \in \mathcal{L}$ for $1 \leq k \leq L$, where k may be equal to l, from the set of labels $\mathcal{L}$. As each set of training data $X_n$ for $1 \leq n \leq T$ is mapped to one or more of the labels $\ell_l \in \mathcal{L}$ for $1 \leq l \leq L$, then each training data instance $x_{i,n}$ of a labelled set of training data $X_n$ may be assumed to be associated with the same label(s) $\ell_l$ that is mapped to the labelled set of training data $X_n$. For simplicity, it is assumed that the n-th labelled set of training data $X_n$ is mapped to the l-th label $\ell_l$. Thus, each training data instance $x_{i,n}$ of the n-th labelled set of training data $X_n$ represents evidence that can be used to support the value of $\ell_l$. In the simplest case $\ell_l$ may be a boolean variable whose value determines whether a fact/relationship is true or false and $X_n$ comprises a set of potential evidence for this fact/relationship. It is to be appreciated by the skilled person that label $\ell_l$ may be any binary or non-binary value whose value determines whether a fact/relationship is more likely or unlikely and $X_n$ comprises a set of potential evidence for this fact/relationship. Each training data instance may be represented as a feature or encoding vector in K-dimensional space, where $K>1$.

The n-th labelled set of training data $X_n$ includes a plurality of training data instances $\{x_{1,n}, \ldots x_{i,n}, \ldots, x_{N_n,n}\}$ which each training data instance $x_{i,n}$ is potential evidence $\ell_l$ being, by way of example only but not limited to, true or false (e.g. $\ell_l = F, \ell_l \in \{T,F\}$). For example, in relationship extraction in natural language processing, $\ell_l$ may be a label value that describes or represents a relationship between two or more entities (e.g. "A regulates B", where entities A and B are compounds, proteins and/or targets etc.). Each training instance $x_{i,n}$ may be a sentence extracted from a corpus of literature/citation(s) containing the two or more entities (e.g. a sentence containing "A" and "B"). The n-th labelled set of training data $X_n$ may include all sentences from the corpus of literature/citations containing the two or more entities (e.g. "A" and "B"). Thus, a plurality of training data instances $x_{1,n}, \ldots, x_{N_n,n}$ in which each training data instance includes data representative of two or more of the same entities may be considered to be evidence supporting whether a relationship represented by label $\ell_l$ having a value $\ell_l \in \{T,F\}$. The labelled training dataset X, may be used to train a ML technique to generate a ML model or classifier $f(X)$ that may be used to model the relationship(s) represented by the set of labels $\mathcal{L}$. In MIL, once a ML model or classifier has been trained, the ML model or classifier may receive an input dataset X for generating predictions/classifications. The input dataset X may include a plurality of sets of data $\{X_1, \ldots, X_n, \ldots, X_D\}$, for $D \geq 1$ is the number of sets of data in the input dataset X that are to be processed, in which each set of data further includes a plurality of data instances $\{x_{1,n}, \ldots, x_{N_n,n}\}$, where $N_n$ is the number of data instances in the n-th set of data $X_n$.

Generating a labelled training dataset may be costly and time consuming, especially as the number of training data instances increases. In MIL, a labelled training dataset includes a plurality of sets of labelled training data. Each set of labelled training data includes a plurality of training instances, which may be assumed to be associated with the same label representing evidence supporting or not supporting a relationship.

Even though each plurality of training instances of a set of training data may be associated with a label several issues exist: not all the training instances in a labelled set of training data are necessarily relevant and may in fact contradict the label; there may be training instances in each labelled set of training data that do not convey any information about the relationship they are meant to support; there may be training instances in each labelled set of training data that are more related to other sets of labelled training data.

Using labelled training dataset in which each of the labelled sets of training data has one or more of these issues would severely limit or provide confusing information to the training of any ML technique that uses the labelled training dataset for generating a ML model (e.g. an ML classifier).

Although each training data instance in each set of training data may be manually verified/checked, this is impractical to do due to the increasing requirement for large datasets for training ML techniques. Automatically creating a labelled training dataset is preferable for generating the required datasets that are large enough for ML applications. However, the above problems are greatly exacerbated when creating training datasets automatically from, by way of example only but not limited to, a corpus of literature/citations or a corpus of image(s), or any other type of data as the application demands.

There is a desire for efficiently creating and/or using sufficiently large labelled training datasets for MIL and using these in a manner that further improves: a) the training of ML techniques and the resulting generated ML models and classifiers; and/or b) automatic creation of labelled training datasets.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides an attention mechanism that filters training datasets or input multi-instance datasets, each data instance representing one or more entities that may support a factual relationship associated with the one or more entities, to retain the most relevant training data or input data associated with that relationship by using prior knowledge of the relationships between the training data instances or input data instances.

In a first aspect, the present disclosure provides a computer-implemented method for filtering a set of data, the set of data comprising multiple data instances, the method comprising: receiving a set of scores for the set of data; determining attention filtering information based on prior knowledge of one or more relationships between the data instances in said set of data and calculating attention relevancy weights corresponding to the data instances and the set of scores; and providing the attention filtering information to a machine learning, ML, technique or ML model.

Preferably, calculating the attention relevancy weights comprises searching for a set of attention relevancy weights that minimise a cost function based on the set of scores and prior knowledge of one or more relationships between the data instances in said set of data.

Preferably, determining the attention filtering information further comprises filtering the data instances in the set of data by calculating a weighted combination of the calculated attention relevancy weights with an encoding vector associated with the corresponding data instances of said set of data; and providing the attention filtering information further comprises providing data representative of the filtered data instances to the ML technique or ML model.

Preferably, determining the attention filtering information further comprises: calculating attention weights based on the scoring vector; and calculating a weighted combination of the calculated attention relevancy weights with an encoding vector associated with the corresponding data instances of said set of data; and providing the attention filtering information further comprises providing data representative of the weighted combination and the prior knowledge of one or more relationships between data instances to the ML technique or ML model.

Preferably, the set of data is a labelled set of training data of a training dataset, the training dataset comprising a plurality of labelled sets of training data, wherein each labelled set of training data comprises a multiple training data instances, and wherein each labelled set of training data is filtered.

Preferably, each of the multiple training data instances are representative of a relationship between one or more entities.

Preferably, each training data instance of each set of training data is associated with the same label $\ell_n$ in relation to a relationship and comprises data representative of evidence supporting the relationship being true or false, or any other binary or non-binary value.

Preferably, each data instance comprises a sentence extracted from a corpus of literature, said sentence describing a relationship between multiple entities.

Preferably, each data instance comprises an image or image portion extracted from an image or a corpus of images, said data instance describing an object in an image. For example, image portions may be extracted from an image and may comprise image patches or portions that correspond to an object or a portion of an object in the image (e.g., a tumor).

Preferably, the set of scores is based on a scoring network operating on feature encoding vectors embedding the corresponding data instances, the scoring network based on a neural network structure.

Preferably, prior knowledge of one or more relationships comprises a set of prior knowledge networks or graphs, each prior knowledge network or graph representing a particular type of relationship between data instances of the set of data.

Preferably, the set of prior knowledge graphs comprise one or more prior knowledge networks or graphs from the group of: a citation network or graph; or reference network or graph providing an indication of a relationship between data instances located in the same document in a corpus of literature; or a reference network or graph providing an indication of a relationship between data instances located in different documents in a corpus of literature.

Preferably, determining the attention filtering information further comprises searching for an attention relevancy weight vector that minimises, over all attention relevancy weight vectors, a cost function based on a similarity between an attention relevancy weight vector and a scoring vector and prior knowledge between data instances of said set of data.

Preferably, searching for the attention relevancy weight vector further comprises minimising an attention cost function:

$$\Lambda(\vec{s_n}) = \arg\min_{\vec{\alpha}\in\Delta^n} \left\{ \frac{1}{2}\|\vec{s_n} - \vec{\alpha_n}\|_2^2 + \sum_{(x_{i,n},x_{j,n})\in G_1} \lambda_1|\alpha_{i,n} - \alpha_{j,n}| + \cdots + \sum_{(x_{i,n},x_{j,n})\in G_m} \lambda_m|\alpha_{i,n} - \alpha_{j,n}| \right\}$$

in relation to the attention relevancy weight vector, $\vec{\alpha_n}$, for $1 \le n \le T$, where T is the number of sets of data, $\Lambda(\cdot)$ is the attention cost function that maps a score vector, $\vec{s_n}$, for each set of data to a probability distribution $\Delta^n = \{\alpha_i \ge 0, \Sigma\alpha_i = 1\}$, $G_1, \ldots, G_m$ for $1 \le m$ are prior knowledge networks or graphs representing whether each pair of data instances $(x_{i,n}, x_{j,n})$, for $1 \le i \le j \le N_n$, have a relationship or not, each $\lambda_r \in \mathbb{R}^+$ for $1 \le r \le m$ is a hyperparameter selected to adjust the contribution of the prior knowledge graph Gr.

Preferably, a prior knowledge graph Gr assigns equal attention weights $\alpha_{i,n}$ and $\alpha_{j,n}$ to the pair of data instances $(x_{i,n}, x_{j,n})$ should they be connected/related; and a prior knowledge graph Gr assigns unequal attention weights $\alpha_{i,n}$ and $\alpha_{j,n}$ to the pair of data instances $(x_{i,n}, x_{j,n})$ which are not related by the prior knowledge network $G_r$ or which depends on how distantly connected/related they are.

Preferably, searching for the set of attention relevancy weights that minimise the cost function further comprises searching for the set of attention relevancy weights using one or more from the group of: a neural network structure or layer configured for determining a set of attention relevancy weights that minimise the cost function; one or more ML techniques configured for determining a set of attention relevancy weights that minimise the cost function; one or more numerical methods or iterative numerical methods configured for determining a set of attention relevancy weights that minimise the cost function; and/or any other algorithm, structure or method for determining a set of attention relevancy weights that minimise the cost function.

Preferably, determining attention filtering information further comprises calculating an attention-loss function, $AL(X, \ell, \vec{\alpha}_n)$ comprising a loss function, $L(f(X), \ell)$ and an attention function, $AF(G_l, \vec{\alpha}_k, X_k)$ for introducing a penalty or reward based on applying one or more prior knowledge graph(s) $G_1, \ldots, G_m$ and attention relevancy weight vector of attention weights $\vec{\alpha}_n = a [\alpha_{1,n}, \ldots, \alpha_{i,n}, \ldots, \alpha_{N_m,n}]$ on the labelled set of data $X_n$.

Preferably, calculating the attention-loss function, AL, further comprises calculating the attention-loss function based on:

$$AL(X, \ell, \vec{\alpha}_n) = L(f(X), \ell) + \sum_{k=1}^{T} \sum_{l=1}^{m} AF(G_l, \vec{\alpha}_k, X_k)$$

$$AF(G_l, \vec{\alpha}_k, X_k) = \sum_{(x_{i,n}, x_{j,n}) \in G_l} \lambda_l |\alpha_{i,k} - \alpha_{j,k}|$$

where $\lambda_l \in \mathbb{R}^+$ is a hyperparameter selected to adjust the contribution of the prior knowledge graph $G_1$, and each attention score $\alpha_{i,n}$ may be calculated based on an attention function.

Preferably, calculating the attention function further comprises calculating an attention function based on one or more from the group of: a SOFTMAX attention function, wherein each attention weight, $\alpha_{i,n}$, is calculated based on $$\alpha_{i,n} = \frac{e^{s_{i,n}}}{\sum_j e^{s_{j,n}}},$$

wherein $s_{i,n}$ is a corresponding score from the set of scores associated with the set of data; a MAX attention function; a sparsemax attention function; and/or any suitable attention function for calculating attention weights based on at least the set of scores associated with the set of data.

Preferably, determining the attention filtering information further comprises filtering the data instances of the set of data by calculating a weighted combination of the attention relevancy weight vector with the encoding vector of the corresponding set of data.

Preferably, the linear combination is based on a Hadamard multiplication between a matrix of feature encoding vectors associated with the corresponding set of data and the associated attention relevancy weight vector.

Preferably, the attention-loss function is implemented by the ML technique, ML model or classifier, the attention filtering information comprising data representative of the calculated weighted combination and the prior knowledge data associated with the set of data $X_n$ output by each prior knowledge graph or network, wherein the attention filtering information is input to the attention-loss function of the ML technique, ML model or classifier.

Preferably, filtering of the set of data occurs during training of the ML technique when generating a ML model or classifier, wherein the attention-loss function is penalised if the ML model does not correctly associate the relationship between pairs of data instances based on the prior knowledge data.

Preferably, filtering each set of data of an input dataset, wherein the input dataset comprises a plurality of sets of data, in which each set of data comprises multiple data instances.

Preferably, each of the multiple data instances of a set of data are representative of a relationship between one or more entities of the data instances.

Preferably, each set of data is associated with a relationship between a different one or more entities.

Preferably, each set of data is associated with a relationship between one or more entities, wherein one or more of the relationships between each of the sets of data are different or dissimilar.

Preferably, each set of data is associated with a relationship between one or more entities, wherein one or more of the relationships between each of the sets of data are similar or the same.

Preferably, the determining attention filtering information is based on a structure in which attention relevancy weights are regularised with an attention function based on the generalised fused lasso (GFL) using one or more prior knowledge graphs or a graph of mentions.

Preferably, the GFL is used to calculate an attention relevancy weight vector, w, based on:

$$w = \arg \min_{w \in \Delta^{N_M - 1}} \frac{1}{2} \|w - z/\lambda\|^2 + \lambda \sum_{(a,b) \in G} |w_a - w_b|,$$

where G is a prior knowledge graph/network defined on the input data instances and $\lambda \in \mathbb{R}^+$ is a hyper-parameter, and z is a vector of potentials associated with a potential function $\mathcal{P}_z$, which maps encoding vectors of data instances to a vector of potentials z or scores $\vec{s}$, and a subsequent mapping from the vector of potentials to the probability simplex $\mathcal{P}_\Delta$.

Preferably, the attention filtering information is used in a relational extraction model.

Preferably, the method further comprising: receiving an encoding vector of the data instances in the form of a matrix X of encoding vectors; calculating attention relevancy weights of the data instances with respect to a given relation $\rho_r$, based on an attention function, $\mathcal{A}$, defined as: $\mathcal{A}(X, r_r) \mapsto {}^r \equiv (w_1^r, \ldots, w_{N_M}^r)$, where X is the matrix of mention encodings and $w^r$ is an attention relevancy weight vector in the M-dimensional probability simplex $\Delta^M$.

Preferably, the attention function $\mathcal{A}$ embodies the calculation of potentials associated with the matrix X of encoding vectors and the calculation of attention relevancy weights based on the potentials and prior data associated with the data instances.

Preferably, the method further comprising: determining attention filtering information comprising data representative of the attention filtered vector $x^{(r)} = \sum_{k=1}^{N_M} w_k^{(r)} x_k$, with $x^{(r)} \in \mathbb{R}^{d_T}$; and sending the attention filtering information to a classifier module, ML model, or ML technique for training an ML model.

Preferably, the attention function is implemented based on a potential network based on a potential function and an attention network.

Preferably, the attention network is based on a probability mapping function $\mathcal{P}_A$ based on:

$$w = \mathrm{argmin}_{w \in \Delta^{N_M-1}} \frac{1}{2} \|w - z/\lambda\|^2 + \lambda \sum_{(a,b) \in G} |w_a - w_b|,$$

where G is a prior knowledge graph defined on the input data instances and $\lambda \in \mathbb{R}^+$ is a hyper-parameter.

In a second aspect, the present disclosure provides a computer-implemented method for training a ML technique to generate an ML model or classifier based on filtering a labelled training dataset comprising a plurality of sets of data according to the method of the first aspect, modifications thereof, and/or as herein described and the like.

In a third aspect, the present disclosure provides a computer-implemented method for classifying or using an ML model based on filtering an input dataset according to the method of the first aspect, modifications thereof, and/or as herein described and the like.

In a fourth aspect, the present disclosure provides a ML model or classifier obtained from the computer implemented method according to any of the first or third aspects, modifications thereof, and/or as herein described and the like.

In a fifth aspect, the present disclosure provides an attention apparatus comprising a processor, a memory and a communication interface, the processor is connected to the memory and the communication interface, wherein the processor, memory and/or communication interface are configured to implement the method or model according to any of the first, second, third and fourth aspects, modifications thereof, and/or as herein described and the like.

In a sixth aspect, the present disclosure provides an attention apparatus comprising a processor and a communication interface, the processor connected to the communication interface, wherein: the communication interface is configured to receive a set of scores for each set of data of an input dataset comprising a plurality of sets of data, in which each set of data comprises multiple data instances; the processor is configured to determine attention filtering information based on prior knowledge of one or more relationships between the data instances in said each set of data and calculating attention relevancy weights corresponding to the data instances and each set of scores; and the communication interface is configured to provide the attention filtering information to a machine learning, ML, technique or ML model.

Preferably, the processor, memory and/or communication interface are configured to implement the method or model according to any of the first, second, third and fourth aspects, modifications thereof, and/or as herein described and the like.

In a seventh aspect, the present disclosure provides a system comprising: an encoding network configured to encode an input dataset into one or more feature encoding vectors, wherein the input dataset comprises a plurality of sets of data, in which each set of data comprises multiple data instances; a scoring network configured to generate a scoring vector for each of the one or more feature encoding vectors; and an attention mechanism configured according to an attention apparatus according to the fifth and/or sixth aspects, modifications thereof, and/or as herein described and the like, the attention apparatus configured for providing attention filtering information based on the encoding vectors and scoring vectors to a ML technique, ML model and/or classifier.

Preferably, the system further comprising a ML module configured to receive the attention filtering information for training the ML technique to generate an ML model or classifier.

Preferably, the system further comprising a ML module configured to receive the attention filtering information for input to a ML model.

Preferably, the system further comprising a ML module configured to receive the attention filtering information for input to a classifier.

Preferably, the encoding network, scoring network, attention mechanism and the machine learning module are configured to implement the computer-implemented method according to any of the first aspect, modifications thereof, and/or as herein described and the like.

In an eighth aspect, the present disclosure provides a computer-readable medium comprising data or instruction code, which when executed on a processor, causes the processor to implement the computer-implemented method of the first aspect, modifications thereof, and/or as herein described and the like.

In an eighth aspect, the present disclosure provides a tangible (or non-transitory) computer-readable medium comprising data or instruction code for for filtering a set of data, the set of data comprising multiple data instances, which when executed on one or more processor(s), causes at least one of the one or more processor(s) to perform at least one of the steps of the method of: receiving a set of scores for the set of data determining attention filtering information based on prior knowledge of one or more relationships between the data instances in said set of data and calculating attention relevancy weights corresponding to the data instances and the set of scores; and providing the attention filtering information to a machine learning, ML, technique or ML model.

Preferably, the tangible (or non-transitory) computer-readable medium further comprising data or instruction code, which when executed on a processor, causes the processor to implement one or more steps of the computer-implemented method of the first aspect, modifications thereof, and/or as herein described and the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
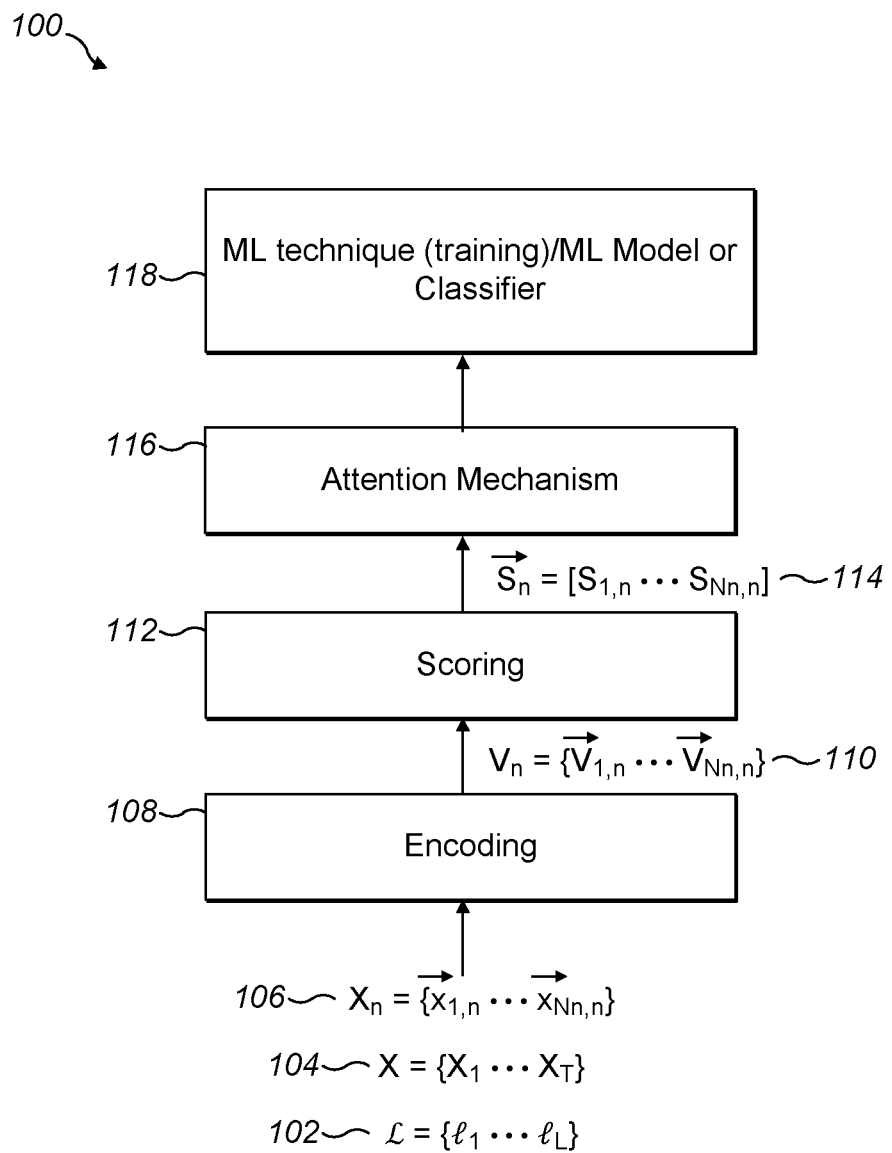
FIG. 1a is a schematic diagram illustrating an example system and attention mechanism according to the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The invention is directed towards an attention mechanism for filtering or extracting not only the most relevant data instances of a set of data instances from an input dataset (e.g. labelled training dataset), but also those relevant data instances of the set of data instances that enhance the training of an ML technique to generate an ML model, and/or enhances the modelling/classification of an ML model/classifier. The input dataset may include a plurality of sets of data (e.g. labelled training data, test data, or input data) for use in training the ML technique and/or for input to a ML model or classifier. The attention mechanism may improve the training of an ML technique to generate an improved ML model or classifier for modelling one or more relationships represented by a set of labels $\mathcal{L}$ by filtering out what is considered irrelevant or poor training data in relation to the set of labels $\mathcal{L}$. The attention mechanism may improve the input dataset to a ML model and/or classifier, which may be trained to classify or model relationship(s) represented by the set of label(s) $\mathcal{L}$ and for outputting a model estimate or classification of an input set of data in relation to $\mathcal{L}$, by filtering out what may be considered irrelevant or poor data instances in the set of data alleviating such data instances from adversely biasing the ML model/classifier output.

For simplicity, the following description uses MIL on natural language processing, by way of example only, to describe an attention mechanism according to the invention. Although the present invention may be described based on natural language processing in which the labelled training dataset is based on sentences from a corpus of literature/citations, it is to be appreciated by the skilled person that the invention may use any type of labelled training dataset as the application demands. For example, an image processing application may require a labelled training dataset X based on data representative of images or image portions from a corpus of images, which are associated with a set of relationships represented by a set of label(s) $\mathcal{L}$ that are to be modelled by a ML model or classifier. Alternatively or additionally, each data instance may include an image or image portion extracted from an image or a corpus of images, said each data instance may describe an object in an image, where set of label(s) $\mathcal{L}$ may be associated with or mapped to one or more objects. For example, image portions may be extracted from an image that may include image patches or portions that correspond to an object or a portion of an object in the image (e.g., a tumor).

The attention mechanism may use an attention neural network to determine attention filtering information for each set of data based on calculating attention relevancy weights (also known as attention scores or attention relevancy scores) that represent the relevancy of each data instance (e.g. a labelled training data instance) in each set of data, a set of scores or potentials in relation to each set of data, and using prior knowledge of the relationships between pairs of data instances (e.g. every pair of training data instances). The attention filtering information in relation to an input dataset may be provided to an ML technique, ML model and/or classifier in place of the input dataset.

ML technique(s) are used to train and generate one or more trained models or classifiers having the same or a similar output objective associated with input data. ML technique(s) may comprise or represent one or more or a combination of computational methods that can be used to generate analytical models, classifiers and/or algorithms that lend themselves to solving complex problems such as, by way of example only but is not limited to, prediction and analysis of complex processes and/or compounds; classification of input data in relation to one or more relationships. ML techniques can be used to generate analytical models associated with compounds for use in the drug discovery, identification, and optimization and other related informatics, chem(o)informatics and/or bioinformatics fields.

Examples of ML technique(s) that may be used by the invention as described herein may include or be based on, by way of example only but is not limited to, any ML technique or algorithm/method that can be trained on a labelled and/or unlabelled datasets to generate a model or classifier associated with the labelled and/or unlabelled dataset, one or more supervised ML techniques, semi-supervised ML techniques, unsupervised ML techniques, linear and/or non-linear ML techniques, ML techniques associated with classification, ML techniques associated with regression and the like and/or combinations thereof. Some examples of ML techniques may include or be based on, by way of example only but is not limited to, one or more of active learning, multitask learning, transfer learning, neural message parsing, one-shot learning, dimensionality reduction, decision tree learning, association rule learning, similarity learning, data mining algorithms/methods, artificial neural networks (NNs), deep NNs, deep learning, deep learning ANNs, inductive logic programming, support vector machines (SVMs), sparse dictionary learning, clustering, Bayesian networks, reinforcement learning, representation learning, similarity and metric learning, sparse dictionary learning, genetic algorithms, rule-based machine learning, learning classifier systems, and/or one or more combinations thereof and the like.

Some examples of supervised ML techniques may include or be based on, by way of example only but is not limited to, ANNs, DNNs, association rule learning algorithms, a priori algorithm, Eclat algorithm, case-based reasoning, Gaussian process regression, gene expression programming, group method of data handling (GMDH), inductive logic programming, instance-based learning, lazy learning, learning automata, learning vector quantization, logistic model tree, minimum message length (decision trees, decision graphs, etc.), nearest neighbour algorithm, analogical modelling, probably approximately correct learning (PAC) learning, ripple down rules, a knowledge acquisition methodology, symbolic machine learning algorithms, support vector machines, random forests, ensembles of classifiers, bootstrap aggregating (BAGGING), boosting (meta-algorithm), ordinal classification, information fuzzy networks (IFN), conditional random field, anova, quadratic classifiers, k-nearest neighbour, boosting, sprint, Bayesian networks, Nave Bayes, hidden Markov models (HMMs), hierarchical hidden Markov model (HHMM), and any other ML technique or ML task capable of inferring a function or generating a model from labelled training data and the like.

Some examples of unsupervised ML techniques may include or be based on, by way of example only but is not limited to, expectation-maximization (EM) algorithm, vector quantization, generative topographic map, information bottleneck (IB) method and any other ML technique or ML task capable of inferring a function to describe hidden structure and/or generate a model from unlabelled data and/or by ignoring labels in labelled training datasets and the like. Some examples of semi-supervised ML techniques may include or be based on, by way of example only but is not limited to, one or more of active learning, generative models, low-density separation, graph-based methods, co-training, transduction or any other a ML technique, task, or class of supervised ML technique capable of making use of unlabeled datasets and labelled datasets for training (e.g. typically the training dataset may include a small amount of labelled training data combined with a large amount of unlabeled data and the like.

Some examples of artificial NN (ANN) ML techniques may include or be based on, by way of example only but is not limited to, one or more of artificial NNs, feedforward NNs, recursive NNs (RNNs), Convolutional NNs (CNNs), autoencoder NNs, extreme learning machines, logic learning machines, self-organizing maps, and other ANN ML technique or connectionist system/computing systems inspired by the biological neural networks that constitute animal brains and capable of learning or generating a model based on labelled and/or unlabelled datasets. Some examples of deep learning ML technique may include or be based on, by way of example only but is not limited to, one or more of deep belief networks, deep Boltzmann machines, DNNs, deep CNNs, deep RNNs, hierarchical temporal memory, deep Boltzmann machine (DBM), stacked Auto-Encoders, and/or any other ML technique capable of learning or generating a model based on learning data representations from labelled and/or unlabelled datasets.

The attention mechanism according to the invention may be applied to various ML learning techniques based on multiple-instance learning (MIL). In MIL, an input dataset X may include a plurality of sets of data $\{X_1, \ldots, X_n, \ldots, X_D\}$, for $D \geq 1$ is the number of sets of data in the input dataset X, in which each set of data further includes a plurality of data instances $\{x_{1,n}, \ldots, x_{N_n,n}\}$, where $N_n$ is the number of data instances in the n-th set of data $X_n$. For training ML techniques, the input dataset X may be a labelled training dataset that includes a plurality of sets of data $\{X_1, \ldots, X_n, \ldots, X_T\}$, for $T \geq 1$ is the number of sets of labelled training data (a.k.a. a set of labelled bags) in the input dataset X. For ML models and/or classifiers, the input dataset X may be one or more input datasets for input to an ML model or classifier (trained or generated by an ML technique) to determine, predict, or classify whether a relationship exists between entities described by the input dataset. The attention mechanism may be configured to enable filtering of the input dataset X such that the most relevant data instances are used during either training of an ML technique/model and/or test-time prediction and implementation of the trained model.

Typically, ML techniques may receive a labelled training dataset in which each training data instance is a labelled feature or encoding vector. An ML technique can be trained to generate a ML model or classifier based on the labelled training dataset. In MIL, the input dataset X may be a labelled training dataset X that includes a plurality of labelled sets of training data $\{X_1, \ldots, X_n, \ldots, X_T\}$, where $T \geq 1$ is the number of labelled sets of training data. Each labelled set of training data (a.k.a. a set of labelled bags)

further includes a plurality of training data instances $\{z_{1,n}, \ldots, x_{i,n}, \ldots, x_{N_n,n}\}$, where $N_n$ is the number of training data instances in the n-th labelled set of training data $X_n$. Each labelled set of training data $X_n$ may be associated with one or more relationship/fact represented by label value from a set of binary or non-binary labels $\mathcal{L}=\{\ell_1, \ldots, \ell_L\}$, where L is the number of relationships/facts that are to be modelled and/or classified. Each training data instance may be assumed to be associated with the same label $\ell_j$ in relation to a relationship/fact and represents evidence supporting the relationship/fact represented by label $\ell_j$ being, by way of example only but not limited to, true or false or other binary/non-binary label. Each training instance may be represented as a feature encoding vector in K-dimensional space. Thus, the labelled training dataset X, may be used to train a ML technique to generate an ML model and/or classifier as a function $f(X)$ that may be used to model and/or classify the relationship(s) represented by the set of labels $\mathcal{L}$ when given an input dataset X.

The n-th labelled set of training data $X_n$ includes a plurality of training data instances $\{x_{1,n}, \ldots, x_{i,n}, \ldots, x_{N_n,n}\}$ in which each training instance $x_{i,n}$ is potential evidence for a relationship or fact represented by label $\ell_j$ being true or false (e.g. $\ell_j=F, \ell_j \in \{T,F\}$). For example, in relationship extraction in natural language processing the label, $\ell_j$ may represent a particular relationship/fact describing the relationship or a relation between two or more entities. For example, in gene/protein field, the relation may be "A regulates B", where entities A and B are compounds, proteins and/or targets etc. Each training instance $x_{i,n}$ may be representative of a sentence extracted from a corpus of literature/citation(s) containing the two or more entities (e.g. a sentence containing "A" and "B"). The n-th labelled set of training data $X_n$ may include data representative of all sentences from the corpus of literature/citations containing the two or more entities (e.g. "A" and "B") and their association with relationship label $\ell_j$. Each other labelled set of training data may include all sentences from the corpus of literature/citations in relation to another two or more entities and their association with the corresponding relationship label.

Given the typically large amount of literature/citations, the reliability of the sentence(s) $x_{i,n}$ as evidences for a potential relationship extraction are mostly unknown, so it is useful to train a classifier/model that can reliably extract this evidence from the literature. The attention mechanism according to the invention may be used to filter input training datasets X using prior knowledge of relationships between the training data instances. This can be used to train reliable ML models/classifiers for relationship extraction for input datasets X.

Typically, ML models or classifiers, which have been trained by an ML technique to model and/or classify relationship(s) represented as a set of labels $\mathcal{L}$, may receive input dataset $X=\{X_1, \ldots, X_n, \ldots, X_D\}$, where $X_n=\{x_{1,n}, \ldots, x_{p,n}, \ldots, x_{N_n,n}\}$, $D \geq 1$ is the number of sets of input data that require modelling or classification, and $N_n \geq 1$ is the number of data instances in the n-th set of data $X_n$ for determining whether the data instances are associated with the set of labels $\mathcal{L}$ and/or for determining whether each set of input data $X_n$ represents evidence supporting a relationship/fact represented by label $\ell_j$ in the set of labels $\mathcal{L}$. For example, in relationship extraction in natural language processing, $X_n$ may be a set of data describing a relationship between two or more entities. As an example, each data instance may be a sentence extracted from a corpus of literature, said sentence describing a relationship between multiple entities. For simplicity, a set of data $X_n$ may be mapped to a label $\ell_j$ representing a particular relationship. A set of data $X_n$ may include those sentence data instances that are considered to describe or are similar to the relationship represented by a label $\ell_j$. In another example, each data instance may be an image or image portion extracted from a corpus of image data, said image or image portion may also describe or are similar to a relationship between one or more entities or a multiple of entities that is represented by the label $\ell_j$. A set of data $X_n$ may include those image data instances that are considered to describe or are similar to the relationship represented by label $\ell_j$.

For example, in gene/protein fields, the relation may be "C regulates D", where entities C and D are compounds, proteins and/or targets etc. Each input data instance $x_{i,n}$ may include data representative of a sentence extracted from a corpus of literature/citation(s) containing the two or more entities (e.g. a sentence containing "C" and "D"). The n-th set of input data $X_n$ may include data representative of all sentences from the corpus of literature/citations containing the two or more entities (e.g. "C" and "D"). When input to the ML model or classifier, the ML model or classifier may attempt to determine whether or how the set of input data $X_n$ is associated with the relationship(s) represented by a set of label(s) $\mathcal{L}=\{\ell_1, \ldots, \ell_L\}$, each representing a relationship/fact, where L is the number of relationships/facts that are being modelled. Each other set of input data may include other sentences from the corpus of literature/citations in relation to another two or more entities, where the ML model or classifier may be able to determine whether or how they are associated with the relationship(s) represented by a set of label(s) $\mathcal{L}$.

The attention filtering information for each set of data $X_n$ may include, by way of example only but is not limited to, data representative of filtered set(s) of data, attention relevancy weights, and/or prior knowledge data from one or more prior knowledge networks/graphs associated with each set of data. Prior knowledge of one or more relationships between pairs of data instances may be represented as a prior knowledge network or graph providing an indication of the relationship(s) between pairs of data instances.

Each prior knowledge network/graph may be coupled to the attention network of the attention mechanism for assisting in determining attention filtering information, such as by way of example only but not limited to, calculating the attention relevancy weights. The attention relevancy weights may be output from the attention mechanism as an attention vector, where each attention relevancy weight represents the relevancy of the corresponding data instance in a set of data $X_n$. The attention relevancy weights may be used to "filter" the data instances to ensure only the most relevant are used.

For example, when training a ML technique to generate a ML model or classifier, the attention mechanism provides a filtering function by providing attention filtering information to the ML technique. This allows the ML technique to use only the most relevant labelled training data instances from the labelled set of training data during training of an ML model or classifier. This further optimises or enhances the generated ML model or classifier as it will not become over trained or fixated on irrelevant information, which may otherwise skew or bias the ML model or classifier in relation to the set of labels $\mathcal{L}$. The attention mechanism applies prior knowledge of a relationship between pairs of labelled training data instances in each set of training data, which may be represented as a prior knowledge network or graph. There may be multiple different relationships represented by the set of labels $\mathcal{L}$, which may be represented by a single prior knowledge network or graph or which may be represented by a plurality of prior knowledge networks/graphs. This prior information may be input to the attention network for calculating an attention relevancy weight for each labelled training data instance of a set of labelled training data. Alternatively or additionally, this prior information may be communicated to the ML technique for use in its loss or cost function when generating the ML model or classifier.

FIG. 1a is a schematic diagram illustrating an example system 100 using an attention mechanism 116 for assisting in filtering an input dataset X 104 including a plurality sets of data $\{X_1, X_n, \ldots, X_L\}$, in which each set of data $X_n$ 106 includes a number of $N_n$ data instances $\{x_{1,n}, \ldots, x_{i,n}, \ldots, x_{N_n,n}\}$, each of which may or may not be vectors. The input dataset X 104 may be used for, by way of example only but is not limited to, either: a) training an ML technique to generate a ML model or classifier to model relationship(s) represented by a set of labels $\mathcal{L} = \{\ell_1, \ldots, \ell_L\}$ 102; or b) modelling or classifying whether input dataset X 104 exhibits or is associated with the set of labels $\mathcal{L}$ 102. In this example, when training an ML technique, the input dataset X 104 may be a labelled training dataset $X = \{X_1, \ldots, X_n, \ldots, X_T\}$, where T≥1 is the number of labelled sets of training data. When modelling and/or classifying using an ML model or classifier trained for identifying or according to the set of labels $\mathcal{L}$ the input dataset X 104 may be an input dataset $X = \{X_1, \ldots, X_n, \ldots, X_D\}$, where D≥1, which may comprise extracted data instances from a corpus of data (e.g. corpus of text/literature/articles or images etc.) requiring modelling and/or classification.

The system 100 includes an encoding module 108 coupled to a scoring module 112, the attention mechanism 116 and an machine learning (ML) module 118. The encoding module 108 may be configured to transform each input set of data $X_n$ 106 into a corresponding set of feature encoding vectors 110 in K-dimensional space. The K-dimensional feature encoding vectors are an embedding of the corresponding data instances of the n-th set of data $X_n = \{x_{1,n}, \ldots, x_{i,n}, \ldots, x_{N_n,n}\}$, for $1 \leq i \leq N_n$. The encoding module may be based on an encoding network (e.g. a neural network structure) that may be trained to transform each input set of data $X_n$ 106 into the corresponding set of feature encoding vectors $V_n = \{\vec{v}_{1,n}, \ldots, \vec{v}_{N_n,n}\}$ 110 in K-dimensional space. The scoring module 112 may be configured to generate a scoring vector $\vec{s}_n = [s_{1,n}, \ldots, s_{i,n}, \ldots s_{N_n,n}]$ 114 of scores $s_{i,n}$ (also known as potentials) corresponding to each feature encoding vector in the set of feature encoding vectors 110. The scoring module 112 may be based on a scoring network (e.g. based on a neural network structure) that may be trained to generate a score vector $\vec{s}_n = [s_{1,n}, \ldots, s_{i,n}, \ldots s_{N_n,n}]$ given the set of feature encoding vectors 110 as input. The score vector may be input to the attention mechanism 116.

The attention mechanism 116 is configured to provide attention filtering information based on the encoding vectors and scoring vectors to ML module 118, which assists and/or enables filtering of the input sets of data $X_n$ 106 and hence input dataset X 104. The attention mechanism 116 receives a set of scores 114 for each set of data 106 of the input dataset 104. The attention mechanism 116 uses the set of scores 114 and also prior knowledge of one or more relationships between the data instances in said each set of data 106 to determine attention filtering information. Determining the attention filtering information may include calculating attention relevancy weights corresponding to the data instances of each set of data 106. The attention filtering information may be provided, by the attention mechanism 116 to ML module 118 (e.g. an ML technique, ML model or classifier) for processing.

For example, when the ML module 118 is configured to implement the training of an ML technique for generating an ML model or classifier, the input dataset X 104 may be a labelled training dataset $X = \{X_1, \ldots, X_n, \ldots, X_T\}$, where T≥1 is the number of labelled sets of training data. The attention mechanism 116 outputs attention filtering information that is used by the ML module 118 for training the ML technique. The attention filtering information is used to identify and/or filter the training dataset X 104 such that a set of relevant training data instances of the training dataset X 104 are used that enhance the training of the ML model or classifier.

In another example, when the ML module 118 is configured to implement an ML model or classifier trained for identifying or classifying input datasets having relationship(s) represented by a set of labels $\mathcal{L}$, the input dataset X 104 may be an input dataset $X = \{X_1, \ldots, X_n, \ldots, X_D\}$, where D≥1, comprising extracted data instances requiring modelling and/or classification based on the set of labels $\mathcal{L}$. The attention mechanism 116 outputs attention filtering information that is used by the ML module 118 for extracting a set of data instances of the input set of data 106 as represented by the corresponding subset of the encoded data 110 obtained via 108 that are relevant for modelling and/or classification by the ML model or classifier. The attention mechanism 116 removes or accentuates the more irrelevant data instances of the input set of data that may otherwise bias the modelling and/or classification of the ML model or classifier.

Thus, a plurality of training data instances $x_{1,n}, \ldots, x_{N_n,n}$ in which each training data instance includes data representative of two or more of the same entities may be considered to be evidence supporting a relationship/fact represented by, in this example, label $\ell_i \in \{T, F\}$. Each labelled set of training data $X_n$ may be mapped to or associated with one or more relationship/facts $\ell_i \in \{T, F\}$ from a set of relationships/facts represented by labels $\mathcal{L}_i = \{\ell_1, \ldots, \ell_i, \ldots, \ell_L\}$ where L is the number of relationships/facts that are to be modelled. Thus, the labelled training dataset X, may be used to train a ML technique to generate a ML model $f(X)$ that may be used to model the relationship(s) represented by the set of labels $\mathcal{L}$ given an input dataset X.

Although the present invention may be described based on natural language processing in which the labelled training dataset is based on sentences from a corpus of literature/citations, it is to be appreciated by the skilled person that the invention may use any type of labelled training dataset as the application demands. For example, an image processing application may require a labelled training dataset X based on data representative of images or image portions from a corpus of images, the images may include objects which are associated with a set of labels $\mathcal{L}$ that are to be modelled by a classifier.

Figure 1B:
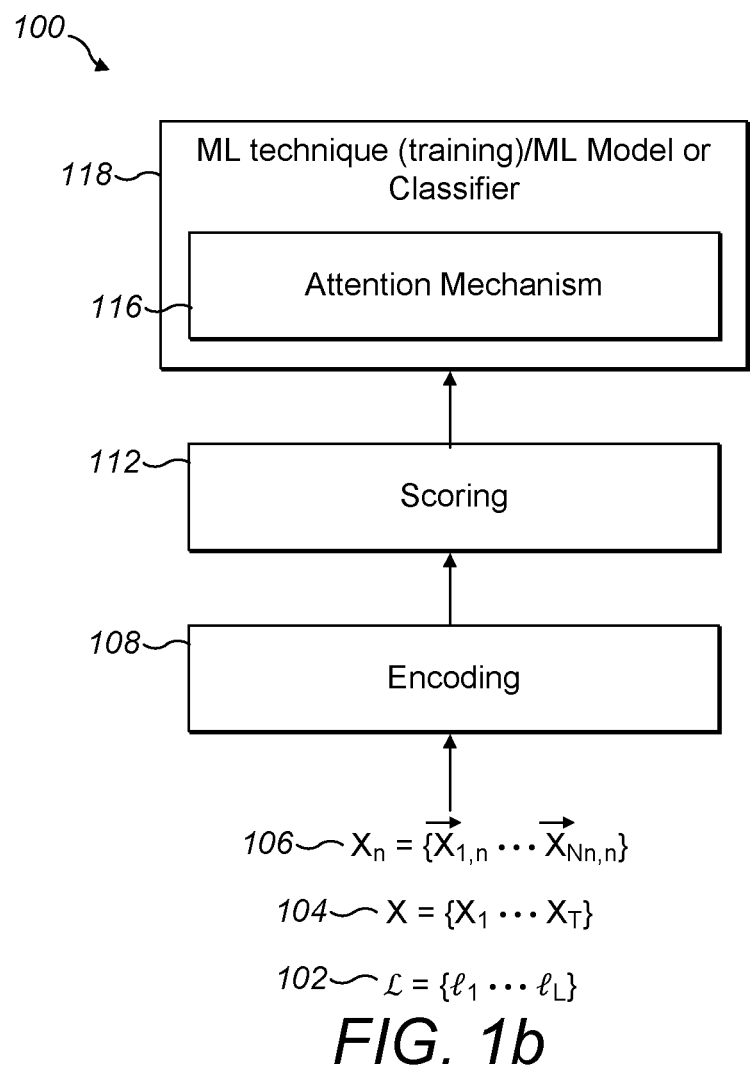
FIG. 1b is schematic diagram illustrating another example system and attention mechanism according to the invention.

FIG. 1b is schematic diagram illustrating another example system 100 in which the attention mechanism 116 may be a component of ML module 118. If the ML module 118 is configured to implement an ML technique for generating an ML model or classifier, the attention mechanism 116 may be implemented as part of the ML technique. If the ML module 118 is configured to implement an ML model and/or a classifier, the attention mechanism 116 may be implemented as a part or component of the ML model and/or classifier. The attention mechanism 116 may be a "plug-in" component or module that may be a front-end to an ML technique, ML model and/or classifier such that it is the attention mechanism 116 that is configured to receive data representative of the input sets of data $X_n$ 106 via encoding module 108 and/or scoring module 112. In this way, the attention mechanism 116 may allow filtering of the input sets of data $X_n$ 106 that enhances the ML models/classifiers generated by any ML technique and/or enhances the performance of the predictive/classification capability of ML models and/or classifiers implemented by ML module 118.

Figure 1C:
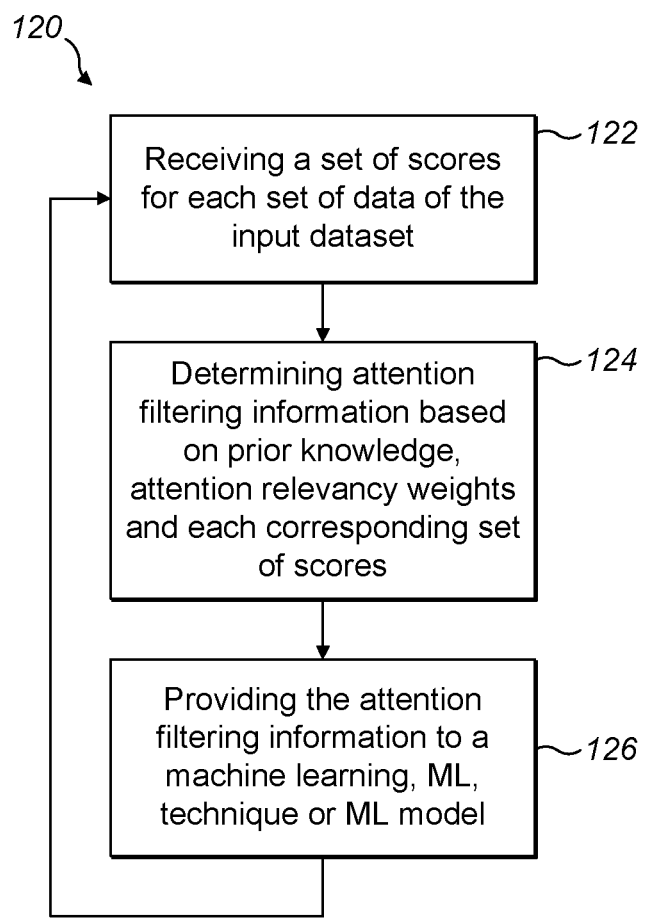
FIG. 1c is a flow diagram illustrating an example process for filtering input datasets according to the invention.

FIG. 1c is a flow diagram illustrating an example process 120 for use by the attention mechanism 116 of FIGS. 1a and/or 1b for filtering one or more sets of data 106 of an input dataset 104 according to the invention. Referring to FIGS. 1a and/or 1b, the process 120 includes, for each set of data 106, the following steps of: In step 122, a set of scores 114 may be received for each set of data 106 of the input dataset 104. In step 124, the attention filtering information for each set of data is determined based on prior knowledge of one or more relationships between the data instances in said each set of data 106 and calculating attention relevancy weights corresponding to the data instances and each set of scores 114. The attention filtering information may further be determined based on the data itself via the set of scores (e.g. a scoring vector) 114 and/or an overall loss objective. In step 126, the attention filtering information is provided to a machine learning, ML, technique or ML model. The process 120 may repeat itself for further sets of data from the input dataset 104.

Calculating the attention relevancy weights may include searching or optimising a set of attention relevancy weights that minimise an overall loss objective such as, by way of example only but not limited to, a cost function based on the set of scores 114 and prior knowledge of one or more relationships between the data instances in said each set of data 106. The calculating the attention relevancy weights may further include searching and/or optimising an attention relevancy weight vector, over a set of attention relevancy weight vectors or all attention relevancy weight vectors, that minimises a function based on a similarity between an attention relevancy weight vector and a scoring vector and prior knowledge between data instances of said set of data. The searching and/or optimising over the set of attention relevancy weight vectors (e.g. set of attention relevancy weights) may include, by way of example only but it not limited to, using one or more search or optimisation process (es) from the group of: a neural network structure configured for determining a set of attention relevancy weights that minimise the cost function; one or more ML techniques configured or trained for determining a set of attention relevancy weights that minimise the cost function; one or more numerical methods or iterative numerical methods configured for determining a set of attention relevancy weights that minimise the cost function; and/or any other process, algorithm, structure or method for determining a set of attention relevancy weights that may be used to minimise the cost function.

In an example, the attention filtering information may further include filtering the data instances in each set of data 106 by calculating a weighted combination of the calculated attention relevancy weights that minimise the cost function with each feature encoding vector 110 associated with the corresponding data instances of said set of data 106. In which step 126 may further include providing the attention filtering information, which includes data representative of the filtered data instances, to the ML technique or ML model/classifier.

In another example, determining the attention filtering information may further include the steps of: calculating attention weights based on an attention function of the scoring vector 114. For example, an attention function may include a SOFTMAX attention function, where an attention relevancy weight is calculated in relation to each score of the set of scores 114. In another example, an attention function may be based on a MAX attention function, which calculates an attention relevancy weight in relation to the maximum score of the set of scores, and assigns the remaining attention relevancy weights either a 0 or minimal value weight. Further examples may include, by way of example only but not limited to, a sparsemax attention function or any suitable attention function for calculating attention weights based on at least the set of scores associated with the set of data. Based on the calculated attention relevancy weights, a weighted combination of the attention relevancy weights with the corresponding feature encoding vectors associated with the corresponding data instances of said set of data is calculated; and step 126 may further include providing the providing data representative of the weighted combination and the prior knowledge of one or more relationships between data instances as attention filtering information to the ML technique or ML model/classifier. The ML technique or ML model/classifier may use the attention filtering information for further filtering of the input dataset X.

In either example, the attention relevancy weights may form an attention relevancy weight vector, each attention relevancy weight in the attention relevancy weight vector corresponding to a feature encoding vector in the set of feature encoding vectors 114. Each feature encoding vector in the set of feature encoding vectors 114 corresponding to a data instance in the set of data 106. The attention filtering information further includes filtering the set of data instances by calculating a weighted combination of the attention relevancy weight vector with the set of feature encoding vectors of the corresponding set of data 106. The weighted combination may be based on a linear weighted combination such as, by way of example only but is not limited to, a Hadamard multiplication between a matrix of feature encoding vectors associated with the corresponding set of data and the associated attention relevancy weight vector.

As described with reference to FIGS. 1a-1c, the attention filtering information may include or be based on prior knowledge of one or more relationships between data instances of a set of data. The prior knowledge of one or more relationships may include a set of prior knowledge networks or graphs, in which each prior knowledge network or graph represents a particular type of relationship between the data instances. For example, one or more prior knowledge networks or graphs may include a network or graph from the group of: a citation network or graph providing an indication of a citation relationship between data instances; or a reference network or graph providing an indication of a relationship between data instances located in the same document in a corpus of literature. The prior knowledge network or graph may include multiple relationships between data instances in the same prior knowledge network or graph.

Figure 1D:
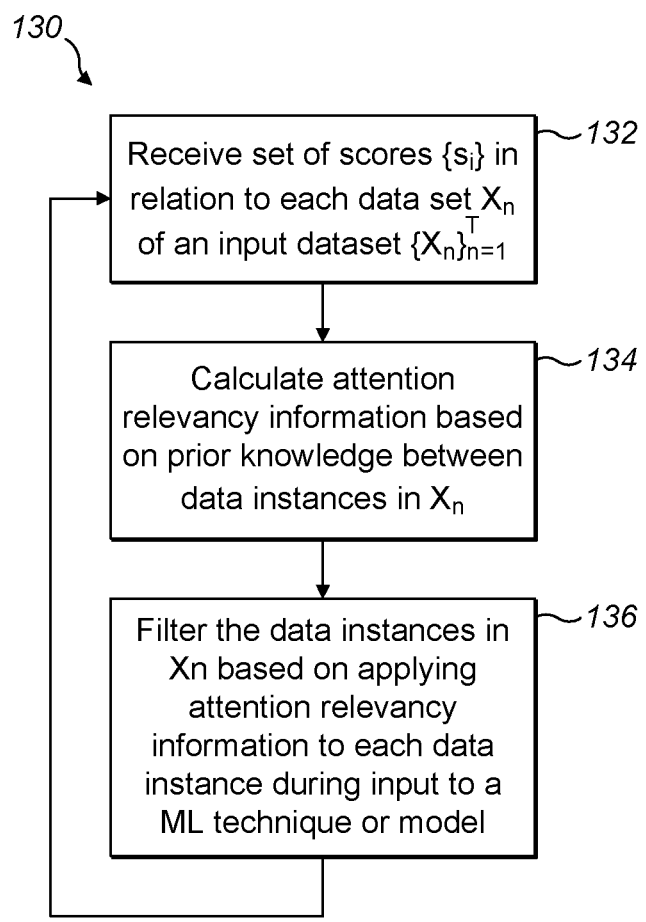
FIG. 1d is a flow diagram illustrating an example process of attention filtering input datasets according to the invention.

FIG. 1d is another flow diagram illustrating an example process 130 of attention filtering one or more sets of data 106 of an input dataset X 104 for use by attention mechanism 116 of FIG. 1a or 1b according to the invention. The input dataset X 104 includes one or more sets of data $X_n$ 106 or a plurality of sets of data $X_n$ 106, where each set of data comprises a plurality of data instances. The process 130 may include, for each set of data $X_n$ 106, the following steps of: In step 132, receiving a set of scores 114 associated with each set of data 106 of the input dataset 104. If the input dataset 104 is a labelled training dataset, then each set of data 106 may include multiple data instances representative of a similar known relationship between one or more entities of each data instance that is represented by a label $\ell_l$ of a set of relationship(s) represented by a set of labels $\mathcal{L}$ 102. Such a set of data 106 may be input for training an ML technique to generate an ML model/classifier, or for testing an ML model/classifier. If the input dataset 104 includes one or more set(s) of data $X_n$ 106 extracted from a corpus of data (e.g. a corpus of literature or images), each set of data $X_n$ 106 may include similarly grouped multiple data instances, then the data instances of each set of data $X_n$ 106 may have an unknown relationship between one or more entities of the data instances. Such set(s) of data 106 may be input for testing an ML model/classifier or for input to an ML model/classifier for prediction/classification and/or relationship extraction etc. In step 134, attention relevancy information (aka attention filtering information) is calculated for each set of data 106 of the input dataset 104 based on prior knowledge of one or more relationships between the data instances in said each set of data 106. The attention filtering information may further be determined based on the data itself via the set of scores (e.g. a scoring vector) 114 and/or an overall loss objective. The data instances in each set of data 106 may be filtered based on applying the corresponding attention relevancy information or weights to each data instance of the set of data 106 during input to a ML technique, ML model or classifier. The steps of process 130 may be repeated for each set of data $X_n$ 106 of an input dataset. The steps of process 130 may further include one or more of the steps of process 120 and/or modifications to those steps as described with reference to FIGS. 1a-1c.

Figure 2A:
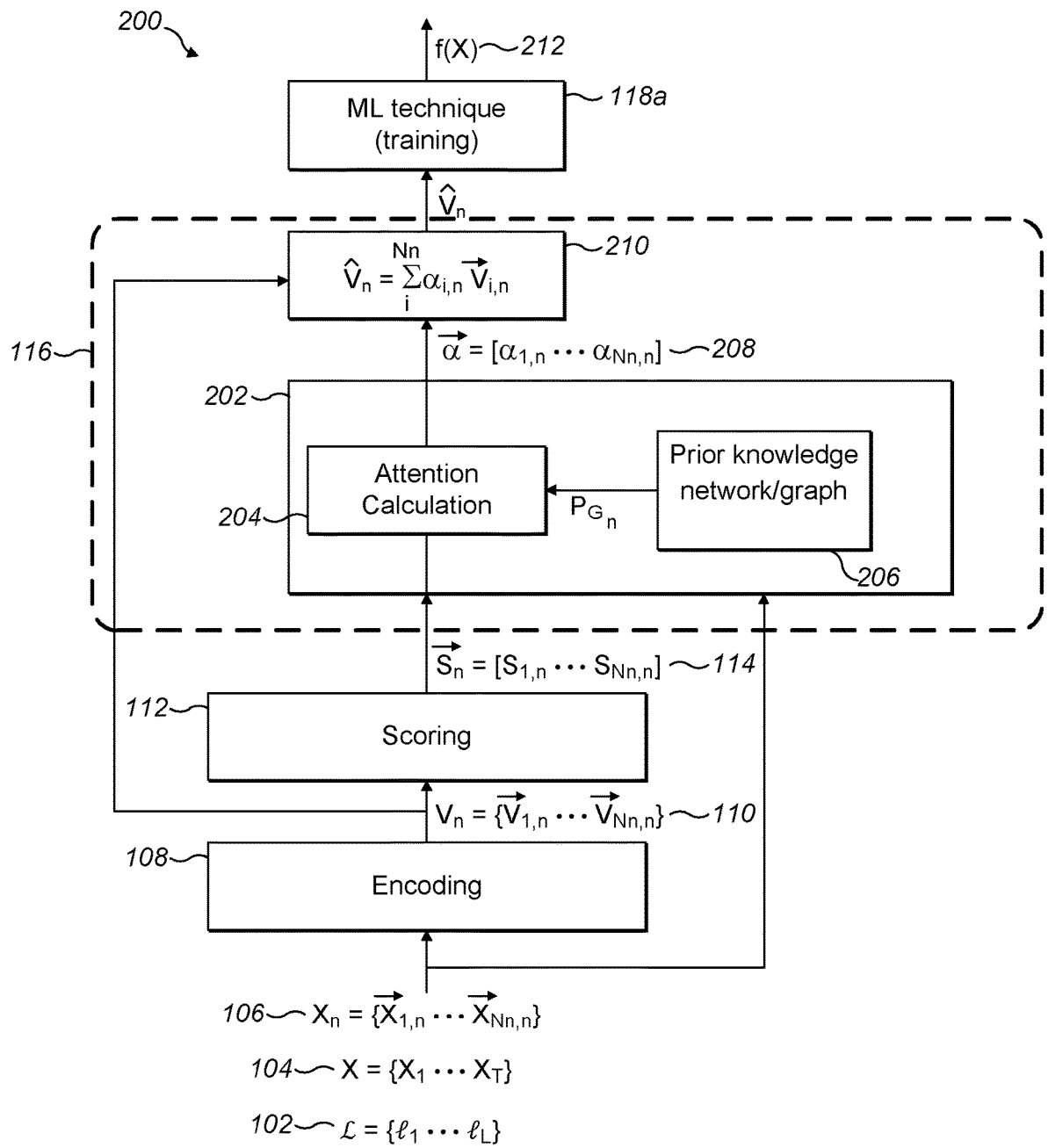
FIG. 2a is a schematic diagram illustrating an example system and attention mechanism according to the invention.

FIG. 2a is a schematic diagram illustrating an example multi-instance learning system 200 using an attention mechanism 116 according to the invention. For simplicity, reference numerals from FIGS. 1a and 1b are used for the same or similar components. In this example, the MIL training system 200 is used to train a ML technique 118a to generate a ML model $f(X, \mathcal{L})$ 212 for modelling the set of relationships represented by a set of label(s) $\mathcal{L} = \{\ell_1, \ldots, \ell_l, \ldots, \ell_L\}$ 102, where L is the number of relationships/facts to be modelled. The ML technique 118a may also be used to generate a classifier $f(X, \mathcal{L})$ for classifying input datasets X in relation to the set of labels $\mathcal{L}$. In this example, a labelled training dataset X 104 includes a plurality of labelled sets of training data $\{X_1, \ldots, X_n, \ldots, X_T\}$, where T is the number of labelled sets of training data. The n-th labelled set of training data $X_n$ 106 comprises a plurality of training data instances $X_n = \{x_{1,n}, \ldots, x_{i,n}, \ldots, x_{N_n,n}\}$, where $N_n$ is the number of training data instances in the n-th labelled set of training data $X_n$ 106, which may be different to any other set. Each of the training data instances may be, by way of example only but is not limited to, a vector of size $K \geq 1$ (e.g. a feature encoding vector). It is to be appreciated by the skilled person that, in general, the training data instances may have a representation more complex and/or nuanced than a feature encoding vector of size K. The n-th labelled set of training data $X_n$ has a label indicating that it is associated or supports the relationship/fact represented by a label $\ell_l \in$ for $1 \leq l \leq L$. For simplicity, the n-th labelled set of training data $X_n$ is mapped to or has a label $\ell_l$. Thus, each training data instance of the set of training data $X_n$ may represent evidence supporting the relationship/fact represented by label $\ell_l$ being, by way of example only but not limited to, a binary value (e.g. true or false) or a non-binary value representing a general label. Although the n-th set of training data $X_n$ is described as, by way of example only but is not limited to, being mapped or associated with label $\ell_l$ for $1 \leq l \leq L$, this is by way of example only, it is to be appreciated by the skilled person that the remaining plurality of sets of data instances $X_j$ for $1 \leq j \neq n \leq T$ may be associated or mapped to a relationship based on any one of the labels $\ell_k \in \mathcal{L}$ for $1 \leq k \leq L$, where k may be equal to l, from the set of labels $\mathcal{L}$. Labels may be represented in the simplest cases using binary values when a relationship has only two possibilities (e.g. {true, false}, {T, F}, {-1, +1}, {0, +1} and any other binary value and the like). An example of a non-binary value may by when a relation represented by a label may have more than two possibilities. For example, a relationship may be that "protein A can positively or negatively regulate another protein B", which in this case may yield three possibilities {negative-regulation, no-relation, positive-regulation}. The labels for these possibilities can be represented by non-binary values {-1, 0, +1}. Thus, non-binary valued labels may be used to represent more complex relationships.

For example, in relationship extraction in natural language processing, $\ell_l$ may be a label representative of a particular relationship/fact describing the relationship between two or more entities (e.g. "A regulates B", where entities A and B are compounds, proteins and/or targets etc.). Each training instance $x_{1,n}$ may include data representative of a sentence extracted from a corpus of literature/citation(s) containing the two or more entities (e.g. a sentence containing "A" and "B"). The n-th labelled set of training data $X_n$ may include all sentences from the corpus of literature/citations containing the same or similar two or more entities (e.g. "A" and "B"). Although the n-th set of training data $X_n$ is described as, by way of example only but is not limited to, being mapped or associated with label $\ell_l$ for $1 \leq l \leq L$, this is by way of example only, it is to be appreciated by the skilled person that the other labelled sets of training data $X_j$ for $1 \leq j \neq n \leq T$ may include other sentences from the corpus of literature/citations containing other two or more entities different to those of $X_n$ that may be associated or mapped to the same or a different relationship as $X_n$ that is represented by any one of the labels $\ell_k \in \mathcal{L}$ for $1 \leq k \leq L$, where k may be equal to l, from the set of labels $\mathcal{L}$.

Although not shown, the following operation of system 200 may be iterated one or more times over the labelled training dataset X 104 until it is considered that the ML model 212 is validly trained. This may be tested using a held out set of the labelled training dataset X 104. Each of the encoding, scoring and attention modules 108, 112, and 116 may also include, where applicable or as demanded by the application, one or more neural network structures (e.g. recursive neural networks (RNNs), feedforward neural networks (FNNs) and the like) that may also be trained during training of the ML model 212.

Referring back to system 200, the n-th set of training data $X_n$ 106 is input to encoding module 108 which may include an embedding or encoding network that is configured to output a set of K-dimensional encoding vectors $V_n = \{\vec{v}_{1,n}, \ldots, \vec{v}_{N_n,n}\}$ 110. The embedding/encoding network may be based on a neural network trained to embed or encode the n-th set of training data $X_n$ 106 into the set of vectors $V_n = \{\vec{v}_{1,n}, \ldots, \vec{v}_{N_n,n}\}$ 110. The set of encoding vectors 110 are processed by a scoring module 112 (also known as a potential module), which may include a scoring network that generates a set or vector of scores (or potentials) $\vec{s}_n=[s_{1,n}, \ldots, s_{N_n,n}]$ 114, in which each score $s_{i,n}$ is associated with each encoding vector $\vec{v}_{i,n}$. The scoring module 112 may also be based on a neural network structure (e.g. an RNN or FNN), which may be trained during training of the ML model 212 to generate a score $s_{i,n}$ for each encoding vector $\vec{v}_{i,n}$.

The generated vector of scores $\vec{s}_n=[s_{1,n}, \ldots, s_{N_n,n}]$ 114, encoding vectors $V_n=\{\vec{v}_{1,n}, \ldots, \vec{v}_{N_n,n}\}$ 110, and the corresponding set of data $X_n$ 106 are passed to the attention mechanism 116, which includes an attention unit 202 for calculating an attention relevancy weight (or attention score) vector $\vec{\alpha}_n=[\alpha_{1,n}, \ldots, \alpha_{N_n,n}]$ 208 based on an attention calculation unit 204 (e.g. an attention network) coupled to a prior knowledge network/graph 206. The prior knowledge network/graph 206 inputs prior knowledge data $P_{G,n}$ representative of one or more known relationship(s) between each pair of training instances $x_{1,n}, x_{j,n} \in X_n$ for $1 \leq i \leq j \leq N_n$. The attention calculation unit 204 uses the prior knowledge data $P_{G,n}$ to estimate the best set of attention relevancy weights representing the relevancy of each training data instance in the labelled set of training data $X_n$ 106. The attention unit 202 outputs an attention relevancy weight vector $\vec{\alpha}_n=[\alpha_{1,n}, \alpha_{N_n,n}]$ 208 for use in filtering out those training data instances $x_{i,n}$ that are determined to not contribute to supporting the relationship represented by label $\ell_j$ or are determined not relevant to the labelled set of training data $X_n$ 106.

As an example, the attention calculation unit 204 may optimise an attention function to determine a suitable attention relevancy weight vector $\vec{\alpha}_n$ for each set of data $X_n$ for $1 \leq n \leq T$. This may be used in an attention filter 210 according to the invention. An example attention function for use in determining an optimal vector of attention relevancy weights $\vec{\alpha}_n$ for $1 \leq n \leq T$ may be based on:

$$\Lambda(\vec{s_n}) = \arg\min_{\vec{\alpha} \in \Delta^n} \left\{ \frac{1}{2} \|\vec{s_n} - \vec{\alpha_n}\|_2^2 + \sum_{(x_{i,n}, x_{j,n}) \in G} \lambda |\alpha_{i,n} - \alpha_{j,n}| \right\}$$

where $\Lambda(\cdot)$ is the attention function that maps a score vector $\vec{s}_n$ 114 to a probability distribution $\Delta^n=\{\alpha_i \geq 0, \Sigma \alpha_i=1\}$, G is the prior knowledge network/graph 206 that describes whether each pair of training data instances $(x_{i,n}, x_{j,n})$, for $1 \leq i \leq j \leq N_n$, have a relationship or not, $\lambda \in \mathbb{R}^+$ is a hyperparameter selected to adjust the contribution of the prior knowledge network/graph G 206.

The prior knowledge graph G 206 is used to encourage the attention calculation unit 204 (or attention network) to assign equal weights $\alpha_{i,n}$ and $\alpha_{j,n}$ to the pair of training data instances $(x_{1,n}, x_{j,n})$ should they be connected/related. The term will be positive if the pairing $(x_{i,n}, x_{j,n})$ are related but $\alpha_{i,n} \neq \alpha_{j,n}$ and, hence, can be considered to apply a penalty to the task of minimising $\Lambda(\vec{s}_n)$. If a pairing $(x_{i,n}, x_{j,n})$ is related, then the corresponding $\alpha_{i,n}$ and $\alpha_{j,n}$ should reflect this relationship by being, for example, equal for a "strong" relationship with each other or close to each other for a "medium" relationship. Furthermore, the size of this penalty will be proportional to $|\alpha_{i,n} - \alpha_{j,n}|$ and, hence, a greater penalty will be applied when the difference between the attention relevancy weights is greater. However, the attention calculation unit 204 may assign unequal weights $\alpha_{i,n}$ and $\alpha_{j,n}$ to training data instance pairings $(x_{i,n}, x_{j,n})$ which are not related by the prior knowledge network G without incurring a penalty in the task of minimising $\Lambda(\vec{s}_n)$. Thus, the solution obtained by minimising $\Lambda(\vec{s}_n)$ corresponds to a set of attention relevant weights or the attention relevancy weight vector $\vec{\alpha}$ that takes into account the relationships between the training data instances for each set of data $X_n$ for $1 \leq n \leq T$.

An attention filter 210 may be used by applying each attention vector $\vec{\alpha}_n$ 208 to the corresponding feature encoding vectors $V_n=\{\vec{v}_{1,n}, \ldots, \vec{v}_{N_n,n}\}$ 110 embedding/encoding the corresponding training data instances $\{x_{1,n}, \ldots, x_{i,n}, \ldots x_{N_n,n}\}$ of the n-th set of labelled training data $X_n$. The attention filter 210 acts as a filter that improves the training of ML technique 118a (or improving the output of a classifier) by blocking/attenuating the least relevant data instances and promoting the most relevant set of data instances.

The attention filter 210 may achieve filtering by generating an n-th context vector $\hat{v}_n$ based on summing a weighted combination of each attention relevancy weight $\alpha_{i,n}$ with the corresponding feature vector $\vec{v}_{i,n}$ to generate the n-th context vector $\hat{v}_n$ representing the most relevant feature encoding vectors/training instances of the labelled set of training data $X_n$. The attention filter 210 generates an n-th context vector $\hat{v}_n$ based on:

$$\hat{v}_n = \sum_{i=1}^{N_n} \alpha_{i,n} \vec{v}_{i,n}$$

The n-th context vector $\hat{v}_n$ is input as attention relevancy information for training the ML technique 118a, which generates an ML model $f(X)$ 212 for modelling the relationship represented by set of labels $\mathcal{L}$. The attention mechanism 116 processes each of a plurality of labelled sets of training data $\{X_1, \ldots, X_n, \ldots, X_T\}$, in which the relevant training data instances in each labelled set of training data are used or emphasised to train the ML technique 118a for generating the ML model $f(X)$ 212. Alternatively or additionally, the attention mechanism 116 may be configured to process each of a plurality of labelled sets of training data $\{X_1, \ldots, X_n, \ldots, X_T\}$, in which only the relevant training data instances in each labelled set of training data are used to train the ML technique 118a for generating the ML model $f(X)$ 212.

Figure 2B:
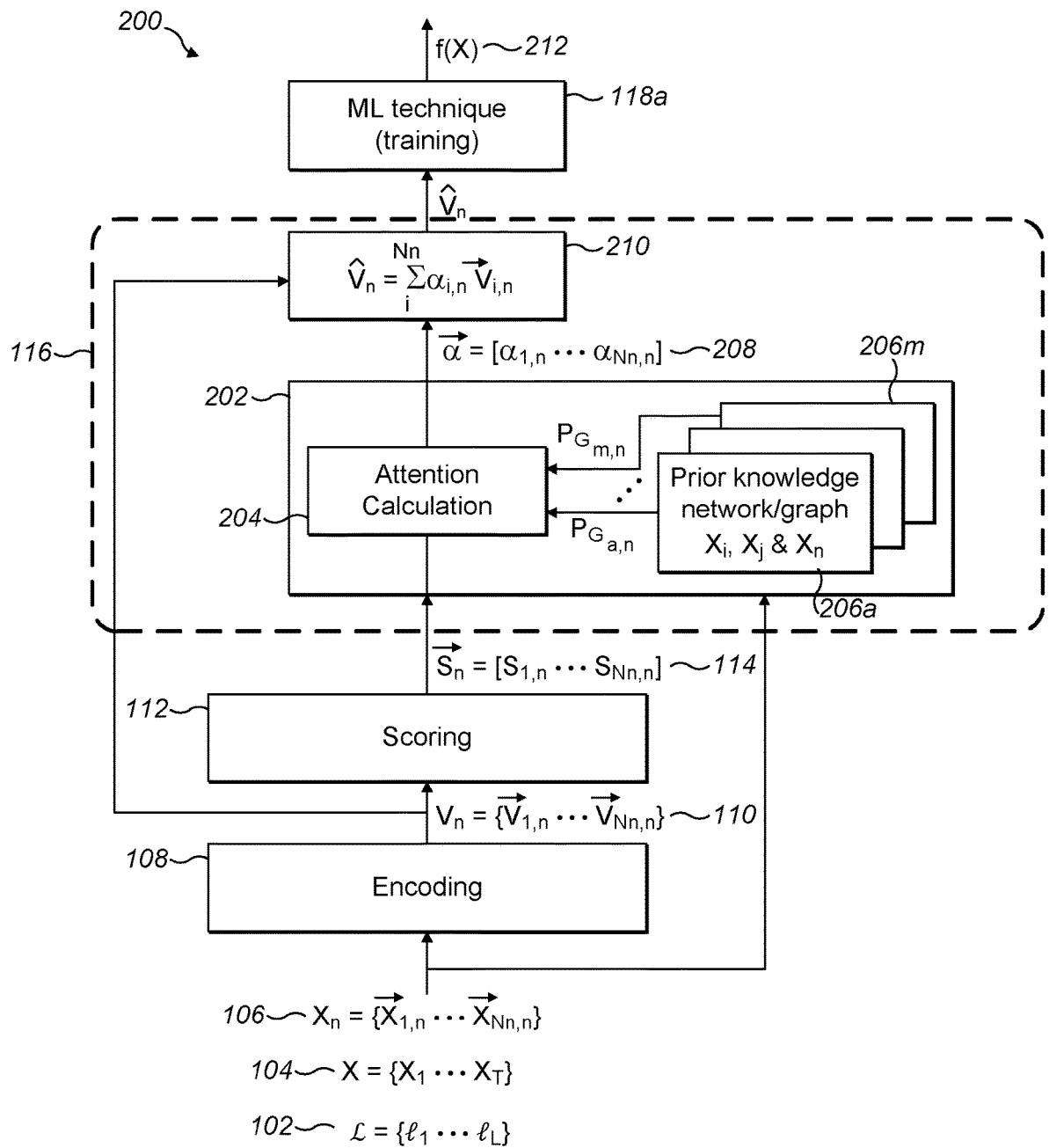
FIG. 2b is a schematic diagram illustrating another example system and attention mechanism according to the invention.

FIG. 2b is a schematic diagram illustrating example system 200 using a modified attention mechanism 116 according to the invention. Most of the components of system 200 of FIG. 2a are the same or similar except the attention mechanism 116 has been modified to include a plurality of prior knowledge network(s)/graph(s) 206a-206m. This may be used to further improve the optimised attention relevancy weight vector.

In this example, the generated vector of scores $\vec{s}_n= [s_{1,n}, \ldots, s_{N_n,n}]$ 114, encoding vectors $V_n=\{\vec{v}_{1,n}, \ldots, \vec{v}_{N_n,n}\}$, and the corresponding set of data $X_n$ 106 are passed to the attention mechanism 116, which includes an attention unit 202 for calculating an attention relevancy weight vector $\vec{a}_n=[\alpha_{1,n}, \ldots, \alpha_{N_n,n}]$ 208 based on an attention calculation unit 204 coupled to the plurality of prior knowledge network(s)/graph(s) 206a-206m. Each of the prior knowledge network(s)/graph(s) 206a-206m inputs prior knowledge data $P_{Ga,n}$-$P_{Gm,n}$ representative of a different known relationship between each pair of training instances $x_{1,n}$, $x_{j,n} \in X_n$ for $1 \le i \le j \le N_n$. The attention calculation unit 204 uses the prior knowledge data $P_{Ga,n}$-$P_{Gm,n}$ to estimate the best set of attention scores representing the relevancy of each training instance in the labelled set of training data $X_n$ 106. The attention unit 202 outputs an attention relevancy weight score vector $\vec{\alpha}_n = [\alpha_{1,n}, \ldots, \alpha_{N_n,n}]$ 208 for use in filtering out those training data instances $x_{i,n}$ that are determined to not contribute to supporting the relationship represented by label $\ell_l$ or are determined not relevant to the labelled set of training data $X_n$ 106.

As an example, the attention calculation unit 204 provides an attention function for determining the vector of attention weights $\vec{\alpha}_n$ for $1 \le n \le T$ for use in an attention filter based on:

$$\Lambda(\vec{s_n}) = \arg\min_{\vec{\alpha} \in \Delta^n} \left\{ \frac{1}{2} \|\vec{s_n} - \vec{\alpha_n}\|_2^2 + \sum_{(x_{i,n},x_{j,n}) \in G1} \lambda_1 |\alpha_{i,n} - \alpha_{j,n}| + \cdots + \sum_{(x_{i,n},x_{j,n}) \in Gm} \lambda_m |\alpha_{i,n} - \alpha_{j,n}| \right\}$$

where $\Lambda(\cdot)$ is the attention function that maps a score vector $\vec{s}_n$ to a probability distribution $\Delta^n = \{\alpha_i \ge 0, \Sigma \alpha_i = 1\}$, $G_1, \ldots, G_m$ are prior knowledge networks/graphs 206a-206m that describe whether each pair of training data instances $(x_{i,n}, x_{j,n})$, for $1 \le i \le j \le N_n$, have a relationship or not, each $\lambda_r \in \mathbb{R}^+$ for $1 \le r \le m$ is a hyperparameter selected to adjust the contribution of the prior knowledge graph Gr.

Each prior knowledge graph $G_r$ represents a different relationship between the data instances and is used to encourage the attention calculation unit 204 (or attention network) to assign equal weights $\alpha_{i,n}$ and $\alpha_{j,n}$ to the pair of training data instances $(x_{i,n}, x_{j,n})$ should they be connected/related. The term will be positive if the pairing $(x_{i,n}, x_{j,n})$ are related but $\alpha_{i,n} \ne \alpha_{j,n}$ and, hence, can be considered to apply a penalty to the task of minimising $\Lambda(\vec{s})$. If a pairing $(x_{i,n}, x_{j,n})$ is related, then the corresponding $\alpha_{i,n}$ and $\alpha_{j,n}$ should reflect this relationship by being, for example, equal for a "strong" relationship with each other or close to each other for a "medium" relationship. Furthermore, the size of this penalty will be proportional to $|\alpha_{i,n} - \alpha_{j,n}|$ and, hence, a greater penalty will be applied when the difference between the attention weights is greater. However, the attention network may assign unequal weights $\alpha_{i,n}$ and $\alpha_{j,n}$ to training data instance pairings $(x_{i,n}, x_{j,n})$ which are not related by the prior knowledge network $G_r$, or which depends on how distantly connected/related they are, without incurring a penalty in the task of minimising $\Lambda(\vec{s}_n)$. Thus, the solution obtained by minimising $\Lambda(\vec{s}_n)$ corresponds to a set of attention relevancy weights or the attention relevancy weight vector $\vec{\alpha}$ 208 that takes into account the relationships between the training data instances for each set of data $X_n$ for $1 \le n \le T$.

The attention filter 210 applies each attention vector $\vec{\alpha}_n$ 208 to the corresponding encoding vectors $V_n = \{\vec{v}_{1,n}, \ldots, \vec{v}_{N_n,n}\}$ 110 embedding/encoding the corresponding training data instances $\{x_{1,n}, \ldots, x_{i,n}, \ldots x_{N_n,n}\}$ of the n-th set of labelled training data $X_n$. The attention filter 210 acts as a filter that improves the training of ML technique 118a (or improving the output of a classifier) by blocking/attenuating the least relevant data instances and promoting/emphasising/amplifiying the most relevant data instances in each set.

The attention filter 210 may achieve filtering by generating an n-th context vector $\hat{v}_n$ based on summing a weighted combination of each attention relevancy weight $\alpha_{i,n}$ with the corresponding encoding vector $\vec{v}_{i,n}$ to generate the n-th context vector $\hat{v}_n$ representing the most relevant encoding vectors/training instances of the labelled set of training data $X_n$. The attention filter 210 generates an n-th context vector v̂n based on:

$$\hat{v}_n = \sum_{i=1}^{N_n} \alpha_{i,n} \vec{v}_{i,n}$$

The n-th context vector $\hat{v}_n$ is used as input (e.g. as attention relevancy information) for the ML technique 118a, which generates an ML model $f(X)$ 212 for modelling the relationship(s) represented by the set of labels $\mathcal{L}$. The attention mechanism 116 processes a plurality of labelled sets of training data $\{X_1, \ldots, X_n, \ldots, X_T\}$, in which the relevant training data instances in each labelled set of training data are used or emphasised to train the ML technique 118a for generating the ML model $f(X)$ 212. Alternatively or additionally, the attention mechanism 116 may be configured to process each of a plurality of labelled sets of training data $\{X_1, \ldots, X_n, \ldots, X_T\}$, in which only the relevant training data instances in each labelled set of training data are used to train the ML technique 118a for generating the ML model $f(X)$ 212.

Figure 2C:
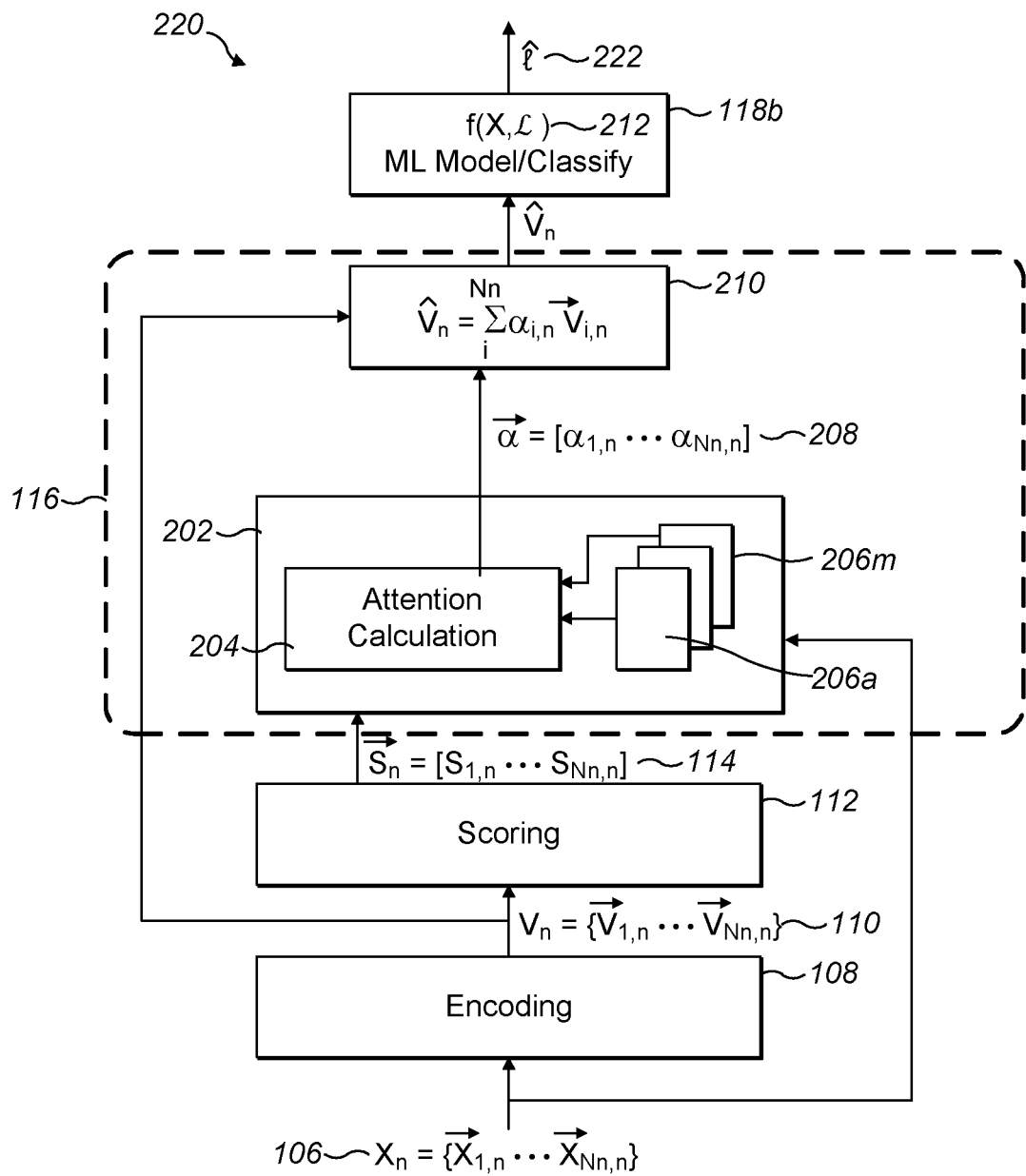
FIG. 2c is a schematic diagram illustrating a further example system and attention mechanism according to the invention.

FIG. 2c is a schematic diagram illustrating an example modelling/classifying system 220 including functionality of the attention mechanism 116 as described with respect to FIGS. 1a-2b. In this example, the system 220 includes an ML module 118b that is configured for implementing an ML model/classifier $f(X, \mathcal{L})$ 212, where the set of labels $\mathcal{L} = \{\ell_1, \ldots, \ell_l, \ldots, \ell_L\}$ represents a set of relationship(s)/fact(s) that are modelled/classified by ML model/classifier $f(X, \mathcal{L})$, where L is the number of relationships/facts that are modelled/classified. The ML model/classifier 212 may be generated by training a ML technique 118 or 118a as described with reference to FIGS. 1a-2b. The ML model/classifier 212 may output a model estimate or classification estimate represented as, by way of example only but not limited to, label estimate $\hat{\ell}$ in relation to a set of data $X_n$ 106 input to the ML model/classifier 212. The label estimate $\hat{\ell}$ may be compared or matched with the relationship(s) represented by a set of labels $\mathcal{L} = \{\ell_1, \ldots, \ell_l, \ldots, \ell_L\}$ to determine or estimate the relationship/fact that is representative of the set of data $X_n$ 106.

In this example, the modelling/classifying system 220 is illustrated using the attention mechanism 116 of FIG. 2b. The ML model/classifier $f(X, \mathcal{L})$ 212 has been trained based on the ML training system 200 of FIG. 2b. The ML model/classifier 212 may be used to predict a relationship represented by label $\hat{\ell}$ of a set of input data $X_n$ containing a plurality of input data instances $\{x_{1,n}, \ldots, x_{N_n,n}\}$. Once the ML model/classifier has been trained by the ML technique 118a of FIG. 2b, any neural networks associated with the encoding module 108 (e.g. encoding/embedding network), scoring module 112 (e.g. scoring network), and any other neural network (e.g. an attention network if any are used in the attention mechanism 116) are fixed or set and are no longer configured for training.

The n-th set of data $X_n$ 106 may be input to system 220 for classification by ML model/classifier 212. The n-th set of data $X_n$ 106 is input to encoding module 108 to generate a set of N-dimensional encoding vectors $V_n = \{\vec{v}_{1,n}, \ldots, \vec{v}_{N_n,n}\}$ 110. The set of encoding vectors 110 are then processed by a scoring module 112 (also known as a potential module) to generate a set or vector of scores (or potentials) $\vec{s}_n = [s_{1,n}, \ldots, s_{N_n,n}]$ 114, in which each score $s_{i,n}$ is associated with each encoding vector $\vec{v}_{i,n}$.

As can be seen, the generated vector of scores 114 are passed to the attention mechanism 116, in which the attention calculation unit 204 coupled with the set of prior knowledge network(s) 120a-120m estimates the best set of attention relevancy weights representing the relevancy of each input data instance in the set of input data $X_n$ 106. The attention mechanism 116 outputs an attention relevancy weight vector $\vec{\alpha}_n = [\alpha_{1,n}, \ldots, \alpha_{N_n,n}]$ 208 for use in filtering out those data instances $x_{i,n}$ that are determined do not contribute in the classification/modelling of relationship(s) represented by set of label(s) $\mathcal{L}$ or are determined not relevant to the set of data $X_n$.

In this example, the generated vector of scores $\vec{s}_n = [s_{1,n}, \ldots, s_{N_n,n}]$ 114, encoding vectors $V_n = \{\vec{v}_{1,n}, \ldots, \vec{v}_{N_n,n}\}$, and the corresponding set of data $X_n$ 106 are passed to the attention mechanism 116, in which the attention unit 202 calculates the attention relevancy weight vector $\vec{\alpha}_n = [\alpha_{1,n}, \ldots, \alpha_{N_n,n}]$ 208 based the attention calculation unit 204 minimising the attention function as described with reference to FIG. 2b based on the plurality of prior knowledge network(s)/graph(s) 206a-206m. Each of the prior knowledge network(s)/graph(s) 206a-206m inputs prior knowledge data $P_{Ga,n}$-$P_{Gm,n}$ representative of a different known relationship between each pair of instances $x_{i,n}$, $x_{j,n}$ $\in X_n$ for $1 \leq i \leq j \leq N_n$. The attention calculation unit 204 uses the prior knowledge data $P_{Ga,n}$-$P_{Gm,n}$ to estimate the best set of attention relevancy weights representing the relevancy of each data instance in the set of data $X_n$ 106. The attention unit 202 outputs an attention relevancy weight score vector $\alpha_n = [\alpha_{1,n}, \ldots, \alpha_{N_n,n}]$ 208 for use in filtering out those data instances $x_{1,n}$ that are determined to not contribute to supporting the modelling/classification of relationship(s) represented by set of label(s) $\mathcal{L}$ or are determined not relevant to the set of data $X_n$ 106.

The attention filter 210 applies each attention vector $\vec{\alpha}_n$ 208 to the corresponding encoding vectors $V_n = \{\vec{v}_{1,n}, \ldots, \vec{v}_{N_n,n}\}$ 110 embedding/encoding the corresponding data instances $\{x_{1,n}, \ldots, x_{i,n}, \ldots, x_{N_n,n}\}$ of the n-th set of data $X_n$. The attention filter 210 acts as a filter that improves the ML model/classification 118b and improves the output of the ML model/classifier 212 by blocking/attenuating the least relevant data instances and promoting the most relevant set of data instances.

The n-th context vector $\hat{v}_n$ is generated based on each attention relevancy weight $\alpha_{i,n}$ and the corresponding encoding vector $\vec{v}_{i,n}$ of input data instance $x_{1,n}$ representing the most relevant feature vectors/input data instances of the set of input data $X_n$. The n-th context vector $\hat{v}_n$ is input to the ML model/classifier $f(X, \mathcal{L})$ 212 and outputs a predicted relationship represented by label estimate $\hat{\ell}$ in relation to the set of data $X_n$ 106. The label estimate $\hat{\ell}$ may be compared or matched with the relationship(s) represented by a set of labels $\mathcal{L} = \{\ell_1, \ldots, \ell_i, \ldots, \ell_L\}$ to determine or estimate the relationship/fact represented by the set of data $X_n$ 106.

Although the attention mechanism 116 of FIG. 2c is based on, by way of example only but is not limited to, the attention function used in FIG. 2b, it is to be appreciated by the skilled person that the attention mechanism of FIG. 2c may be based on any attention mechanism according to the invention as described herein such as, by way of example only but not limited to, the attention mechanism(s) 116, 230 as described with reference to FIGS. 1a-2b and 2d-5.

Figure 2D:
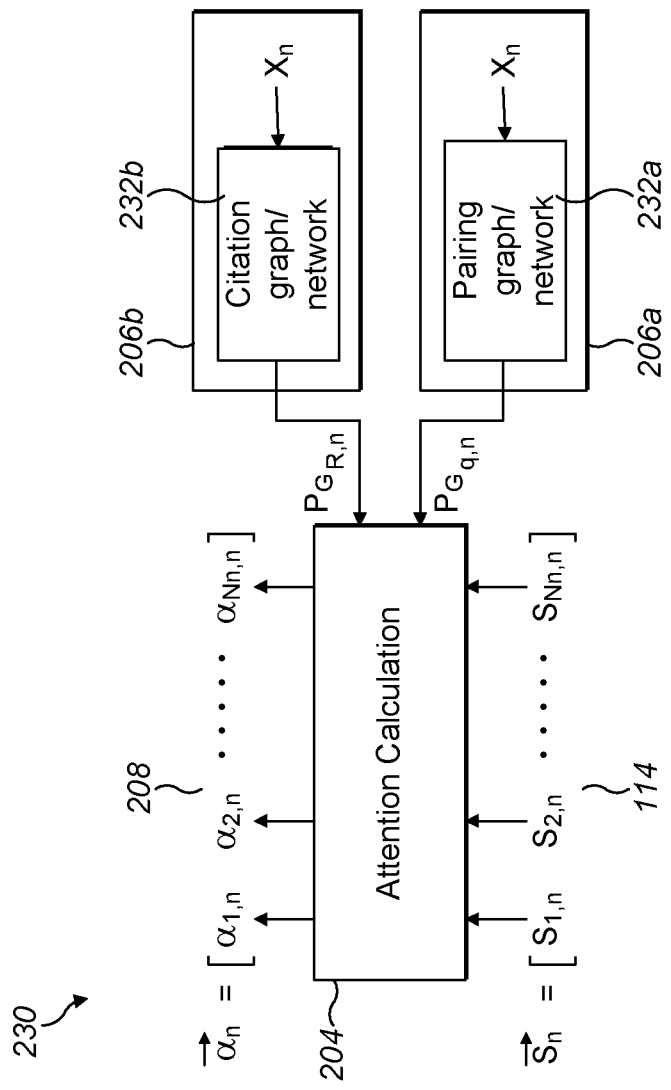
FIG. 2d is a schematic diagram illustrating an example attention mechanism according to the invention.

FIG. 2d is a schematic diagram illustrating an example attention mechanism 230 according to the invention for use in natural language processing/relationship extraction of sentences from a corpus of literature/citations. ML models/classifiers can be generated from training ML techniques based on labelled training datasets comprising a plurality of sets of training data, each set of training data comprising a plurality of training data instances $\{x_{1,n}, \ldots, x_{i,n}, \ldots x_{N_n,n}\}$. Each training data instance $x_{1,n}$ may include data representing a sentence extracted from the corpus describing a relationship between two or more entities (e.g. a biological/biomedical entity such as, by way of example only but is not limited to, a disease, a gene, a protein, a drug, a compound, a molecule, a biological pathway, a biological process, an anatomical region, anatomical entity, tissue, or cell type, etc.). For example, for the n-th set of data, a data instance $x_{i,n}$ may represent a sentence such as, by way of example only but note limited to, "A was observed to upregulate expression of B", where A and B are entities. The n-th set of data may comprise a plurality of data instances $\{x_{1,n}, \ldots, x_{i,n}, \ldots x_{N_n,n}\}$ for $1 \leq i \leq N_n$, in which each data instance $x_{i,n}$ represents a sentence describing that A and B are related in some way and may support a relationship/fact $\ell$. Other sets of data $X_m = \{x_{1,m}, \ldots, x_{i,m}, \ldots x_{N_m,m}\}$. may include similar relationships but for other pairs of entities, e.g. C and D, etc.

The attention mechanism 230 may include an attention calculation unit 204 (e.g. an attention network) that receives a vector of scores 114 and outputs a vector of attention relevancy weights 208 based on prior knowledge network(s) 206a-206b. Each prior knowledge network 206a or 206b includes data representative of a relationship between pairs of data instances from the set of data $X_n$.

Prior knowledge network/graph 206a is based on a pairing network 232a that indicates whether a pair of data instances from the set of data $X_n$ are located in the same document from the corpus. For example, the pairing network/graph 232a may provide an indication that two sentences $x_{i,n}$ and $x_{j,n}$ are in the same article or document from the corpus, or an indication that two sentences $x_{i,n}$ and $x_{j,n}$ are not the same article or document. The pairing relationship between pairs of data instances $(x_{i,n}, x_{j,n})$ is used to adjust the attention function (e.g. the attention function of FIG. 2b) of the attention calculation unit 204 hence affects the resulting attention relevancy weights that are output.

Prior knowledge network/graph 206b is based on a citation network 232b that indicates whether a document corresponding to a first data instance $x_{i,n}$ cites another document corresponding to a second data instance $x_{j,n}$ from the set of data $X_n$. For example, the citation network 232b can be used to understand relationships between documents in the corpus and the sentences $x_{1,n}, \ldots, x_{i,n}, \ldots, x_{N_n,n}$. A citation network (may be a citation graph) may be used to determined the citation relationships between every pair of sentences $x_{1,n}, \ldots, x_{i,n}, \ldots x_{N_n,n}$ in a set of data $X_n$. For example, sentence $x_{i,n}$ relates to sentence $x_{j,n}$ based on whether the paper P1 containing sentence $x_{1,n}$ cites a paper P2, which contains sentence $x_{j,n}$. The pair of sentences $x_{i,n}$ and $x_{j,n}$ may be given a relationship weight based on this citation relationship. A stronger/higher relationship weight may be given to this pairing based on whether the citation to P2 occurs within the sentence $x_{i,n}$. A weaker/lower relationship weight may be given to this pairing based on whether the citation in P1 citing P2 is further away from the sentence $x_{i,n}$.

The prior knowledge data based on each prior knowledge network/graph 206a and 206b may be injected into the attention calculation unit 204 and used by the attention function to assist the attention calculation unit 204 in calculating and focusing on the most relevant sentences $x_{1,n}, \ldots, x_{i,n}, \ldots x_{N_n,n}$ in each set of data $X_n$.

Although the attention mechanism 230 uses, by way of example only but is not limited to, two prior knowledge graphs/networks 206a or 206b, it is to be appreciated by the skilled person that a single prior knowledge graph based on merging the citation network and pairing networks may be used to inject prior knowledge data into the attention calculation unit 204, or that further relationships may be used for injecting further prior knowledge data into the attention calculation unit 204.

Figure 2E:
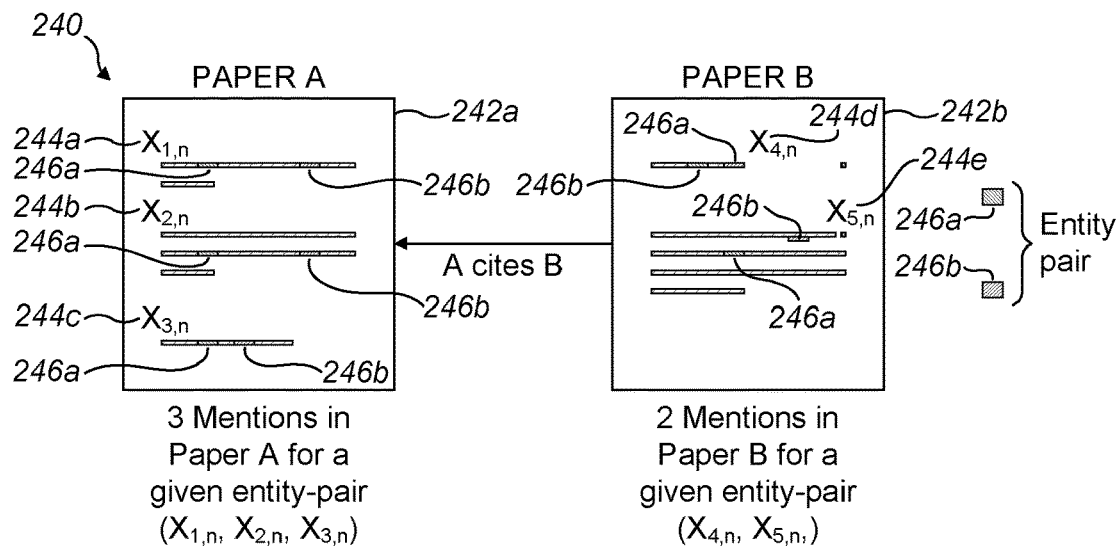
FIG. 2e is a schematic diagram illustrating prior knowledge relationships between data instances for input to the attention mechanism according to the invention.

FIG. 2e is a schematic diagram illustrating an example corpus of literature 240 comprising a plurality of literature including, by way of example only but is not limited to, two pieces of literature, a first paper 242a (e.g. PAPER A) and a second paper 242b (e.g. PAPER B). These papers 242a and 242b includes a portion of a set of data $X_n$ comprising data instances $x_{1,n}, x_{5,n}, \ldots 244a$-244e. Each of the data instances $x_{1,n}, x_{5,n}, \ldots 244a$-244e represent sentence(s), paragraph(s) or statement(s) describing a similar relationship between a first entity 246a and a second entity 246b (a pair of entities 246a and 246b). In particular, each of the data instances $x_{1,n}, x_{5,n}, \ldots 244a$-244e represents a sentence describing that the first entity 256a and the second entity 246b are related in some way and may support a relationship/fact with label $\ell$. In this example, data instance $x_{1,n}$ 244a is a sentence, paragraph, or statement and the like (also known as a mention) that describes the relationship/fact between the first entity 246a and the second entity 246b (an entity pair). Similarly, data instances $x_{2,n} \ldots, x_{5,n}$ 244b-244e are also sentence(s), paragraph(s) or statement(s) and the like (also known as mentions) that describe the relationship/fact between the first entity 246a and the second entity 246b (an entity pair). In this example, data instances $x_{1,n}, x_{2,n}, x_{3,n}$ (or mentions) are located in the first paper 242a and data instances $x_{4,n}, x_{5,n}$ (or mentions) located within the second paper 242b. The first paper 242a may be said to have three mentions $x_{1,n}, x_{2,n}, x_{3,n}$ 244a-244c for the entity-pair comprising the first entity 246a and the second entity 246b. The second paper 242a may be said to have two mentions $x_{4,n}, x_{5,n}$ 244d-244e for the entity-pair comprising the first entity 246a and the second entity 246b. Although this example describes, by way of example only but is not limited to, data instances $x_{1,n}, x_{5,n}, \ldots 244a$-244e being located within two papers 242a and 242b, the skilled person would appreciate that the corpus of literature may comprise a plurality of papers, documents or other literature in which a plurality of data instances would be described and sets of which may describe different relationships/facts. The principles described in this example can be extended to multiple and a plurality of papers, documents and other literature describing any number of sets of data, data instances and corresponding relationships/facts etc.

Given that each of the data instances $x_{1,n}, x_{5,n}, \ldots 244a$-244e represents a sentence describing that the first entity 256a and the second entity 246b are related in some way and may support a relationship/fact with label $\ell$, an attention mechanism according to the invention may make use of prior knowledge or data that may characterise the relationships between the papers 242a and 242b, and the data instances $x_{1,n}, \ldots, x_{5,n}, \ldots 244a$-244e in a set of data $X_n$. In this example, the first and second papers 242a and 242b are related to each other in that the first paper 242a cites the second paper 242b. The knowledge that the first paper 242a cites the second paper 242b may be exploited as so-called prior knowledge for assisting an attention mechanism in determining/filtering out the most relevant data instances $x_{1,n}, \ldots, x_{5,n}, \ldots 244a$-244e in the set of data $X_n$ that are more likely to support a common, same or a similar relationship/fact. There may be different types of prior knowledge that may be represented as data structure representing a prior knowledge graph or network. Each prior knowledge graph or network may be generated based on analysing all of the literature in the corpus of literature, identifying for each set of data $X_n$ those citations that include the data instances $x_{1,n}, \ldots, x_{5,n}, \ldots 244a$-244e in the set of data $X_n$, and forming a graph/network based on these citations and data instances $x_{1,n}, \ldots, x_{5,n}, \ldots 244a$-244e representing each particular prior knowledge relationship. Each of the prior knowledge graphs/networks can represent prior knowledge data for each set of data $X_n$, which may be input to the attention mechanism according to the invention. As described with respect to FIG. 2d, an attention mechanism may include an attention calculation unit (e.g. an attention network) that receives a vector of scores and prior knowledge data for the set of data $X_n$ based on prior knowledge graphs/networks and outputs a vector of attention relevancy weights based on the prior knowledge graph/network(s). Each prior knowledge network may include data representative of a different relationship between pairs of data instances $x_{1,n}, \ldots, x_{5,n}, \ldots 244a$-244e from the set of data $X_n$.

Figure 2F:
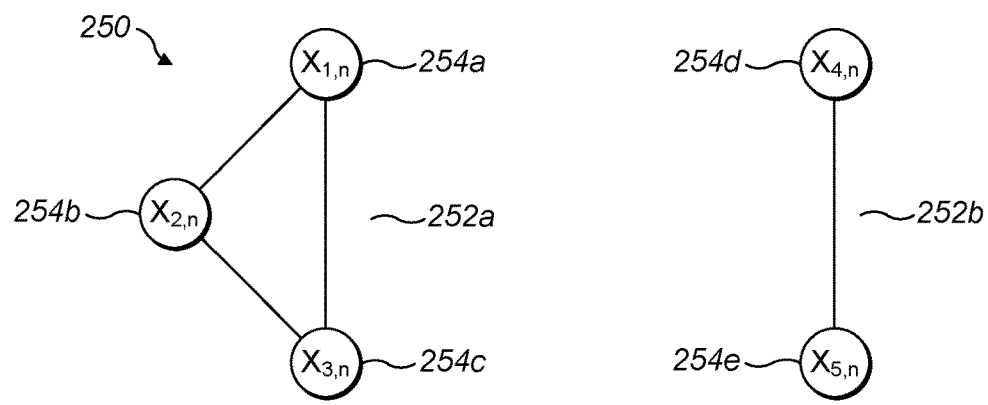
FIG. 2f is a schematic diagram illustrating a prior knowledge pairing network/graph of the prior knowledge relationships in FIG. 2e for use by the attention mechanism according to the invention.

FIG. 2f is a schematic diagram illustrating a prior knowledge "pairing" network/graph 250 for the corpus of literature 240 of FIG. 2e. The pairing network/graph 250 comprising pairing subnetwork/subgraphs 252a and 252b may be configured to indicate whether a pair of data instances $x_{1,n}, x_{5,n}, \ldots 244a$-244e from the set of data $X_n$ are located in the same document/paper from the corpus 240. Thus, the pairing network/graph 250 may provide an indication that two sentences $x_{1,n}$ and $x_{j,n}$ are in the same article/paper or document from the corpus 240, or an indication that two sentences $x_{1,n}$ and $x_{j,n}$ are not the same article/paper or document from the corpus 240. Thus, for the set of data $X_n$, all the documents in the corpus of literature containing two or more data instances $x_{1,n}, \ldots, x_{5,n}, \ldots 244a$-244e of the set of data $X_n$ may be identified. Each of these documents may be used to generate a portion of the pairing network/graph 250.

In this example, the pairing network/graph 250 comprises pairing subnetwork/subgraphs 252a and 252b representing the first paper 242a and second paper 242b, respectively. Each of the pairing subnetwork/subgraphs 252a and 252b represent pairings between two or more data instances $x_{1,n}, \ldots, x_{5,n}, \ldots 244a$-244e contained with in the corresponding documents/papers 242a and 242b. In this example, the pairing subnetwork/subgraph 252a for the first paper 242a comprises a first node 254a representing data instance $x_{1,n}$ 244a, a second node 254b representing data instance $x_{2,n}$ 244b, and a third node 254c representing data instance $x_{3,n}$ 244c. These nodes are connected with edges indicating that these documents appear in the same paper, that is the first paper 242a. Similarly, the pairing subnetwork/subgraph 252b for the second paper 242b comprises a first node 254d representing data instance $x_{4,n}$ 244d and a second node 254e representing data instance $x_{5,n}$ 244d. These nodes of pairing subnetwork/subgraph 252b are connected with edges indicating that the data instances $x_{4,n}, x_{5,n}$ 244d-244e appear in the same paper, that is the second paper 242b. Given the pairing network/graph 250, a pairing relationship between pairs of data instances $(x_{i,n}, x_{j,n})$ may be determined and can be used to adjust the attention function (e.g. the attention function of FIG. 2b) of an attention calculation unit, which can positively affect the resulting attention relevancy weights that are output in relation to determining/filtering the most relevant data instances of the set of data $X_n$.

Figure 2G:
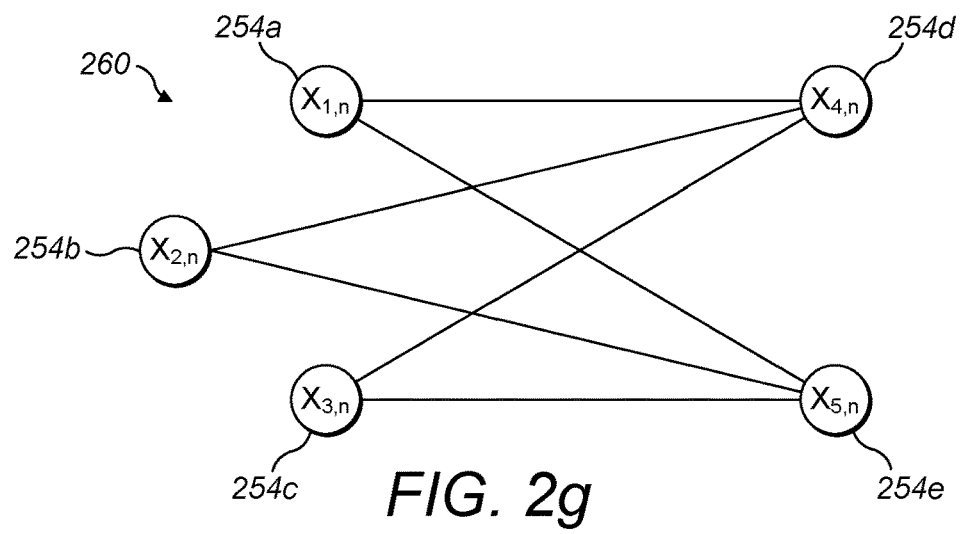
FIG. 2g is a schematic diagram illustrating a prior knowledge citation network/graph of the prior knowledge relationships in FIG. 2e for use by the attention mechanism according to the invention.

FIG. 2g is a schematic diagram illustrating a prior knowledge "citation" network/graph 260 for the corpus of literature 240 of FIG. 2e. The citation network/graph 260 comprises a plurality of nodes 254a-254d, each node representing one of the data instances $x_{1,n}, \ldots, x_{5,n}, \ldots$ 244a-244e from the set of data $X_n$. The citation network/graph 260 is configured connect nodes with edges to indicate whether a document containing a first data instance $x_{i,n}$ cites another document containing a second data instance $x_{j,n}$ from the set of data $X_n$. Thus, an edge would connect the node corresponding to the first data instance $x_{i,n}$ and the node corresponding to the second instance $x_{j,n}$. This type of edge connection is performed for all nodes. In the present example, since the first paper 242a cites the second paper 242b, then each of the nodes 254a-254c representing data instances $x_{1,n}, x_{2,n}, x_{3,n}$ 244a-244c of the first paper 242a connect to each of the nodes 254d and 254e representing data instances $x_{4,n}, x_{5,n}$ 244d-244e of the second paper 242b.

For example, the citation network/graph 260 can be used to understand relationships between documents/papers in the corpus 240 and the data instances $x_{1,n}, x_{i,n}, x_{5,n}, \ldots$ 244a-244e in the set of data $X_n$. Thus, the citation relationships between every pair of data instances $x_{1,n}, \ldots, x_{i,n}, \ldots x_{5,n}, \ldots$ 244a-244e in the set of data $X_n$. For example, the pairing $(x_{1,n}, x_{4,n})$ indicates data instance $x_{1,n}$ 244a is related to data instance $x_{4,n}$ 244d, because the first paper 242a (e.g. PAPER A) containing data instance $x_{1,n}$ cites the second paper 242b (e.g. PAPER B), which contains data instance $x_{4,n}$. Furthermore, the edges connecting each pair of data instances $x_{i,n}$ and $x_{j,n}$ may be given a relationship weight based on, by way of example but not limited to, how close the citation is located to the data instance of the paper/document that cites the other paper/document. For example, a stronger/higher relationship weight may be given to a pairing $(x_{i,n}, x_{j,n})$ based on whether the citation located in the first paper 242a to the second paper 242b occurs within a data instance $x_{i,n}$. A weaker/lower relationship weight may be given to this pairing $(x_{i,n}, x_{j,n})$ based on whether the citation in the first paper 242a that cites the second paper 242b is further away from the data instance $x_{i,n}$. Given the citation network/graph 260, a citation relationship between pairs of data instances $(x_{i,n}, x_{j,n})$ may be determined and can also be used to adjust the attention function (e.g. the attention function of FIG. 2b) of an attention calculation unit, which can further positively affect the resulting attention relevancy weights that are output in relation to determining/filtering the most relevant data instances of the set of data $X_n$.

Figure 2H:
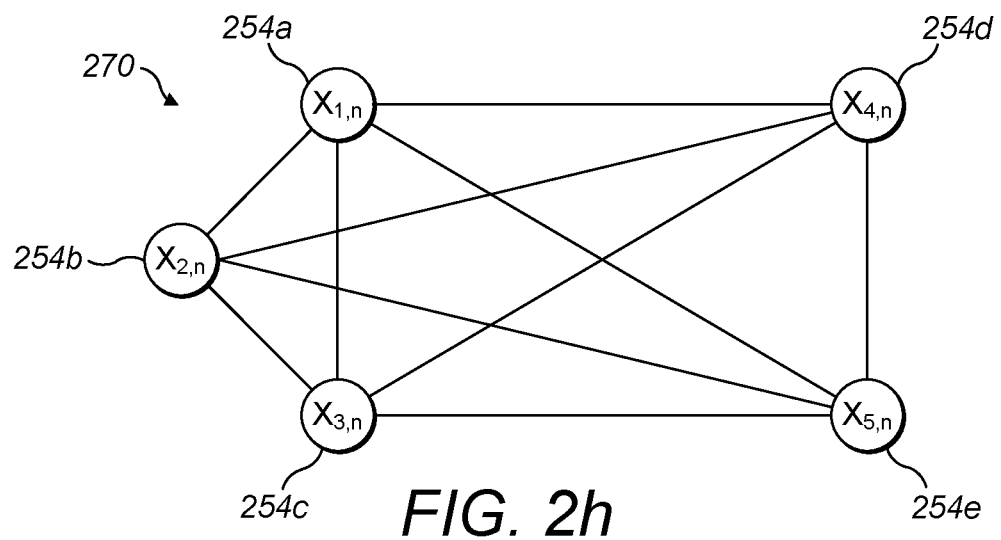
FIG. 2h is a schematic diagram illustrating a prior knowledge network/graph that merges the prior knowledge networks/graphs of FIGS. 2f and 2g for use by the attention mechanism according to the invention.

FIG. 2h is a schematic diagram illustrating a prior knowledge "citation"/"pairing" network/graph 270 for the corpus of literature 240 of FIG. 2e. The citation network/graph 270 comprises a plurality of nodes 254a-254d, each node representing one of the data instances $x_{1,n}, \ldots, x_{5,n}, \ldots$ 244a-244e from the set of data $X_n$. Rather than having two separate prior knowledge networks 250 and 260, these prior knowledge networks may be merged into a single prior knowledge network/graph 270, which may be used to inject prior knowledge data into an attention mechanism according to the invention. Given the citation network/graph 270, a citation or pairing relationships between pairs of data instances $(x_{i,n}, x_{j,n})$ may be determined and can be used to adjust the attention function (e.g. the attention function of FIG. 2b) of an attention calculation unit, which can further positively affect the resulting attention relevancy weights that are output in relation to determining/filtering the most relevant data instances of the set of data $X_n$.

Figure 3A:
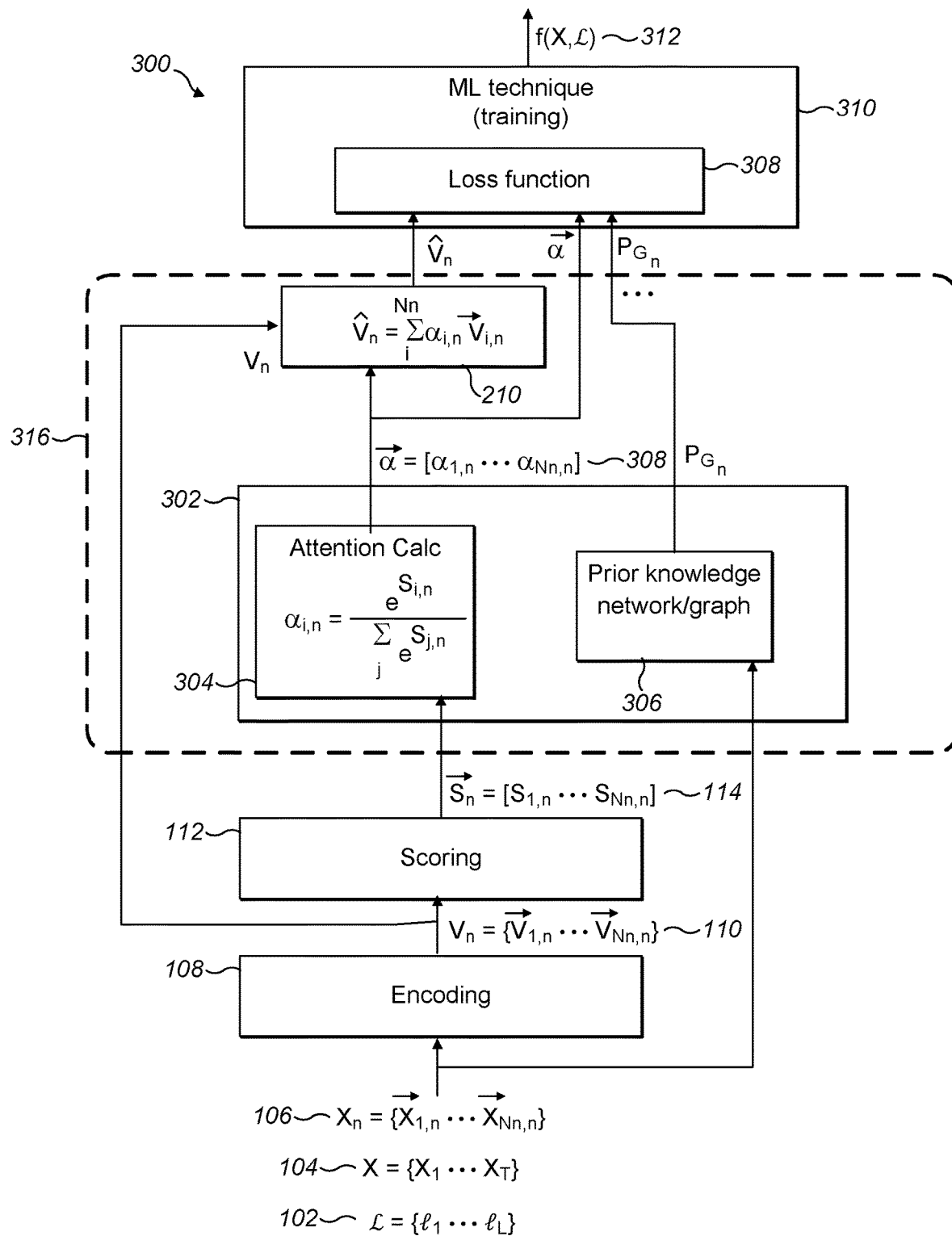
FIG. 3a is a schematic diagram illustrating a further example system and attention mechanism according to the invention.

FIG. 3a is a schematic diagram illustrating a further example MIL training system 300 and example attention mechanism 316 according to the invention. For simplicity, reference numerals of similar or the same components as described with reference to FIGS. 1a-2d are used. In this example, the ML training system 300 uses a loss function based attention mechanism 308 for filtering labelled training data instances of each labelled set of training data $X_n$ 106 from a labelled training dataset X 104. The system 300 is used to train an ML technique to generate a ML model $f(X, \mathcal{L})$ 312 for modelling the set of relationships represented by a set of labels $\mathcal{L} = \{\mathcal{L}, \ldots, \mathcal{L}_l, \ldots, \mathcal{L}_L\}$ 102, where L is the number of relationships/facts that are to be modelled. A labelled training dataset X 104 may include a plurality of labelled sets of training data $\{X_1, \ldots, X_n, \ldots, X_T\}$ for $1 \leq n \leq T$, where T is the number of labelled sets of training data. The n-th labelled set of training data $X_n$ 106 comprises a plurality of training data instances $X_n = \{x_{1,n}, \ldots, x_{N_n,n}\}$ 106, where $N_n > 1$ is the number of training data instances in the n-th set of training data $X_n$ 106. Each set of training data $X_n$ 106 is associated or mapped to a relationship represented by label $\mathcal{L}_l \in \mathcal{L}$ for $1 \leq l \leq L$. Although the n-th set of training data $X_n$ 106 is described as, by way of example only but is not limited to, being associated with label $\mathcal{L}_l$ for $1 \leq l \leq L$, this is by way of example only, it is to be appreciated by the skilled person that the remaining plurality of sets of data instances $X_j$ for $1 \leq j \neq n \leq T$ may be associated or mapped to a relationship based on any one of the labels $\mathcal{L}_k \in \mathcal{L}$ for $1 \leq k \leq L$, where k may be equal to l, from the set of labels $\mathcal{L}$.

The system 300 includes an encoding module 108, scoring module 112, attention mechanism 316 and ML module 310, which in this example implements training of the ML technique to generate the ML model $f(X, \mathcal{L})$ 312. The ML technique uses a loss function 308. The encoding module 108 is coupled to the scoring module and the attention mechanism 316. The scoring module 112 is coupled to the attention mechanism 316. The set of data $X_n$ 106 is input to the encoding module 108 and the attention mechanism 316.

The n-th set of training data $X_n$ 106 is input to the encoding module 108 (e.g. an embedding network) that outputs a set of N-dimensional encoding vectors $V_n = \{\vec{v}_{1,n}, \ldots, \vec{v}_{N_n,n}\}$ 110. The set of encoding vectors 110 are processed by a scoring module 112 (e.g. a scoring network) to generate a vector of scores $\vec{s}_n = [s_{1,n}, \ldots, s_{N_n,n}]$ 114, in which each score $s_{i,n}$ is associated with each encoding vector $\vec{v}_{i,n}$. The generated vector of scores 114 are passed to the attention mechanism 316 that includes an attention unit 302 comprising an attention calculation unit 304 and a prior knowledge network/graph 306 (as previously described). The attention calculation unit 304 calculates attention relevancy weights (or attention scores) $\alpha_{i,n}$ based on an attention function such as, by way of example only but is not limited to, the SOFTMAX attention function $$\alpha_{i,n} = \frac{e^{s_{i,n}}}{\sum_j e^{s_{j,n}}},$$

the MAX attention function, or any other attention function based on the vector or set of scores $\vec{s}_n = [s_{1,n}, \ldots, s_{N_n,n}]$ 114. Based on these attention relevancy weights, the attention unit 302 outputs an attention relevancy weight vector $\vec{\alpha}_n = [\alpha_{1,n}, \ldots, \alpha N_n, n]$ and prior knowledge data $P_{G,n}$. The prior knowledge network/graph 306 outputs prior knowledge data $P_{G,n}$ that includes data representative of a known relationship between each pair of training instances $x_{i,n}$, $x_{j,n} \in X_n$ for $1 \leq i \leq j \leq N_n$.

A first attention filter 210 applies each attention vector $\vec{\alpha}_n$ 308 to the corresponding feature encoding vectors $V_n = \{\vec{v}_{1,n}, \ldots, \vec{v}_{N_n,n}\}$ 110 embedding/encoding the corresponding training data instances $\{x_{1,n}, \ldots, x_{i,n}, \ldots x_{N_n,n}\}$ of the n-th set of labelled training data $X_n$. The attention filter 210 acts as an initial filter for use in training the ML technique. The first attention filter 210 may achieve an initial filtering by generating an n-th context vector $\hat{v}_n$ based on summing a weighted combination of each attention relevancy weight $\alpha_{i,n}$ with the corresponding feature vector $\vec{v}_{i,n}$ to generate the n-th context vector $\hat{v}_n$ representing the most relevant feature encoding vectors/training instances of the labelled set of training data $X_n$. The first attention filter 210 generates an n-th context vector $\hat{v}_n$ based on:

$$\hat{v}_n = \sum_{i=1}^{N_n} \alpha_{i,n} \vec{v}_{i,n}$$

The attention relevancy weight vector $\vec{\alpha}_n$, n-th context vector $\hat{v}_n$ and the prior knowledge data are input as so-called attention filtering information for use by ML module 310 in conjunction with the encoding vectors $V_n = \{\vec{v}_{1,n}, \ldots, \vec{v}_{N_n,n}\}$ 110 of each set of training data $X_n$ 106 for training the ML technique, which generates an ML model/classifier $f(X, \mathcal{L})$ 312 for modelling the relationship(s) represented by the set of label(s) $\mathcal{L}$ or classifying a set of data in relation to relationship(s) represented by the set of label(s) $\mathcal{L}$. The ML technique implemented by ML module 310 uses the attention filtering information, which includes data representative of the n-th context vector $\hat{v}_n$ based on the attention relevancy weight vector $\vec{\alpha}_n$, the attention relevancy weight vector $\vec{\alpha}_n$ and/or data representative of the prior knowledge data $P_{G,n}$ to generate a modified loss function 308 that includes an additional loss component (or regularisation term) that may penalise the ML technique during training when it makes an incorrect association between training data instances.

The attention relevancy weight vector $\vec{\alpha}_n$, n-th context vector $\hat{v}_n$ and the prior knowledge data are input as so-called attention filtering information for use by ML module 310.

The n-th context vector $\hat{v}_n$ is based on a function of the encoding vectors $V_n = \{\vec{v}_{1,n}, \ldots, \vec{v}_{N_n,n}\}$ 110 of each set of training data $X_n$ 106 for training the ML technique. The ML technique is trained to generate an ML model/classifier $f(X, \mathcal{L})$ 312 for modelling the relationship(s) represented by the set of label(s) $\mathcal{L}$ or classifying a set of data in relation to relationship(s) represented by the set of label(s) $\mathcal{L}$. The ML technique implemented by ML module 310 uses the attention filtering information, which includes data representative of the n-th context vector $\hat{v}_n$ based on the attention relevancy weight vector $\vec{\alpha}_n$ and data representative of the prior knowledge data $P_{G,n}$ to generate a modified loss function 308 that includes an additional loss component (or regularisation term) that may penalise the ML technique during training when it makes an incorrect association between training data instances.

As an example, a loss function, $L(f(X), \ell)$, may be used by the ML technique during training over labelled data set X, where the n-th context vectors $\hat{v}_n$ corresponding to each set of training data $X_n$ 106 is input in place of the labelled dataset X and each set of training data $X_n$ 106. That is the ML technique operates on the context vectors, which is a function or a transformation of the input dataset X. The loss function, $L(f(X), \ell)$, is modified to further include an attention filtering mechanism according to the invention. The modified loss function 308 may be considered an attention-loss function, $AL(X, \ell, \vec{\alpha}_n)$, which includes a regularisation term/function (e.g. attention regularisation function), $AF(G, \vec{\alpha}_k, X_k)$, based on using prior knowledge data $P_{G,n}$ of the prior knowledge graph G 306 in conjunction with attention relevancy weight vector $\vec{\alpha}_n = [\alpha_{1,n}, \ldots, \alpha_{i,n}, \ldots, \alpha_{N_n,n}]$ on each labelled set of training data $X_n$ represented by the n-th context vector $\hat{v}_n$, that introduces an additional loss component to the loss function, $L(f(X), \mathcal{L})$. The modified loss function 212, a so-called attention-loss function (AL), may be based on:

$$AL(X, \ell, \vec{\alpha}_n) = L(f(X), \ell) + \sum_{k=1}^{T} AF(G, \vec{\alpha}_k, X_k)$$

$$AF(G, \vec{\alpha}_k, X_k) = \sum_{(x_{i,n}, x_{j,n}) \in G} \lambda |\alpha_{i,k} - \alpha_{j,k}|$$

where each $\lambda \in \mathbb{R}^+$ is a hyperparameter selected to adjust the contribution of unrelated training data instances based on the prior knowledge graph G 306, and each attention score $\alpha_{i,n}$ corresponds to an element of the attention relevancy weight vector $\vec{\alpha}_n$, each of which may be calculated based on any attention function such as, by way of example only but is not limited to, the SOFTMAX attention function $$\alpha_{i,n} = \frac{e^{s_{i,n}}}{\sum_j e^{s_{j,n}}}.$$

Thus, for each pair of training data instances $(x_{i,k}, x_{j,k})$ which are related in the prior knowledge graph G 306, a loss component $\lambda |\alpha_{i,k} - \alpha_{j,k}|$ is added to $L(f(X), \ell)$. If the attention network in the ML technique assigns different attention weights to the training data instances $(x_{i,k}, x_{j,k})$, then this component will be positive and, hence, correspond to adding a penalty to the loss function $L(f(X),\ell)$. Otherwise, a loss component is not added to $L(f(X),\ell)$. Thus, the attention-loss function acts as an attention filter that implicitly filters non-relevant training data instances, while simultaneously attempting to retain instances that are related in the prior knowledge graph if at least one of them is deemed relevant; or allows the ML technique to learn how to filter out which training data instances are more relevant than others, while respecting the assumptions in the prior knowledge network.

Figure 3B:
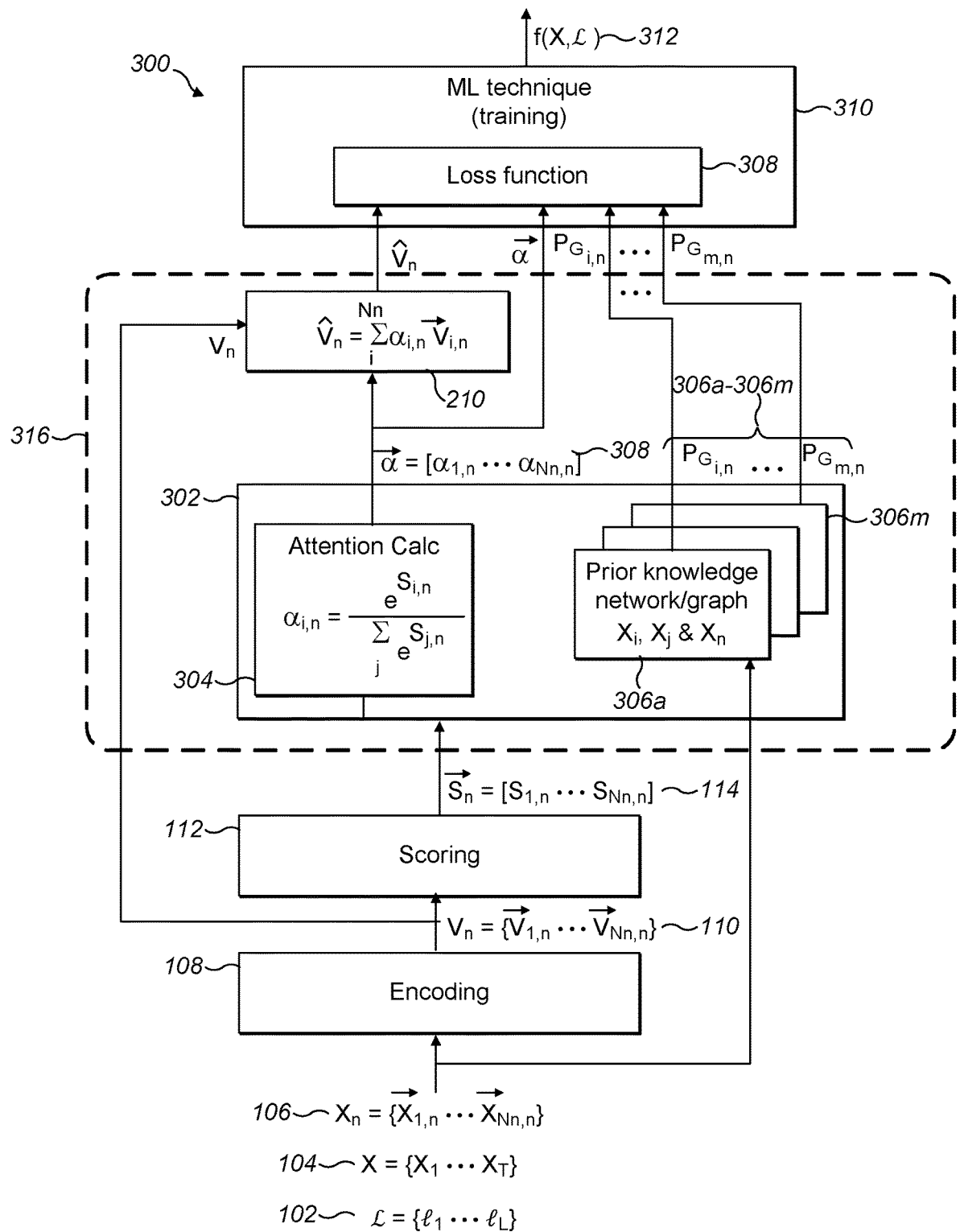
FIG. 3b is a schematic diagram illustrating yet a further example system and attention mechanism according to the invention.

FIG. 3b is a schematic diagram illustrating yet a further example of system 300 of FIG. 3a in which the attention mechanism 316 includes a plurality of prior knowledge graph(s) $G_1, \ldots, G_m$. The loss function 308, $L(f(X),\ell)$, used by the ML technique during training over labelled data set X is modified to include the contribution of the plurality of prior knowledge graph(s) $G_1, \ldots, G_m$. The modified loss function may be considered an attention-loss function, $AL(X,\ell,\vec{\alpha}_n)$, which includes a regularising term/function (or attention regularisation function), $AF(G_l,\vec{\alpha}_k, X_k)$, based on using one or more prior knowledge graph(s) $G_1, \ldots, G_m$ in conjunction with attention vector of attention relevancy weights $\vec{\alpha}_n = [\alpha_{1,n}, \ldots, \alpha_{i,n}, \alpha_{N_n,n}]$ on each labelled set of training data $X_n$ to introduce an additional loss component to the loss function, $L(f(X),\ell)$. The modified loss function, so-called attention-loss function (AL) may be based on the following:

$$AL(X, \ell, \vec{\alpha}_n) = L(f(X), \ell) + \sum_{k=1}^{T} AF(G, \vec{\alpha}_k, X_k)$$

$$AF(G_l, \vec{\alpha}_k, X_k) = \sum_{(x_{i,n},x_{j,n})\in G_l} \lambda_l |\alpha_{i,k} - \alpha_{j,k}|$$

where each $\lambda_l \in \mathcal{L}^+$ is a hyperparameter selected to adjust the contribution of the prior knowledge graph $G_l$, and each attention score (or attention weight) $\alpha_{i,n}$ may be calculated based on any attention function such as, by way of example only but is not limited to, the SOFTMAX attention function $$\alpha_{i,n} = \frac{e^{s_{i,n}}}{\sum_j e^{s_{j,n}}}.$$

or the MAX attention function, sparsemax attention function, or any suitable attention function for calculating attention weights based on at least the set of scores associated with the set of data.

Thus, for each pair of training data instances $(x_{i,k},x_{j,k})$ which are related in the prior knowledge network $G_l$, a loss component $\lambda_l|\alpha_{i,k}-\alpha_{j,k}|$ is added to $L(f(X),\ell)$ which will be positive and, hence, a penalty in the task of minimizing $AL(X,\ell,\vec{\alpha}_n)$ if the attention function assigns different attention scores $\alpha_{i,n} \neq \alpha_{j,n}$ to a pair of training data instances $(x_{i,k},x_{j,k})$ which are related in the corresponding prior knowledge graph $G_l$. Furthermore, this penalty is proportional to the difference between the attention weights, $|\alpha_{i,k}-\alpha_{j,k}|$, and, hence, applies a greater penalty when this difference is greater. Otherwise, a loss component is not added to $L(f(X),\ell)$. Thus, the attention function acts as an attention filter that implicitly filters non-relevant training data instances, while simultaneously retaining instances that are related in the prior knowledge network if at least one of them is deemed to be relevant; or allows the ML model to learn how to filter out which training data instances are more relevant than others, and to use the prior knowledge networks to infer the relevance of a greater number of instances.

The n-th set of training data $X_n$ 106 is input to the encoding module 108 (e.g. an embedding network) that outputs a set of N-dimensional feature encoding vectors $V_n = \{\vec{v}_{1,n}, \vec{v}_{N_n,n}\}$ 110. The set of feature encoding vectors 110 are processed by a scoring module 112 (e.g. a scoring network) to generate a vector of scores $\vec{s}_n = [s_{1,n}, \ldots, s_{N_n,n}]$ 114, in which each score $s_{i,n}$ is associated with each feature encoding vector $\vec{v}_{i,n}$. The generated vector of scores 114 are passed to the attention mechanism 316 that includes an attention unit 302 comprising an attention calculation unit 304 and a set of prior knowledge network(s) 120a-120m. The attention network 204 calculates attention scores $\alpha_{i,n}$ based on an attention function such as, by way of example only but is not limited to, the SOFTMAX attention function $$\alpha_{i,n} = \frac{e^{s_{i,n}}}{\sum_j e^{s_{j,n}}}.$$

Based on these attention scores, the attention mechanism 116 outputs an attention score vector $\vec{\alpha}_n = [\alpha_{1,n}, \ldots, \alpha_{N_n,n}]$ and prior knowledge data $P_{Ga,n}$–$P_{Gm,n}$ to the ML technique 210. Each of the prior knowledge network(s) 120a-120m outputs prior knowledge data $P_{Ga,n}$–$P_{Gm,n}$ each of which comprise data representative of a different known relationship between each pair of training instances $x_{i,n},x_{j,n} \in X_n$. The ML technique 210 uses the n-th context vector $\hat{v}_n$, attention score vector $\vec{a}_n$ and the prior knowledge data $P_{Ga,n}$–$P_{Gm,n}$ to generate a modified loss function 212 that includes an additional loss component that penalises the ML model 214 during training when it makes an incorrect association between training data instances.

As an example, a loss function, $L(f(X),\ell)$, used by an ML technique during training over labelled data set X is modified to further include an attention filtering mechanism according to the invention. The modified loss function 212 may be considered an attention-loss function, $AL(X,\ell,\vec{\alpha}_n)$, which includes an attention function, $AF(G_l,\vec{\alpha}_k,X_k)$, based on using one or more prior knowledge graph(s) $G_1, \ldots, G_m$ in conjunction with attention vector of attention scores $\vec{\alpha}_n = [\alpha_{i,n}, \ldots, \alpha_{N_n,n}]$ on each labelled set of training data $X_n$, that introduces an additional loss component to the loss function, $L(f(X),\ell)$. The modified loss function 212, a so-called attention-loss function (AL), may be based on:

$$AL(X, \ell, \vec{\alpha}_n) = L(f(X), \ell) + \sum_{k=1}^{T} AF(G, \vec{\alpha}_k, X_k)$$

$$AF(G_l, \vec{\alpha}_k, X_k) = \sum_{(x_{i,n},x_{j,n})\in G_l} \lambda_l |\alpha_{i,k} - \alpha_{j,k}|$$

where each $\lambda_l \in \mathbb{R}^+$ is a hyperparameter selected to adjust the contribution of unrelated training data instances based on the prior knowledge graph Gl, and each attention score $\alpha_{i,n}$ may be calculated based on any attention function such as, by way of example only but is not limited to, the SOFTMAX attention function $$\alpha_{i,n} = \frac{e^{s_{i,n}}}{\sum_j e^{s_{j,n}}}.$$

Thus, for each pair of training data instances $(x_{i,k}, x_{j,k})$ which are related in the prior knowledge graph $G_l$, a loss component $\lambda_l |\alpha_{i,k} \in \alpha_{j,k}|$ is added to $L(f(X), \ell)$. If the attention network in the ML model 214 assigns different attention weights to the training data instances $(x_{i,k}, x_{j,k})$, then this component will be positive and, hence, correspond to adding a penalty to the loss function $L(f(X), \ell)$. Otherwise, a loss component is not added to $L(f(X), \ell)$. Thus, the attention-loss function acts as an attention filter that implicitly filters non-relevant training data instances, while simultaneously attempting to retain instances that are related in the prior knowledge graph if at least one of them is deemed relevant; or allows the ML model 214 to learn how to filter out which training data instances are more relevant than others, while respecting the assumptions in the prior knowledge network.

Although FIGS. 3a and 3b describes using the attention mechanism 316, by way of example only but not limited to, training ML techniques to generate ML models and/or classifiers, it is to be appreciated by the skilled person that the attention mechanism 316 and/or the loss function mechanism 308 may also be applicable for use on input datasets for use with ML models and/or classifiers trained by aforesaid ML techniques. The systems 300 and attention mechanisms 316 as described with reference to FIGS. 3a-3b may also be applied to ML models and/or classifiers.

The attention filtering mechanism(s), method(s), apparatus and system(s) as described with reference to FIGS. 1a-3b may be used with any ML technique, model or classifier as the application demands. Although the following example application relates, by way of example only but is not limited to, to relational extraction (RE) and/or natural language processing based application(s), it is to be appreciated by the skilled person that the attention filtering mechanism(s), method(s), apparatus and system(s) as described with reference to FIGS. 1a-3b and as described herein in the following example(s), may be applied to any ML technique, ML model and/or classifier as the application demands. Typically, deep learning approaches to RE employ distant supervision from databases of known relations to tackle the lack of annotated text sources. One attempt at mitigating the errors inherent in this automated labelling scheme is the deployment of a conventional attention mechanism over data instances such as text mentions (e.g. sentences, statements, paragraphs of text) as an intermediate layer. However, such conventional set-ups suffer from an overly-selective concentration around a very limited (~1) set of text mentions (or mentions), which results in poor generalization across diverse textual patterns. The attention filtering mechanism(s), method(s), apparatus and system(s) according to the invention and as described herein may be applied to a distant supervision RE model that uses a structured attention layer based on the generalized fused lasso. Using the scientific citation network as the regularising structure prior knowledge, an average of 2× or more increase can be achieved in the effective number of selected mentions per extraction. This latter result is particularly relevant in domains (e.g. biomedical drug discovery) where interpretability and the need for human fact-checking and validation are as important as the overall accuracy of the predictions.

The application of an example attention mechanism according to the invention is now described with respect to MIL in the context of RE, neural network structures (e.g. RNN to encode sequences and FFNN), and/or NLP. It is to be appreciated by the skilled person that the notation and terminology used in describing the attention mechanism(s) in relation to FIGS. 1a-3b may be different, but are equivalent to that used to describe the following example attention mechanism for MIL in the context of RE. Where applicable, the notation and terminology used in relation to FIGS. 1a-3b will be shown in brackets indicating similar or the same notation/terminology in the following description. Although the notation and terminology used in relation to FIGS. 1a-3b will be shown in brackets indicating similar or the same notation/terminology, it is to be appreciated by the skilled person that the concepts and/or features of the following example attention mechanism as described may be applied or used to modify the attention mechanism(s) as described with respect to FIGS. 1a-3b.

RE is the process of extracting semantic relations between entities from across a range of text sources. While important in its own right both as a sub-field of computational linguistics and as a crucial component in natural language understanding/processing turning vast and rapidly expanding bodies of unstructured information embedded in texts into structured data is a necessary prerequisite for a wide variety logical and probabilistic reasoning applications, such as models and/or classifiers generated by ML techniques/tasks. From question answering to relational inference, the performance of these downstream ML techniques/tasks typically rely on having access to complete and up-to-date structured knowledge bases (KB) for, by way of example only but not limited to, labelled training data X.

In most real-world KB completion projects, it is well known that employing a fully supervised RE on unstructured text is not an option given the expense and sheer impracticality of building the necessary datasets. For example, there are, combinatorially, $\sim 10^8$ potential protein/gene relation entity pairs and $\sim 10^7$ PubMed Central articles that may be used to generate an input dataset of text mentions X for either training a model/classifier and/or for input to a trained model/classifier for probabilistic reasoning applications, relationship extraction and the like. Instead, distant supervision can be used in which curated databases of known relations/relationships/facts are used to automatically annotate the corpus of text mentions. For example, a dataset of text mentions X may be generated that describes a plurality of sets of text mention data $X_n$ for $1 \leq n \leq T$, where T is the number of sets of text mention data. Each set of text mention data $X_n$ is representative of multiple text mentions that are mapped to or associated with one of the known relations that is represented by a label $\ell_j \in \mathcal{L} = \{\ell_1, \ldots, \ell_L\}$, where $\mathcal{L}$ is a set of labels representing one or more of the known relations/relationship(s)/fact(s) and $L \geq 1$ is the number of known relations/relationships/facts in the set of labels $\mathcal{L}$. Each set of data $X_n$ includes multiple of text mention data instances $\{x_{1,n}, \ldots, x_{N_n,n}\}$, where each text mention data instance $x_{i,n}$ includes data representative of a text mention from the corpus of text mentions.

A text mention may include, by way of example only but it not limited to, a sentence, statement or paragraph that may describe a relation between multiple entities or entity pairs such as, by way of example only but not limited to, the subject(s) of a sentence. In the biological field of drug discovery and/or optimisation, an entity of a text mention (e.g. a sentence or statement in a text corpus) may include, by way of example but not limited to, one or more compound(s), one or more protein(s), one or more target(s), one or more gene(s), or combinations of pairs thereof and the like (e.g. an entity may be a biological/biomedical entity such as, by way of example only but is not limited to, a disease, a gene, a protein, a drug, a compound, a molecule, a biological pathway, a biological process, an anatomical region, anatomical entity, tissue, or cell type, and the like, etc.). For example, a text mention may be a sentence or statement found in a piece of literature such as, by way of example only but not limited to, "A is a treatment for modulating B", where A is an entity such as a protein or drug/compound and B is another entity such as a gene etc. Thus, "A" may be extracted as a first entity and "B" may be extracted as a second entity. Since the first and second entities occur in a mention, then they may form an entity pair. In another example, a text mention may be a sentence or statement found in a piece of literature such as, by way of example only but not limited to, "More than 40% of familial cerebral cavernous malformations (CCM) flag patients are affected with mutations in KRIT1, most mutations causing the truncation of the KRIT1 protein", where "CCM" is annotated as a disease entity, "KRIT1" is annotated as a gene entity, and "KRIT1 protein" is annotated as a protein entity. "CCM" may be referred to as the first entity, "KRIT1" may be referred to as the second entity, and "KRIT1 protein" may be referred to as the third entity in the sentence. Each pair of entities in this sentence can be considered an entity pair in a text mention, and give rise to three text mentions describing the relationships between the first and second entities, the first and third entities, and the second and third entities, respectively. A text mention can be generated by a pair of entities, which could be proteins, genes, diseases, compounds, or any other concept of interest, occurring in a span of text, which could be a single sentence, a pair of consecutive sentences, a paragraph, or an entire document.

Although these examples describe using entity pairs within text mentions that are based on, by way of example only but not limited to, protein(s)/gene(s), it is to be appreciated by the skilled person that the entity pairs and mentions as described herein can be based on any kind of information from a corpus of data as the application demands. For example, the text mentions could be replaced by images and entity pairs replaced by multiple portions of an image that may have or be associated with a particular relation, with each of these image portions corresponding to an instance in a multi-instance data set. In binary relational extraction, for example, a positive label $\ell_j \in \mathcal{L} = \{\ell_1, \ldots, \ell_L\}$ may be assigned to every text mention associated with the relation represented by label $\ell_j$ and may form a labelled training text mention data instance $x_{i,n}$ containing data representative of the respective entity-group query.

In the preparation of the datasets such as an input dataset of text mentions X comprising a plurality of sets of text mention data $X_n$ and the design/training of the model/classifier, a common question arises as to how much evidence or text mention data should one gather in support of each extracted relation represented by label $\ell_j \in \mathcal{L} = \{\ell_1, \ldots, \ell_L\}$. For example, in certain cases, a partial subset may be sufficient such as a single text mention data instance $x_{i,n}$ in the extreme case. For instance, the statement "Aage is the son of Niels" unambiguously establishes a paternal relation. In general, however, for the most part such as, by way of example only but not limited to, complex relationships (e.g. genetic interactions), temporal relational facts (e.g. "Barack Obama is the president of the United States"), or incomplete or inconsistent pieces of information this partial-evidence approach is highly fragile. A robust RE framework has to be defined by a commitment to pull in the entire body of textual evidence prediction.

Distantly supervised RE, in its original formulation of labelling every co-occurring entity pair mention, takes this complete, but no doubt trivial, approach to evidence gathering. In practical implementations, however, one is driven to relax the completeness criteria by the need to mitigate the negative effects on the model/classifier predictions of such a noisy dataset with multiple false positive labels. For instance, a Multi-Instance Machine Learning (MIML)-RE approach, under the assumption that at least one mention supports each relation, reverts to the (extreme) partial evidence set-up by learning and using that single mention and ignoring other possibly relevant mentions. It is not difficult to appreciate that in addition to the consistency and temporal issues highlighted above, discarding a large proportion of the available text data, e.g. a large proportion of training data instances $\{X_{1,n}, \ldots, x_{N_n,n}\}$ from $X_n$, at training time compromises the ability of the ML model/classifier itself to generalise across a wide variety of textual patterns.

Although implementing a nave attention mechanism over the data text mention instances $x_{i,n}$, for each set of text mention data $X_n$, (e.g. via a SOFTMAX function over scores or potentials) may be able to select data instances, it severely suffers from the problem of being too "peaky"; that is being too overly-selective and concentrated around a very limited set of text mention data instances. For example, for any given entity-pair query, it has been observed that almost all the probability mass (>0.99) gets allocated to the top 2 text mention data instances, regardless of the number of text mention data instances. It is desirable that this behaviour is mitigated, but usually maximizing the coverage over text mentions is typically not an explicit objective in the training process of an ML technique using nave attention mechanisms.

The attention mechanism according to the present invention solves the overly "peaky problem" and aims to maximise the coverage over text mention data instances, and further aims to solve the above-mentioned challenges in relation to generating labelled training datasets, by implementing a selective attention mechanism over text mention data instances that is not too selective, yet is capable of selecting a set of text mention data instances that are most relevant for the training process. The attention mechanism makes use of prior knowledge between text mention data instances to maximise coverage over text mentions and, as a result, enhance the training process and reliability of the models/classifiers produced. In this context, the evidence selection task itself is wrapped up in an end-to-end differentiable learning program. This provides various advantages such as, by way of example only but is not limited to, tackling the false-positive labelling problem, and exposing the attention weights (also referred to herein as attention relevancy weights $\alpha_{i,n}$) that are, naturally, the evidence weights for a given prediction. This latter feature is important for both fact-checking and for presenting to human users nuanced evidence sets for ambiguously-expressed relationships.

The example attention mechanism is based on the concept that two separate text mention data instances that are somehow related are more likely than not to contribute equally weighted evidence towards a putative relation. This relatedness can take many forms. For example, text mention data instances that appear in the same publication, or text mention data instances with the same author, etc. Concretely, this implies that related text mention data instances should have similar attention weights. The example attention mechanism encodes this as prior knowledge between text mention data instances and aims to bias the ML technique for generating a model and also the resulting model towards effectively larger evidence sets and towards better overall generalization abilities. The example attention mechanism may be configured as a simple drop-in replacement for conventional attention mechanisms such as, by way of example only but not limited to, any (unstructured) softmax attention function or naive attention mechanisms and the like.

The application of an example attention mechanism according to the invention is now described with respect to MIL in the context of RE, neural network structures (e.g. RNN to encode sequences and FFNN), and/or NLP. It is to be appreciated by the skilled person that the notation and terminology used in describing the attention mechanism(s) in relation to FIGS. 1a-3b may be different, but are equivalent to that used to describe the following example attention mechanism for MIL in the context of RE. Where applicable, the notation and terminology used in relation to FIGS. 1a-3b will be shown in brackets indicating similar or the same notation/terminology in the following description. Although the notation and terminology used in relation to FIGS. 1a-3b will be shown in brackets indicating similar or the same notation/terminology, it is to be appreciated by the skilled person that the concepts and/or features of the following example attention mechanism as described may be applied or used to modify the attention mechanism(s) as described with respect to FIGS. 1a-3b. In the following, vectors are defined in lower case bold.

The example attention mechanism is based on a structure in which the attention weights (a.k.a. attention relevancy weights) are regularised with an attention function based on the Generalised Fused Lasso (GFL), where the total variation terms are imposed over a graph of mentions (e.g. cf. prior knowledge graph(s)/network(s)) where the edges encode a measure of similarity.

Conventional attention mechanism structures in neural networks are typically implemented as a potential function $\mathcal{P}_z$, which maps a list of text mention data instance encodings (also referred to as encoding vector V) to a vector of potentials z (also referred to herein as vector of scores $\vec{s}$), and a subsequent mapping from the vector of potentials to the probability simplex $\mathcal{P}_A$. In most applications of attention mechanisms, this second step is implemented by the softmax operator to generate an attention relevancy weight, denoted $w_k$ (also referred to as $\alpha_k$), as:

$$w_k = \frac{\exp(z_k)}{\Sigma_{k' \in [N_M]} \exp(z_{k'})}.$$

Instead, the example attention mechanism according to the invention is based on the GFL that can be used to calculate an attention relevancy weight vector, w, based on:

$$w = \mathrm{argmin}_{w \in \Delta^{N_M - 1}} \frac{1}{2} \|w - z/\lambda\|^2 + \lambda \sum_{(a,b) \in G} |w_a - w_b|,$$

where G is a prior knowledge graph/network defined on the input data instances and $\lambda \in \mathbb{R}^+$ is a hyper-parameter. This graph-structured attention mechanism is used to incorporate a citation network as a prior knowledge graph G in biomedical relationship extraction.

The relational extraction model that may be used with the example attention mechanism according to the invention is now described and uses the following notation, definitions and conventions. In the following, the sequence of integers 1, 2, . . . , n is represented by [n]. Abstract objects such as word tokens, mentions, etc. are represented by Greek letters ($\mu$, $\rho$, . . . ) while vector embeddings/encodings are represented by bold-faced non-italicised letters (v,m).

Relational extraction is based on identifying entities (e.g. protein "A", protein "B", gene "C", compound "D" etc.) within a corpus. The entities are based on a fixed-sized vocabulary of word tokens in the following manner. Let $\mathfrak{T} = \{\tau_i\}_{i=1}^{N_\mathfrak{T}}$ be a fixed-sized vocabulary of word tokens and $E = \{\varepsilon_i\}_{i=1}^{N_E}$ a set of entities, with $N_E < N_\mathfrak{T}$. A function $f_{E \to \mathfrak{T}}$ that maps every entity to its synonyms may be defined as follows:

$$f_{E \to \mathfrak{T}} : E \to P\mathfrak{T} \setminus \emptyset$$

$$\varepsilon_i \mapsto \{\tau_{i_1}, \tau_{i_2}, \ldots, \tau_{i_m}\},$$

where P(S) is the power-set of some set S and $i_* \in [N_\mathfrak{T}]$ the indices that define the word representations in the vocabulary of the entity $\varepsilon_i$. The reverse function $f_{\mathfrak{T} \to E}$ that captures the inherent ambiguity of word tokens may be defined as follows:

$$f_{\mathfrak{T} \to E} : \mathfrak{T} \to P(E) \setminus \emptyset$$

$$\tau_j \mapsto \{\varepsilon_{j_1}, \varepsilon_{j_2}, \ldots, \varepsilon_{j_n}\},$$

where $j_* \in [N_E]$ indexes in E all the potential entities that the token $\tau_j$ references.

Let $\mathcal{P}$ be some rule-based or separately-trained entity-linking model that projects a single entity from the set of dictionary candidates for each word, i.e. $\mathcal{P} : \{\varepsilon_{j_1}, \varepsilon_{j_2}, \ldots, \varepsilon_{j_n}\} \mapsto \varepsilon_{j_a}, \alpha \in [n]$. A domain-dependent subset may be defined as $E' \subset E$ with size $N_{E'}$. E' is collectively referred to as the named entities—this is typically a specification of the relevant noun categories of interest. For example in the drug discovery field, the relevant named entities classes that define E' are drugs/compounds, diseases, and/or proteins/genes (e.g. an entity may include a biological/biomedical entity such as, by way of example only but is not limited to, a disease, a gene, a protein, a drug, a compound, a molecule, a biological pathway, a biological process, an anatomical region, anatomical entity, tissue, or cell type, and the like, etc.). In another example, such as social-network analysis field, these could be celebrities, politicians, etc. A relational extraction exercise would then focus on relations between named entities.

Although a partition of $\mathfrak{T}$ may be defined for defining word embeddings that are appropriate to a given class of words, for simplicity a single word embedding/encoding vector space may be defined. Partitioning of partition of $\mathfrak{T}$ may be useful, in a vocabulary that includes all the elements in a syntactic parse of a piece of text might separate the text symbols from the dependency relations that link them; the former contains ~$10^6$ elements while the latter only $10^2$, which means that separate embedding spaces may be useful.

Having defined entities, the text mention data instances for a dataset X may be constructed based on so-called text mentions. For a given pair of entities ($\varepsilon_i$, $\varepsilon_j$), a set of entity-pair text mentions $$M^{(i,j)} = \{\mu_k^{(i,j)}\}_{k=1}^{N_{M^{(i,j)}}}$$

(also referred to herein as a set of data $X_n$ or a set of text mention data $X_n$, where $n=M^{(i,j)}$) may be constructed from a text corpus in which each text mention is a sequence of words that contains, in the following sense, the two entities. Although each text mention is defined, by way of example only but not limited to, as a sequence of words, it is to be appreciated by the skilled person that mentions are not limited to only sequences, but may include, by way of example only but not limited to, any sentence, paragraph, statement of text and the like. Although most forms may be sequential, with sentences being the most common, other examples of mentions that are non-sequential include, by way of example only but is not limited to, a sentence span between the two entities, contiguous sentences, paragraphs, statements or even whole documents. Non-sequential forms may typically be parse-trees.

If $\mu_k^{(i,j)}=(\tau_{k_1}, \tau_{k_2}, \ldots, \tau_{k_n})$ is a mention (e.g. a k-th text mention data instance $x_{k,n}$ that includes entities $\varepsilon_i$ and $\varepsilon_j$, where $n=M^{(i,j)}$) consisting of s words, say, then there exists, by definition, some $p, q \in [s]$, with $p \neq q$ such that $\mathcal{P}(f_{\mathfrak{X} \to E}(\tau_{k_p}))=\varepsilon_i$ and $\mathcal{P}((f_{\mathfrak{X} \to E}(\tau_{k_q}))=\varepsilon_j$. For the sake of notational tidiness, the entity-pair superscripts for the text mentions, where there is no ambiguity, will be dropped i.e. $\mu_k^{(i,j)} \to \mu_k$.

Relations/relationships between entities may be defined based on the following. Let $R=\{\rho_r\}_{r=1}^{N_R}$ be a set of relation objects in a pre-specified schema. A binary rank-3 tensor may be defined as: $Y \cong \mathbb{Z}_2^{N_E \times N_E \times N_R}$, where the components $Y_{ijr}=1$ if entity $\varepsilon_i$ is linked to entity $\varepsilon_j$ via relation $\rho_r$, and $Y_{ijr}=0$ otherwise. The relations are, in general, directed and, hence, $Y_{ijr} \neq Y_{jir}$.

One of the problems in relational extraction is to estimate the unknown components of P using a set of mentions M (e.g. one or more sets of data $X_n$) built from the relevant text corpuses. This involves constructing a statistical model to construct a score tensor $S \approx \mathbb{R}^{N_E \times N_E \times N_R}$, which is then projected onto a tensor of probabilities $\hat{Y}$ via, in this instance by way of example only but not limited to, an element-wise sigmoid function $\sigma$, i.e.

$$\hat{Y}_{ijr} = [\sigma(S)]_{ijr} \equiv \frac{1}{1+e^{-S_{ijr}}}.$$

The known components of $\hat{Y}$ (e.g. cf. relationships represented by labels $\mathcal{L}$) may be used as training labels for a training in a distant supervision framework.

Given this notation an example relational extraction model architecture may be described as follows. In this example, the RE model architecture includes an encoder module, the example attention module/mechanism according to the invention, and a classification module. The encoder module receives the abstract dataset and outputs a vector encoding. The attention module may form the example attention mechanism, which receives the vector encoding and, in this example, includes a potential network (e.g. scoring network) and an attention network, which outputs attention filtering information in the form of a filtered vector encoding. The filtered vector encoding may be based on a weighted sum of the vector encoding weighted with attention relevancy weights as calculated.

The encoder module operates in the following manner. Let $\mathcal{W}: \mathfrak{X} \to \mathbb{R}^{d_\mathfrak{X}}$ be the function that maps abstract word tokens to $d_\mathfrak{X}$-dimensional real vectors, then the abstract word token, $\tau_i$, may be mapped to $t_i$ based on: $\tau_i \mapsto \mathcal{W}(\tau_i) \equiv t_i$, for $i \in [N_\mathfrak{X}]$ the vocabulary index. Similarly for relations, the embedding $\mathcal{R}: R \to \mathbb{R}^{d_R}$ may be the function that maps relations to $d_R$-dimensional real vectors, in which relation $\rho_r$ may be mapped to $r_r$ based on $\rho_r \mapsto \mathcal{R}(\rho_r) \equiv r_r$, for $r \in [N_R]$.

The functions $\mathcal{W}$ and $\mathcal{R}$ may be implemented as neural network structures that are configured to be either a pre-trained, fixed, embedding functions (e.g. via word2vec) or a trainable embedding matrices with $N_\mathfrak{X} \times d_\mathfrak{X}$ and $N_R \times d_R$ parameters entries respectively. The former may be used with already trained classifier/model and the example attention mechanism, whereas the latter may be trained when using the example attention mechanism during training of a ML technique that generates a model/classifier for relationship extraction and the like.

The entity-pair mentions are represented by the sequence of their word token vector representations $t_i$, i.e. for a mention $\mu_k=(\tau_{k_1}, \tau_{k_2}, \ldots, \tau_{k_n})$ containing n words, $\mu_k \mapsto m_k := (t_{k_1}, t_{k_2}, \ldots, t_{k_n})$ for $k_* \in [N_\mathfrak{X}]$. The mention $m_k$ may then be encoded as a $d_M$-dimensional real vector using a neural sequence encoder $\varepsilon$, in which:

$$\varepsilon: \mathbb{R}^{d_\mathfrak{X}} \times \ldots \times \mathbb{R}^{d_\mathfrak{X}} \to \mathbb{R}^{d_M}$$

$$m_k \mapsto x_k$$

where, $\varepsilon$ may be, by way of example only but is not limited to, a simple RNN, for example, $x_k$ is the final hidden state, i.e. $x_k \equiv h_n = \sigma(W_{ih} t_{k_n} + W_{hh} h_{n-1} + b)$, for $W_{ih} \in \mathbb{R}^{d_M \times d_\mathfrak{X}}$, $W_{hh} \in \mathbb{R}^{d_M \times d_M}$, $b \in \mathbb{R}^{d_M}$ the encoder parameters, with $h_0 \equiv 0$. Thus, the encoder module may output a matrix $X=[x_1, \ldots, x_k, \ldots, x_{N_M}]$ of $N_M$ mention encodings (e.g. cf. an encoded set of data $X_n$ or set of encoding vectors V in FIGS. 1a-3b).

The attention module is configured to receive the vector encoding of the mentions, which in this example, is the matrix X of mention encodings. The attention module uses an attention function, $\mathcal{A}$, to calculate the attention relevancy weights (or evidence weights) of the mentions with respect to a given relation $\rho_r$, defined as: $\mathcal{A}(X, r_r) \mapsto w^r \equiv (w_1^r, \ldots, w_{N_M}^r)$, where X is the matrix of mention encodings and $w^r$ is an attention relevancy weight vector in the M-dimensional probability simplex $\Delta^M$. The attention function $\mathcal{A}$ embodies the calculation of potentials (e.g. scores) associated with the matrix X of mention encodings and the calculation of attention relevancy weights based on the potentials and prior data associated with the mentions.

Once the attention relevancy weight vector $w^r$ has been determined for each set of mention encodings (e.g. data instances), then an attention filtered vector based on the aggregation of the evidence of instances or encoded mentions via a simple weighted sum is calculated, where for each entity-pair $x' \in \mathbb{R}^{d_M}$, the attention filtered vector may be based on: $x^{(r)} = \sum_{k=1}^{N_M} w_k^{(r)} x_k$, with $x^{(r)} \in \mathbb{R}^{d_T}$. Attention filtering information comprising data representative of the attention filtered vector $x^{(r)}$ may be sent or provided to the classifier module for, by way of example only but not limited to, relationship extraction and/or, if applicable, ML module implementing and training an ML technique for generating a model/classifier etc.

In this example, the attention module implements the attention mechanism in two parts; a) potential network based on a potential function (e.g. scoring network) and b) an attention network. Although the attention module implements both parts, for the potential network (a.k.a. scoring network), a potential function $\mathcal{P}_z$ is derived that maps a set or list of mentions to a vector of potentials z (e.g. scores). Then, the attention network applies a function $\mathcal{P}_\Delta$ to map z to the probability simplex.

For example, the function $\mathcal{P}_z$ may be implemented as a bilinear form that acts on each mention input independently. So for each relation $\rho_r$, $$\mathbb{R}_z : \mapsto d_M \times \mathbb{R}^{d_R} \to \mathbb{R}$$

$$(X_k, r_r) \mapsto z_k^r = x_k^T A r_r,$$

where $A \in \mathbb{R}^{d_M} \times \mathbb{R}^{d_R}$ is a learnable weight matrix. We refer to $z_k^r$ as the potential (or score) for mention k w.r.t. relation $\rho_r$, and let $z^r \equiv (z_1^1, \ldots, z_{N_M}^r)$.

In relation to the attention network, a probability mapping function $\mathcal{P}_A$ based on:

$$w = \mathrm{argmin}_{w \in \Delta^{N_M - 1}} \frac{1}{2} \| w - z/\lambda \|^2 + \lambda \sum_{(a,b) \in G} | w_a - w_b |,$$

where G is a prior knowledge graph defined on the input data instances and $\lambda \in \mathbb{R}^+$ is a hyper-parameter. The attention network may be, by way of example only but is not limited to, a neural network layer or a minimisation algorithm and the like. This graph-structured attention mechanism is used to incorporate a citation network as a prior knowledge graph G in biomedical relationship extraction, where G is the set of pairs of mention indices defining a structure graph (or prior knowledge graph) of mentions. For example, J Djolonga and A Krause, "Differentiable Learning of Submodular Models", In Proceedings of Neural Information Processing Systems (NIPS), December, 2017 showed that the mapping from z to w defined by solving the above optimisation problem corresponds to a differentiable function. This permits the use of this mapping as a neural network layer or as a neural network structure and the like.

The structure graph (or prior knowledge graph/network) over mentions is represented by G. In this example, a single structure graph is used for simplicity, but it is to be appreciated (e.g. see FIGS. 2b and 3b) that multiple structure graphs may be used. The structure graph G may be defined as the set of edges in the largest connected component of a citation network of papers represented by the mentions set M (e.g. input dataset X). More precisely, there is a directed edge $\mu_{k_1} \to \mu_{k_2}$ if the publication containing $\mu_{k_2}$ cites the (older) document containing $\mu_{k_1}$.

The restriction to the largest connected component of the citation network enables a significant simplification to be made, where the generalized fused lasso on the graph G may be approximated by a 1-dimensional fused lasso on the chain graph corresponding to a Depth First Search (DFS) traversal of G. In which the regularising term of the generalised fused lasso may be is replaced with $\Sigma_{(a,b) \in G} |y_a - y_b| \to \Sigma_{c \in DFS(G)} |y_{c+1} \ominus y_c|$, where DFS(G) is the sequence of mentions indices corresponding to a depth-first search pre-ordering of nodes in the graph G. By construction, the root of the DFS tree is the 'oldest' mention in G.

In this example, the classifier module receives the attention filtering information, which may include the data representative of the attention filtered vector $x^{(r)}$. The classifier module processes the attention filtered vector to calculate a score tensor for classifying the input data associated with the attention filtered vector. For example, the classifier module may implement a simple classifier to calculate a score tensor via a simple linear function $S_{ijr} = Wx^{(r)} + b$, where $x^{(r)} \equiv x^{(ijr)}$, and $W \in \mathbb{R}^{d_M}$ and $b \in \mathbb{R}$ are the parameters respectively. That is W is a parameter vector and b is a parameter value of the simple classifier, which may have been derived by training a certain ML technique. It is to be appreciated that the classifier module may be based on any other type of classifier or model, or one that has been generated by training a suitable ML technique.

As an example, a simplified setting of a single binary relation with $S_{ijr} \to S_{ij}$ may be used to demonstrate the system. Let $d_M = d_{\mathfrak{X}}$ and let A be a diagonal matrix and, without loss of generality, fix $r \equiv (1, 1, \ldots, 1)$. A model may be trained by a ML technique (e.g. neural network) to minimize the cross-entropy loss $L(\theta) = \Sigma_{(i,j) \notin Y'} \log(1 - \hat{Y}_{ij}(\theta)) - \Sigma_{(i,j) \in Y'} \log(\hat{Y}_{ij}(\theta))$, where Y' is the set of all known relation pairs in the knowledge base, and $\theta$ represents the trainable parameters in the neural network. During training, negative sampling may be performed from the complement set of un-linked pairs $Y'^c$ with a negative-positive ratio of 10. Specifically, for each pair positive pair $(\varepsilon_i, \varepsilon_j)$, a negative pair $(\varepsilon_i, \varepsilon_{j'})$ is sampled, where j' is sampled randomly from $[N_M]$ and satisfies $(\varepsilon_i, \varepsilon_{j'}) \notin Y'$. The model/classifier may be trained stochastic gradient descent with adaptive moment estimation (ADAM). In this manner, the attention module selects the most relevant subsets of the training dataset.

Figure 4A:
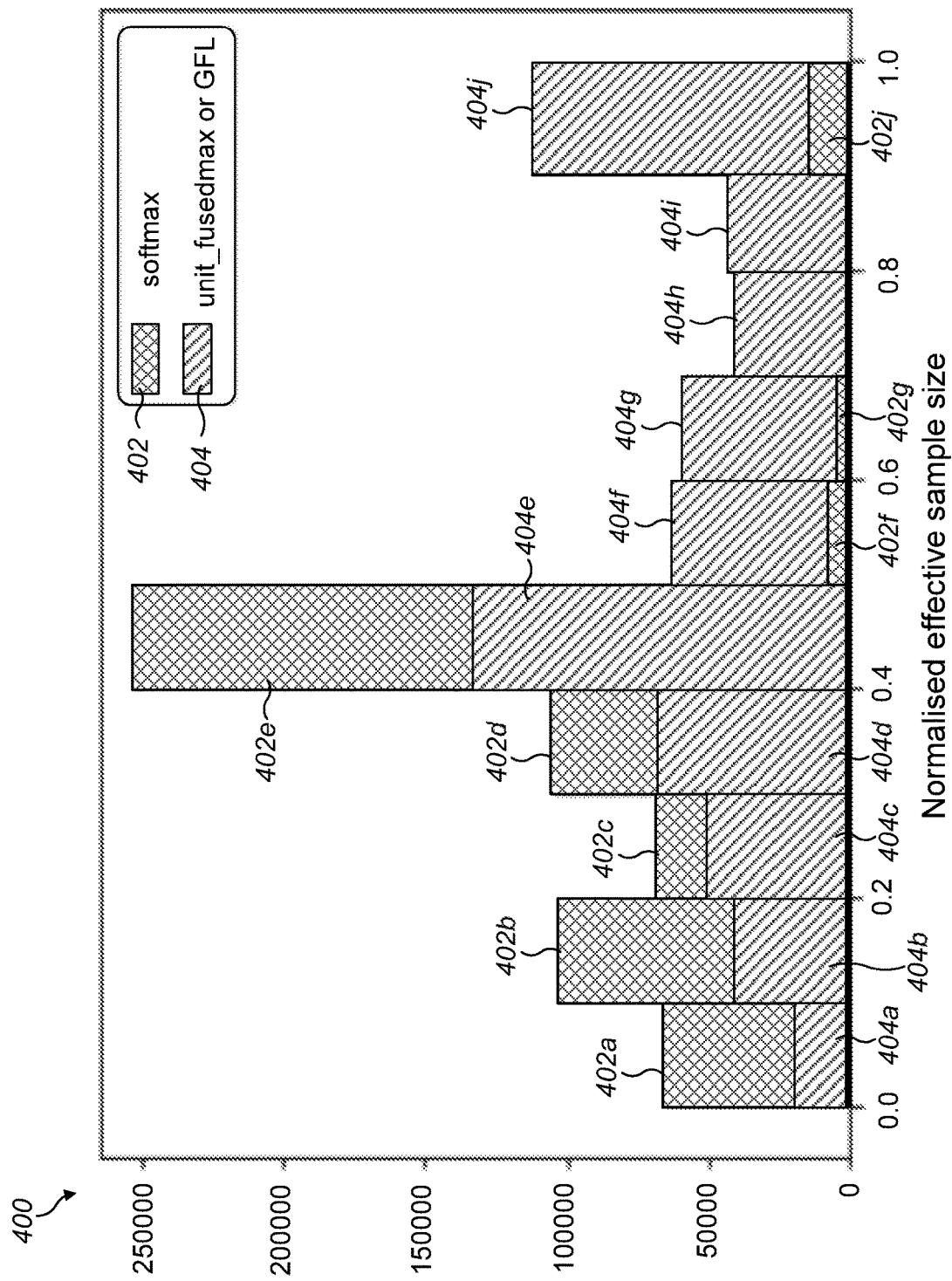
FIG. 4a is a diagram illustrating a histogram performance graph of the performance of a system using an conventional attention mechanism vs the performance of a system using an attention mechanism according to the invention.
Figure 4B:
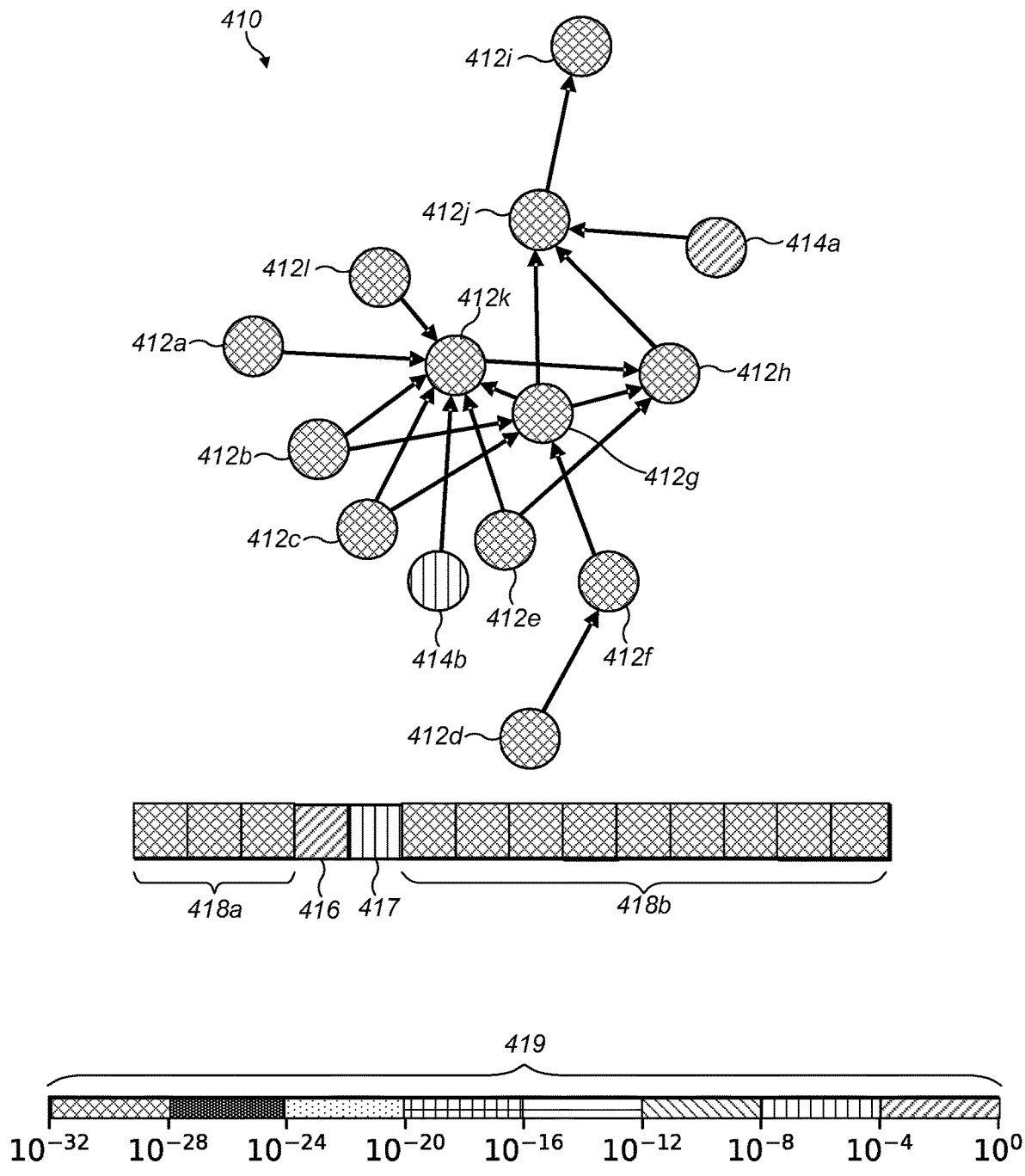
FIG. 4b is a schematic diagram illustrating prior knowledge network/graph for a system using a conventional attention mechanism.
Figure 4C:
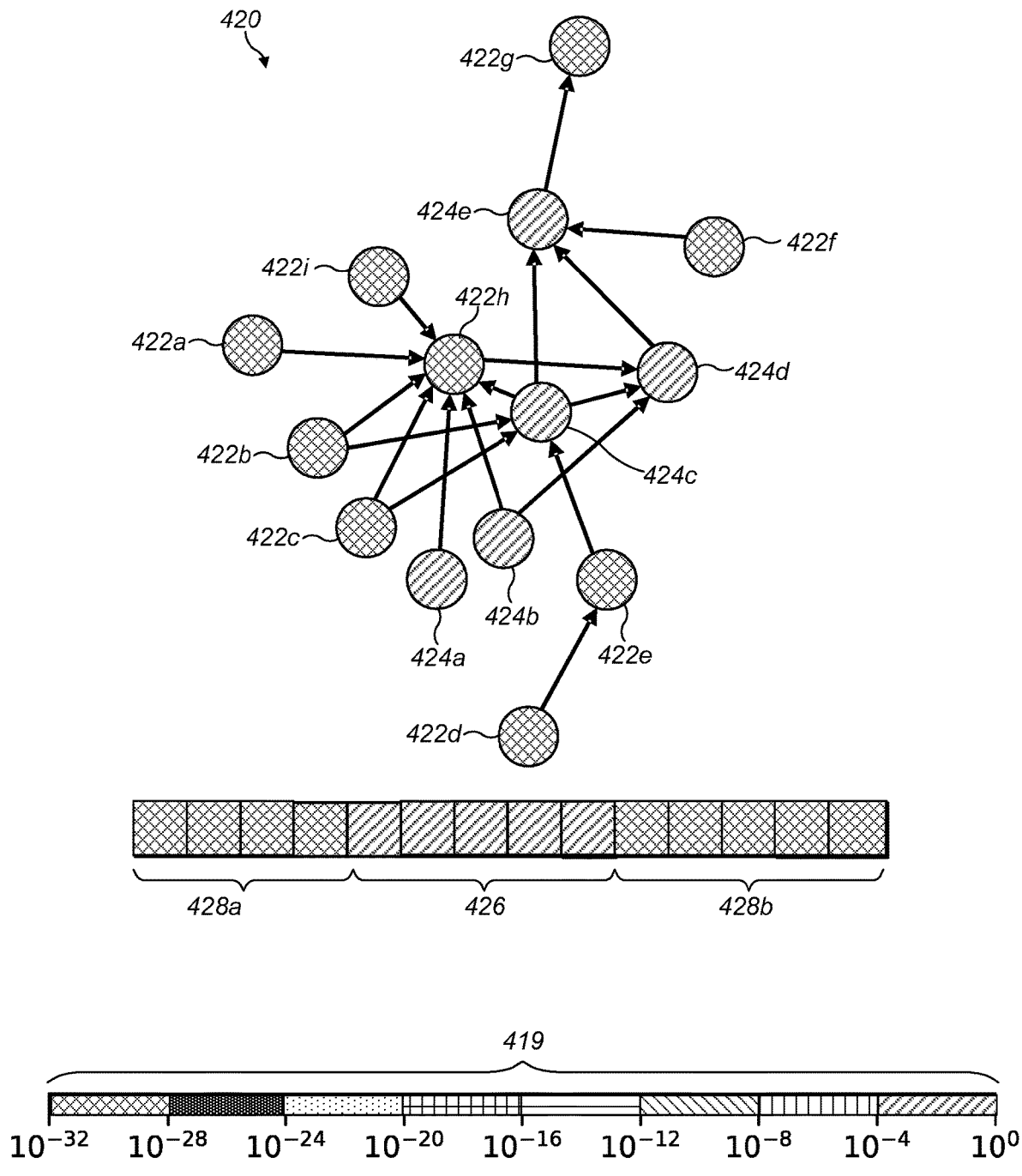
FIG. 4c is a schematic diagram illustrating prior knowledge network/graph for a system using an attention mechanism according to the invention.

The attention module/mechanism according to the invention is now tested by incorporating a structured attention layer for relational extraction in the context of link prediction in the human protein-protein interaction (PPI) network. FIGS. 4a, 4b and 4c demonstrate that a more distributed, less peaky, attention over mention instances results, which can assist in filtering out the irrelevant mentions and provide an improvement in accuracy of extracted relations. FIGS. 4a-4c also indicate that the scientific literature citation network/graph encodes useful prior knowledge that can assist in filtering a training dataset.

Although the following structured attention layer for relational extraction is described, by way of example only but is not limited to, extracting human protein-protein interaction from the literature, the skilled person will appreciate that the structured attention layer may be applied to any relational extraction problem or process. Some biomedical applications/examples may include (where the bold text provides highlights the possible entity pairs), by way of example only but is not limited to, extracting disease-gene associations from the literature (e.g. targeting IRAK1 as a therapeutic approach for Myelodysplastic Syndrome); extracting protein-protein interactions from the literature (e.g. identify the molecular mechanisms by which p-cav-1 leads directly to the upregulation of CD86), extracting disease-drug associations from the literature (e.g. oral administration of topiramate significantly reduced gross pathological signs and microscopic damage in primary affected colon tissue in the TNBS-induced rodent model of IBD); extracting drug mechanism of action associations from the literature (e.g. Topiramate also inhibits some isozymes of carbonic anhydrase (CA), such as CA-II and CA-IV); or extracting any type of first biological/biomedical entity-second biological/biomedical entity (e.g. a biological/biomedical entity may include, by way of example only but is not limited to, a disease, a gene, a protein, a drug, a compound, a molecule, a biological pathway, a biological process, an anatomical region, anatomical entity, tissue, or cell type) interaction, association, mechanism of action, or other relationship of interest from the literature as the application demands.

In operation, a PPI network knowledge base is built from OmniPath to form a database of human signalling pathways curated from the biomedical literature. The set of all PubMed (e.g. http://www.ncbi.nlm.nih.gov/PubMed) abstracts is used as the source of unstructured data. The abstract text was parsed using the Stanford dependency parser and lemmatized by BioLemmatizer. Protein names in the text were linked to proteins in the knowledge base using LeadMine.

For a pair of proteins within a sentence, each mention is defined to be the sequence of lemmas and dependencies along the shortest dependency path between the entities (excluding the entity pair tokens). From this a citation network may be formed. A random 0.70/0.15/0.15 training/validation/test split is performed of the OmniPath interacting protein pairs.

In order to characterise the increase distribution of attention relevancy weights, the mean Effective Sample Size (ESS) is used and is defined by:

$$N_M^{ESS} := \frac{\left(\sum_{k=1}^{N_M} \hat{w}_k\right)^2}{\sum_{k=1}^{N_M} \hat{w}_k^2}$$

where $\{\hat{w}_k\}_{k=1}^{N_M}$ is the test-time attention relevancy weights for a given entity pair. The result is that the mean effective number of mentions in the held out test set is increased. This is illustrated in FIG. 4a.

FIG. 4a is a diagram illustrating a histogram performance graph 400 showing the performance of a conventional attention mechanism 402 (e.g. softmax) against the performance of a structured attention mechanism according to the invention 404 (e.g. unit_fusedmax or GFL). The histogram 400 illustrates the distribution of effective sample sizes across positive entity-pairs in the held-out test set. The cross-hatched pattern bars 402a-402j of the histogram plot 400 illustrate the performance of the conventional attention mechanism 402. The right slash-hatched pattern bars 404a-404j of the histogram 400 illustrate the performance of the structured attention mechanism according to the invention 404. The histogram plot 400 uses the normalised ESS on the x-axis and frequency on the y-axis for comparing the structured attention (e.g. unit_fusedmax or GFL) according to the invention 404 with the conventional softmax attention layer 402 (e.g. softmax) on the same depth first search pre-ordering. The deficiencies of the softmax attention layer 402 are evident due to the increased "peakiness" of the histogram in this respect. The majority of the sample size occurs in a single bar 402e, whereas the distribution of the histogram for the structured attention mechanism according to the invention 404 is more evenly distributed.

FIG. 4b is a schematic diagram illustrating a prior knowledge "citation" network/graph 410 for a set of mentions related to PPI associated with insulin-hypocretin neuropeptide precursors. The prior knowledge network/graph 410 includes a plurality of nodes 412a-412l and 414a-414b representing each mention of the set of mentions. The nodes are overlaid with the magnitude of attention relevancy weights determined based on the conventional softmax attention layer 402.

Each of the magnitudes of the attention relevancy weights is illustrated by a hatched pattern that corresponds to the hatched pattern of the magnitude scale 419. The attention relevancy weights 418a, 416, 417 and 418b for each mention in the set of mentions are also illustrated along with the hatched patterns corresponding to their magnitudes. Thus, for a given entity pair from the held-out test set, the attention relevancy weights 418a, 416, 417 and 418b are extracted and overlaid over the corresponding nodes 412a-412l and 414a-414b of the citation network 410. In this example, it is clear that the conventional softmax attention layer focuses on only one mention represented by node 414a, which is overlaid with an attention relevancy weight 416 with a magnitude in the order of $10^0$. The mention represented by node 414b is overlaid with an attention relevancy weight 417 with a magnitude in the order of $10^{-8}$ to $10^{-4}$. The remaining mentions represented by nodes 412a-412l are overlaid with attention relevancy weights 428a and 428b with a magnitude in the order of $10^{-32}$ to $10^{-28}$, which for all intents and purposes is zero.

FIG. 4c is a schematic diagram illustrating a prior knowledge citation network/graph 420 for the set of mentions related to PPI associated with insulin-hypocretin neuropeptide precursors. The prior knowledge network/graph 420 includes a plurality of nodes 422a-422i and 424a-424e representing each mention of the set of mentions. The nodes are overlaid with the magnitude of attention relevancy weights determined based on the structured attention structured attention mechanism according to the invention 404.

Each of the magnitudes of the attention relevancy weights is illustrated by a hatched pattern that corresponds to the hatched pattern of the magnitude scale 419. The attention relevancy weights 428a, 426, 428b for each mention in the set of mentions are also illustrated along with the hatched patterns corresponding to their magnitudes. Thus, for a given entity pair from the held-out test set, the attention relevancy weights 428a, 426, and 428b are extracted and overlaid over the corresponding nodes 422a-422i and 424a-424e of the citation network 420. In this example, it is clear that the structured attention structured attention mechanism according to the invention 404 distributes the attention over multiple mentions represented by nodes 424a-424e, which are overlaid with an attention relevancy weight 426 with a magnitude in the order of $10^0$. The remaining mentions represented by nodes 422a-422i are overlaid with attention relevancy weights 428a and 428b with a magnitude in the order of $10^{-32}$ to $10^{-28}$, which for all intents and purposes is zero. As illustrated the structured attention structured attention mechanism according to the invention 404 has filtered the set of mentions to retain the most relevant mentions represented by nodes 424a-424e of the set of mentions.

Figure 5A:
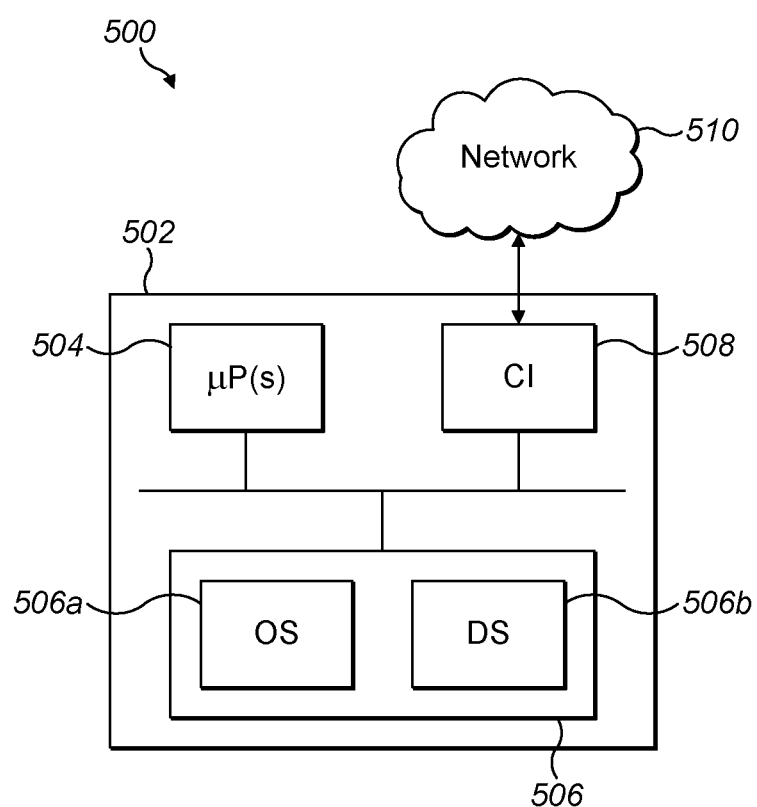
FIG. 5a is a schematic diagram illustrating a computing system/device according to the invention.

FIG. 5a is a schematic diagram illustrating a computing device 500 that may be used to implement one or more aspects of the ensemble model generation according to the invention and/or includes the methods and/or system(s) and apparatus as described with reference to FIGS. 1a-4b. Computing device 500 includes one or more processor unit(s) 502, memory unit 504 and communication interface 506 in which the one or more processor unit(s) 502 are connected to the memory unit 504 and the communication interface 506. The communications interface 506 may connect the computing device 500 with one or more databases or other processing system(s) or computing device(s). The memory unit 504 may store one or more program instructions, code or components such as, by way of example only but not limited to, an operating system 504a for operating computing device 500 and a data store 504b for storing additional data and/or further program instructions, code and/or components associated with implementing the functionality and/or one or more function(s) or functionality associated with one or more of the method(s) and/or process(es) of the apparatus, mechanisms and/or system(s)/platforms/architectures as described herein and/or as described with reference to at least one of FIGS. 1a to 4b.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform the system(s), apparatus, method(s) and/or process(es) or combinations thereof as described herein with reference to FIGS. 1a to 4b.

Figure 5B:
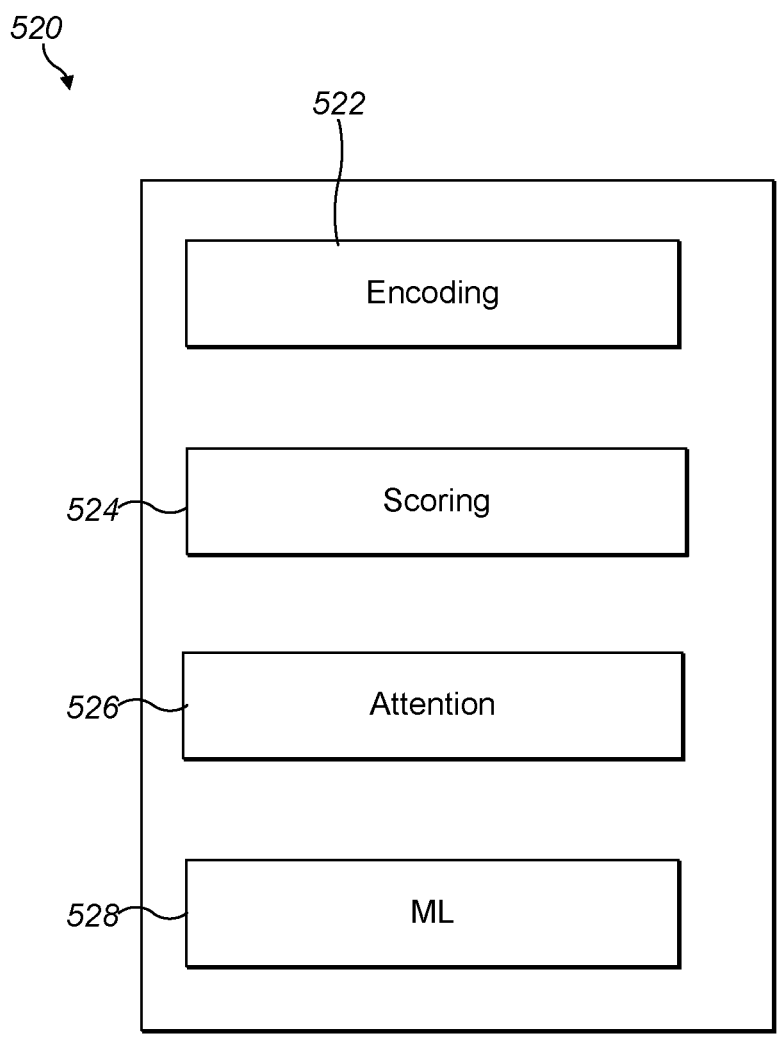
FIG. 5b is a schematic diagram illustrating a system according to the invention.

FIG. 5b is a schematic diagram illustrating a system 520 for filtering a set of data according to the invention. The system 520 includes an encoding module/device 522, a scoring module/device 524, an attention module/device 526 and a ML module/device 528. The encoding module/device 522 may include, by way of example only but is not limited to, an encoding network configured to encode an input dataset into one or more feature or encoding vectors. The input dataset may include a plurality of sets of data, in which each set of data includes multiple data instances. The scoring module/device 524 may include, by way of example only but is not limited to, a scoring network that is configured to generate a scoring vector for each of the one or more feature encoding vectors. The attention module/device 526 may include, by way of example only but is not limited to, an attention mechanism that is configured according to the method(s), process(es), attention apparatus and/or system(s) associated with the invention as described herein, or as described with reference to FIGS. 1a-5a for providing attention filtering information based on the encoding vectors and scoring vectors to ML technique, ML model or classifier.

The ML module/device 528 may be configured to receive the attention filtering information for training a ML technique to generate an ML model or classifier. Additionally or alternatively, the ML module/device 528 may be configured to receive the attention filtering information for input to an ML model (e.g. a trained ML model). Additionally or alternatively, the ML module/device 528 may be configured to receive the attention filtering information for input to a classifier. Although some of the functionalities of the system has, by way of example only but is not limited to, been described with reference to FIG. 5b, the skilled person would appreciate that the encoding module/device 522, scoring module/device 524, attention module/device 526, and/or ML module/device 528 may be configured to implement one or more of the functionalities, method(s), process (es), apparatus, system(s) and the like associated with filtering a set of data or a dataset according to the invention, modifications thereof, as described herein, and/or as described with reference to FIGS. 1a-5a.

In other aspects, an attention apparatus according to the invention may include a processor, a memory and/or a communication interface, the processor is connected to the memory and/or the communication interface, where the processor is configured to implement the process(es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process(es), modifications thereof, as described with reference to any one or more FIGS. 1a to 5b.

In a further aspect, an attention apparatus according to the invention may include a processor and/or a communication interface, the processor connected to the communication interface, where: the communication interface is configured to receive a set of scores for each set of data of an input dataset comprising a plurality of sets of data, in which each set of data comprises multiple data instances; the processor is configured to determine attention filtering information based on prior knowledge of one or more relationships between the data instances in said each set of data and calculating attention relevancy weights corresponding to the data instances and each set of scores; and the communication interface is configured to provide the attention filtering information to a machine learning, ML, technique or ML model.

Furthermore, the process(es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process(es), modifications thereof, as described with reference to any one or more FIGS. 1a to 5b may be implemented in hardware and/or software. For example, the method(s) and/or process(es) for filtering, generating, training and/or implementing an attention mechanism, training and/or using ML models with the attention mechanism, training and/or using ML techniques for generating ML models using the attention mechanism, using and/or training classifiers with the attention mechanism as described with reference to one or more of FIGS. 1a-5b may be implemented in hardware and/or software such as, by way of example only but not limited to, as a computer-implemented method(s), and executed by one or more processor(s)/processor unit(s) or as the application demands. Such apparatus, system(s), process(es) and/or method(s) may be used to filter a set of data using the attention mechanism for generating ML models and/or classifiers and/or for input or use with ML models and/or classifiers as described with respect to the process(es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process(es), modifications thereof, as described with reference to any one or more FIGS. 1a to 5b, modifications thereof, and/or as described herein and the like. An ML technique may be trained to generate an ML model or classifier based on filtering a labelled training dataset comprising a plurality of sets of data from computer-implemented method(s), process (es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process (es), as described with reference to any one or more FIGS. 1a to 5b, modifications thereof and/or as described herein. As well, classifying or using an ML model based on filtering an input dataset may be achieved using computer-implemented method(s), process(es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process(es), as described with reference to any one or more FIGS. 1a to 5b, modifications thereof and/or as described herein. Thus, an ML model and/or classifier may be obtained from computer-implemented method(s), process(es) 120, 130, and/or apparatus/systems 100, 200, 220, 230, 300, 400, 410, 420, 500 and 520, and/or prior knowledge graphs 240, 250, 260, 270, and/or ML model(s), classifier(s), and/or any method(s)/process(es), step(s) of these process(es), as described with reference to any one or more FIGS. 1a to 5b, modifications thereof and/or as described herein.

Furthermore, an ensemble model or a set of models may also be obtained process(es) 100, 120, 500 and/or apparatus/systems 200, 220, 238, 250, 400, 410, and/or any method(s)/process(es), step(s) of these process(es), as described with reference to any one or more FIGS. 1a to 4b, modifications thereof, and/or as described herein, some of which may be implemented in hardware and/or software such as, by way of example only but not limited to, a computer-implemented method that may be executed on a processor or processor unit or as the application demands. In another example, a computer-readable medium may include data or instruction code representative of an ensemble model according to any one of the ensemble model(s) as described above and/or as described herein, which when executed on a processor, causes the processor to implement the ensemble model.

In the embodiment(s) described above the computing device, system may be based on a server or server system that may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method for filtering a set of data, the set of data comprising multiple data instances, the method comprising:
receiving a set of scores for the set of data, wherein each data instance comprises data representing a span of text extracted from a corpus of literature, said span of text describing a relationship between biological or biomedical entities;
determining attention filtering information based on prior knowledge of one or more relationships between the data instances in said set of data and calculating attention relevancy weights corresponding to the data instances and the set of scores; and
providing the attention filtering information to a machine learning (ML) model or a ML technique for training the ML model, wherein:
the ML model is a relational extraction (RE) model for extracting an interaction, association, or mechanism of action between a first biological or biomedical entity and a second biological or biomedical entity from the literature;
calculating the attention relevancy weights comprises searching for a set of attention relevancy weights that minimise a cost function based on the set of scores and prior knowledge of one or more relationships between the data instances in said set of data;
determining the attention filtering information further comprises filtering the data instances in the set of data by calculating a weighted combination of the calculated attention relevancy weights with an encoding vector associated with the corresponding data instances of said set of data; and
providing the attention filtering information further comprises providing data representative of the filtered data instances to the ML technique or ML model.

2. The computer-implemented method according to claim 1, wherein the set of data is a labelled set of training data of a training dataset, the training dataset comprising a plurality of labelled sets of training data, wherein each labelled set of training data comprises a multiple training data instances, and wherein each labelled set of training data is filtered.

3. The computer-implemented method according to claim 2, wherein each of the multiple training data instances are representative of a relationship between one or more entities.

4. The computer-implemented method according to claim 2, wherein each training data instance of each set of training data is associated with the same label in relation to a relationship $y_n$ and comprises data representative of evidence supporting the relationship $y_n$ being true or false.

5. The computer-implemented method according to claim 1, wherein the set of scores is based on a scoring network operating on feature encoding vectors embedding the corresponding data instances, the scoring network based on a neural network structure.

6. The computer-implemented method according to claim 1, wherein prior knowledge of one or more relationships comprises a set of prior knowledge networks or a set of prior knowledge graphs, each prior knowledge network or prior knowledge graph representing a particular type of relationship between data instances of the set of data.

7. The computer-implemented method according to claim 6, wherein the set of prior knowledge graphs comprises one or more prior knowledge networks or graphs from the group of:
a citation network or graph; or
a reference network or graph providing an indication of a relationship between data instances located in the same document in a corpus of literature; or a reference network or graph providing an indication of a relationship between data instances located in different documents in a corpus of literature.

8. The computer-implemented method according to claim 1, further comprising:
outputting the attention relevancy weights as attention relevancy weight vectors and wherein determining the attention filtering information further comprises searching the attention relevancy weight vectors for an attention relevancy weight vector that minimises, over all attention relevancy weight vectors, a cost function based on a similarity between the attention relevancy weight vector and a scoring vector and prior knowledge between data instances of said set of data.

9. The computer-implemented method of claim 8, wherein searching for the attention relevancy weight vector further comprises minimising an attention cost function:

$$\Lambda(\vec{s_n}) = \arg\min_{\vec{\alpha} \in \Delta^n} \left\{ \frac{1}{2} \|\vec{s_n} - \vec{\alpha_n}\|_2^2 + \sum_{(x_{i,n}, x_{j,n}) \in G1} \lambda_1 |\alpha_{i,n} - \alpha_{j,n}| + \cdots + \sum_{(x_{i,n}, x_{j,n}) \in Gm} \lambda_m |\alpha_{i,n} - \alpha_{j,n}| \right\}$$

in relation to the attention relevancy weight vector, $\vec{\alpha_n}$, for $1 \le n \le T$, where T is a number of sets of data, $\Lambda(\cdot)$ is the attention cost function that maps a score vector, $\vec{s_n}$ for each set of data to a probability distribution $\Delta^n = \{\alpha_i \le 0, \Sigma \alpha_i = 1\}$, $G_1, \ldots G_m$ for $1 \le m$ are prior knowledge networks or graphs representing whether each pair of data instances $(x_{i,n}, x_{j,n})$, for $1 \le i \le j \le N_n$, have a relationship or not, each $\lambda_r \in \mathbb{R}^+$ for $1 \le r \le m$ is a hyperparameter selected to adjust a contribution of the prior knowledge graph Gr.

10. The computer-implemented method of claim 9, wherein:
- a prior knowledge graph Gr assigns equal attention weights $\alpha_{i,n}$ and $\alpha_{j,n}$ to the pair of data instances $(x_{i,n}, x_{j,n})$ should they be connected/related; and
- a prior knowledge graph Gr assigns unequal attention weights $\alpha_{i,n}$ and $\alpha_{j,n}$ to the pair of data instances $(x_{i,n}, x_{j,n})$ which are not related by the prior knowledge network Gr or which depends on how distantly connected/related they are.

11. A computer-implemented method according to claim 1, wherein searching for the set of attention relevancy weights that minimise the cost function further comprises searching for the set of attention relevancy weights using one or more from the group of:
- a neural network structure or layer configured for determining a set of attention relevancy weights that minimise the cost function;
- one or more ML techniques configured for determining a set of attention relevancy weights that minimise the cost function;
- one or more numerical methods or iterative numerical methods configured for determining a set of attention relevancy weights that minimise the cost function; or
- any other algorithm, structure or method for determining a set of attention relevancy weights that minimise the cost function.

12. The computer-implemented method of claim 1, wherein determining attention filtering information further comprises calculating an attention-loss function, $AL(X, \ell, \vec{\alpha_n})$ comprising a loss function, $L(f(X), \ell)$ and an attention function, $AF(G_l, \vec{\alpha_k}, X_k)$ for introducing a penalty or reward based on applying one or more prior knowledge graph(s) $G_1, \ldots, G_m$ and attention relevancy weight vector of attention weights $\vec{\alpha_n} = [\alpha_{1,n}, \ldots, \alpha_{i,n}, \ldots, \alpha_{N_n,n}]$ on the labelled set of data $X_n$.

13. The computer-implemented method of claim 12, wherein calculating the attention-loss function, AL, further comprises calculating the attention-loss function based on:

$$AL(X, \ell, \vec{\alpha_n}) = L(f(X), \ell) + \sum_{k=1}^{T} \sum_{l=1}^{m} AF(G_l, \vec{\alpha_k}, X_k)$$

-continued
$$AF(G_l, \vec{\alpha_k}, X_k) = \sum_{(x_{i,n}, x_{j,n}) \in G_l} \lambda_l |\alpha_{i,k} - \alpha_{j,k}|$$

where $\lambda_l \in \mathbb{R}^+$ is a hyperparameter selected to adjust a contribution of the prior knowledge graph $G_l$, and each attention score $\alpha_{i,n}$ may be calculated based on an attention function.

14. The computer-implemented method of claim 13, wherein calculating the attention function further comprises calculating an attention function based on one or more from the group of:
- a SOFTMAX attention function, wherein each attention weight, $\alpha_{i,n}$, is calculated based on $$\alpha_{i,n} = \frac{e^{s_{i,n}}}{\Sigma_j e^{s_{j,n}}},$$

wherein $s_{i,n}$ is a corresponding score from the set of scores associated with the set of data;
- a MAX attention function;
- a sparsemax attention function; or
- any suitable attention function for calculating attention weights based on at least the set of scores associated with the set of data.

15. The computer-implemented method of claim 8, wherein determining the attention filtering information further comprises filtering the data instances of the set of data by calculating a weighted combination of the attention relevancy weight vector with the encoding vector of the corresponding set of data.

16. The computer-implemented method of claim 15, wherein the weighted combination is based on a linear combination, and wherein the linear combination is based on a Hadamard multiplication between a matrix of feature encoding vectors associated with the corresponding set of data and the associated attention relevancy weight vector.

17. The computer-implemented method of claim 12, wherein the attention-loss function is implemented by the ML technique, ML model or classifier, the attention filtering information comprising data representative of the calculated weighted combination and the prior knowledge data associated with a set of data X, output by each prior knowledge graph or network, wherein the attention filtering information is input to the attention-loss function of the ML technique, ML model or classifier.

18. The computer-implemented method of claim 17, wherein filtering of the set of data occurs during training of the ML technique when generating a ML model or classifier, wherein the attention-loss function is penalised if the ML model does not correctly associate the relationship between pairs of data instances based on the prior knowledge data.

19. The computer-implemented method of claim 1, further comprising filtering each set of data of an input dataset, wherein the input dataset comprises a plurality of sets of data, in which each set of data comprises multiple data instances.

20. The computer-implemented method of claim 1, wherein each of the multiple data instances of a set of data are representative of a relationship between one or more entities of the data instances.

21. The computer-implemented method of claim 19, wherein each set of data is associated with a relationship between a different one or more entities.

22. The computer-implemented method of claim 19, wherein each set of data is associated with a relationship between one or more entities, wherein one or more of the relationships between each of the sets of data are different or dissimilar.

23. The computer-implemented method of claim 19, wherein each set of data is associated with a relationship between one or more entities, wherein one or more of the relationships between each of the sets of data are similar or the same.

24. The computer-implemented method according to claim 1, wherein the determining attention filtering information is based on a structure in which attention relevancy weights are regularised with an attention function based on a generalised fused lasso, GFL, using one or more prior knowledge graphs or a graph of mentions.

25. The computer-implemented method according to claim 24, wherein the GFL is used to calculate an attention relevancy weight vector, w, based on:

$$w = \mathrm{argmin}_{w \in \Delta^{N_M-1}} \frac{1}{2} \| w - z/\lambda \|^2 + \lambda \sum_{(a,b) \in G} | w_a - w_b |,$$

where G is a prior knowledge graph or network defined on input data instances and $\lambda \in \mathbb{R}^+$ is a hyper-parameter, and z is a vector of potentials associated with a potential function $\mathcal{P}_z$, which maps encoding vectors of data instances to a vector of potentials z or scores $\vec{s}$, and a subsequent mapping from the vector of potentials to a probability simplex $\mathcal{P}_\Delta$.

26. The computer-implemented method according to claim 24, further comprising:
receiving an encoding vector of the data instances in the form of a matrix X of encoding vectors;
calculating attention relevancy weights of the data instances with respect to a given relation pr, based on an attention function, $\mathcal{A}$, defined as: $\mathcal{A}(X, r_r) \mapsto w^r \equiv (w_1^r, \ldots, w_{N_M}^r)$, where X is the matrix of mention encodings and $w^r$ is an attention relevancy weight vector in an M-dimensional probability simplex $\Delta^M$.

27. The computer-implemented method of claim 26, wherein the attention function A embodies the calculation of potentials associated with the matrix X of encoding vectors and the calculation of attention relevancy weights based on the potentials and prior data associated with the data instances.

28. The computer-implemented method of claim 26, the method further comprising:
determining attention filtering information comprising data representative of the attention filtered vector $x^{(r)} = \Sigma_{k=1}^{N_M} w_k^{(r)} x_k$ and $x^{(r)} \in \mathbb{R}^{d_T}$; and
sending the attention filtering information to a classifier module, ML model, or ML technique for training an ML model.

29. The computer-implemented method of claim 26, wherein the attention function is implemented based on a potential network based on a potential function and an attention network.

30. The computer-implemented method of claim 29, wherein the attention network is based on a probability mapping function $\mathcal{P}_\Delta$ based on:

$$w = \mathrm{argmin}_{w \in \Delta^{N_M-1}} \frac{1}{2} \| w - z/\lambda \|^2 + \lambda \sum_{(a,b) \in G} | w_a - w_b |,$$

where G is a prior knowledge graph defined on input data instances and $\lambda \in \mathbb{R}^+$ is a hyper-parameter.

31. A computer-implemented method for training a ML technique to generate an ML model or classifier based on filtering a labelled training dataset comprising a plurality of sets of data according to the method of claim 1.

32. A computer-implemented method for classifying or using an ML model based on filtering an input dataset according to the method of claim 1.

33. An attention apparatus comprising a processor, a memory and a communication interface, the processor is connected to the memory and the communication interface, wherein the processor is programed with computer executable instructions that when executed cause the apparatus to implement the method or model of claim 1.

34. A system comprising:
an encoding network configured to encode an input dataset into one or more feature encoding vectors, wherein the input dataset comprises a plurality of sets of data, in which each set of data comprises multiple data instances;
a scoring network configured to generate a scoring vector for each of the one or more feature encoding vectors; and
an attention mechanism comprising a processor, a memory and a communication interface, the processor being connected to the memory and the communication interface, the processor being programed with computer executable instructions that when executed cause the system to implement the method of claim 1 and providing attention filtering information based on the encoding vectors and scoring vectors to a machine learning (ML) technique, ML model or classifier.

35. The system according to claim 34 further comprising a machine learning module configured to receive the attention filtering information for training the ML technique to generate an ML model or classifier.

36. The system according to claim 34 further comprising a machine learning module configured to receive the attention filtering information for input to a ML model.

37. The system according to claim 34 further comprising a machine learning module configured to receive the attention filtering information for input to a classifier.

38. A computer-readable medium comprising computer executable instructions, which when executed by a processor, causes the processor to implement the computer-implemented method of claim 1.

39. An attention apparatus comprising a processor and a communication interface, the processor connected to the communication interface, wherein:
the communication interface is configured to receive a set of scores for each set of data of an input dataset comprising a plurality of sets of data, in which each set of data comprises multiple data instances, wherein each data instance comprises data representing a span of text extracted from a corpus of literature, said span of text describing a relationship between biological or biomedical entities;
the processor is configured to determine attention filtering information based on prior knowledge of one or more relationships between the data instances in said each set of data and calculating attention relevancy weights corresponding to the data instances and each set of scores; and the communication interface is configured to provide the attention filtering information to a machine learning (ML) model or a ML technique for training the ML model, wherein:
- the ML model is a relational extraction (RE) model for extracting an interaction, association, or mechanism of action between a first biological or biomedical entity and a second biological or biomedical entity from the literature;
- calculating the attention relevancy weights comprises searching for a set of attention relevancy weights that minimise a cost function based on the set of scores and prior knowledge of one or more relationships between the data instances in said set of data;
- determining the attention filtering information further comprises filtering the data instances in the set of data by calculating a weighted combination of the calculated attention relevancy weights with an encoding vector associated with the corresponding data instances of said set of data; and
- providing the attention filtering information further comprises providing data representative of the filtered data instances to the ML technique or ML model.

40. A non-transitory computer-readable medium comprising computer readable instructions for filtering a set of data, the set of data comprising multiple data instances, which instructions when executed by one or more processor(s), causes at least one of the one or more processor(s) to perform the method of:
- receiving a set of scores for the set of data, wherein each data instance comprises data representing a span of text extracted from a corpus of literature, said span of text describing a relationship between biological or biomedical entities;
- determining attention filtering information based on prior knowledge of one or more relationships between the data instances in said set of data and calculating attention relevancy weights corresponding to the data instances and the set of scores; and
- providing the attention filtering information to a machine learning (ML) model or a ML technique for training the ML model, wherein:
  - the ML model is a relational extraction (RE) model for extracting an interaction, association, or mechanism of action between a first biological or biomedical entity and a second biological or biomedical entity from the literature;
  - calculating the attention relevancy weights comprises searching for a set of attention relevancy weights that minimise a cost function based on the set of scores and prior knowledge of one or more relationships between the data instances in said set of data;
  - determining the attention filtering information further comprises filtering the data instances in the set of data by calculating a weighted combination of the calculated attention relevancy weights with an encoding vector associated with the corresponding data instances of said set of data; and
  - providing the attention filtering information further comprises providing data representative of the filtered data instances to the ML technique or ML model.

\* \* \* \* \*

UNITED STATES PATENT AND TRADEMARK OFFICE
CERTIFICATE OF CORRECTION

PATENT NO. : 12,321,863 B2  
APPLICATION NO. : 17/041533  
DATED : June 3, 2025  
INVENTOR(S) : Creed et al.

Page 1 of 1

It is certified that error appears in the above-identified patent and that said Letters Patent is hereby corrected as shown below:

In the Claims

• In Claim 17, Column 54, Line 46, replace "data X," with -- data $X_n$ --

• In Claim 25, Column 55, Line 20, replace "w=argmin" with -- w = *arg min* --

• In Claim 30, Column 55, Line 65, replace "w=argmin" with -- w = *arg min* --

Signed and Sealed this  
Fifteenth Day of July, 2025

Coke Morgan Stewart  
*Acting Director of the United States Patent and Trademark Office*